(12) United States Patent
Nandakumar et al.

(10) Patent No.: US 9,092,525 B2
(45) Date of Patent: Jul. 28, 2015

(54) METHOD AND APPARATUS FOR SEARCHING NON-PUBLIC DATA USING A SINGLE SEARCH QUERY

(75) Inventors: Sarun Madarakal Nandakumar, Karnataka (IN); Evren Bingol, Kadikoy Istanbul (TR); Yu-Te Lin, San Jose, CA (US); Daniel Ernesto Barreto, Los Altos, CA (US)

(73) Assignee: Wyse Technology L.L.C., San Jose, CA (US)

( * ) Notice: Subject to any disclaimer, the term of this patent is extended or adjusted under 35 U.S.C. 154(b) by 0 days.

(21) Appl. No.: 13/467,002

(22) Filed: May 8, 2012

(65) Prior Publication Data

US 2012/0290614 A1    Nov. 15, 2012

Related U.S. Application Data

(60) Provisional application No. 61/484,170, filed on May 9, 2011, provisional application No. 61/570,185, filed on Dec. 13, 2011.

(51) Int. Cl.
G06F 17/30    (2006.01)

(52) U.S. Cl.
CPC ...... *G06F 17/30864* (2013.01); *G06F 17/3056* (2013.01)

(58) Field of Classification Search
CPC ............... G06F 17/30867; G06F 17/30011; G06F 17/30312; G06F 15/16; G06F 21/6218; G06F 21/84; G06F 21/34
USPC ........................... 707/710, 736, 737, 770, 802
See application file for complete search history.

(56) References Cited

U.S. PATENT DOCUMENTS

| | | | | |
|---|---|---|---|---|
| 6,498,795 | B1* | 12/2002 | Zhang et al. | 370/400 |
| 2005/0060417 | A1* | 3/2005 | Rose | 709/228 |
| 2005/0223030 | A1* | 10/2005 | Morris et al. | 707/104.1 |
| 2007/0061317 | A1* | 3/2007 | Ramer et al. | 707/4 |
| 2007/0136178 | A1* | 6/2007 | Wiseman et al. | 705/37 |
| 2009/0119256 | A1* | 5/2009 | Waters et al. | 707/3 |
| 2009/0119280 | A1* | 5/2009 | Waters et al. | 707/5 |
| 2009/0122722 | A1* | 5/2009 | Lin et al. | 370/254 |

(Continued)

OTHER PUBLICATIONS

International Preliminary Report on Patentability; PCT/US2012/037140; pp. 12, Nov. 21, 2013.

*Primary Examiner* — Sangwoo Ahn
*Assistant Examiner* — Ahmed Abraham
(74) *Attorney, Agent, or Firm* — Baker Botts L.L.P.

(57) ABSTRACT

Method and apparatus for facilitating real-time searching of non-public data using a single search query are provided. Method includes facilitating reporting of availability of companion application of remote source unit to auto discovery module to enable client device to automatically discover remote source unit and to enable client device to search, in real-time, non-public data on remote source unit using single search query. Companion application is non-public application. Single search query comprises a search term. Method includes enabling automatic access to non-public data on remote source unit, by single search query. Method includes facilitating receipt, at remote source unit, of single search query with search term. Method includes, in response to single search query, searching, in real-time, non-public data on remote source unit using search term; retrieving, in real-time, non-public search result comprising one or more file names or folder names; and transmitting non-public search result in real-time.

30 Claims, 23 Drawing Sheets

(56) References Cited

U.S. PATENT DOCUMENTS

| | | | |
|---|---|---|---|
| 2009/0254375 A1* | 10/2009 | Martinez et al. | 705/3 |
| 2010/0153410 A1* | 6/2010 | Jin et al. | 707/758 |
| 2010/0268939 A1* | 10/2010 | Pahlavan et al. | 713/155 |
| 2011/0082881 A1* | 4/2011 | Chunilal | 707/770 |
| 2011/0208736 A1* | 8/2011 | Fitzpatrick et al. | 707/736 |
| 2012/0185474 A1* | 7/2012 | Hansen et al. | 707/728 |
| 2012/0197934 A1* | 8/2012 | Zhang et al. | 707/770 |
| 2013/0204873 A1* | 8/2013 | Vandermolen et al. | 707/736 |

* cited by examiner

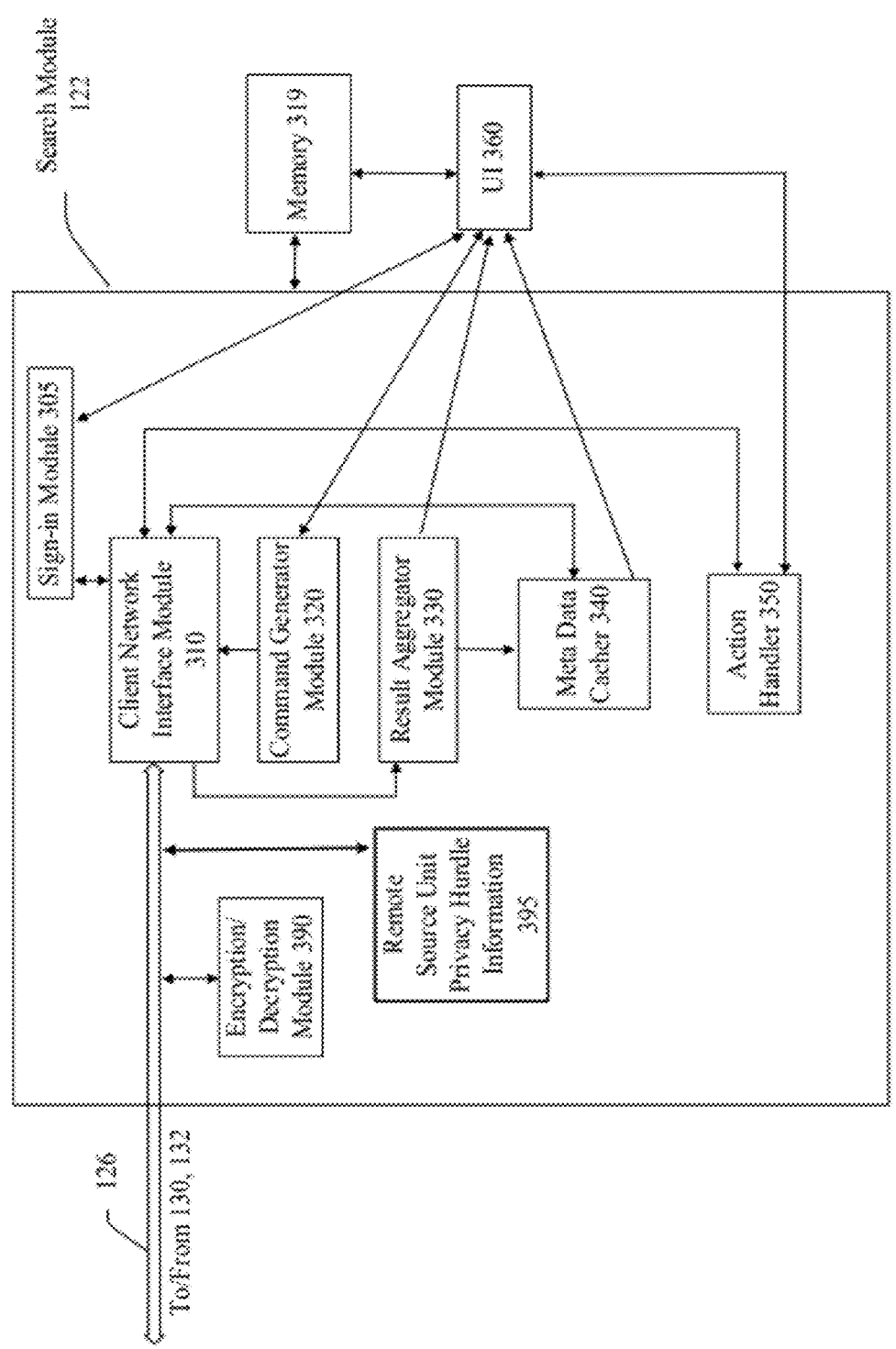

| PRIVATE SEARCH SERVICE | | | | |
|---|---|---|---|---|
| Search for: rabbit | | | 5 Results Found | |
| NAME | LOCATION | FILE SIZE | DATE MODIFIED | |
| rabbit.txt | Home desktop | 1000 | January 1, 2011 | |
| peter-rabbit.mp4 | Web-storage.com | 123456 | July 4, 2008 | |
| rabbit-disco.mp3 | Biology lab | 54321 | April 10, 2010 | |
| bunny-rabbit.doc | ABC Corporation | 666666 | October 24, 2009 | |
| bob-rabbit-x.jpg | Home desktop | 9876 | May 14, 2011 | |

Show results from:
- [+] All Locations
- [ ] Home desktop
- [ ] Web-storage.com cloud drive
- [ ] ABC Corporation Intranet
- [ ] Biology Lab Computer
- [ ] Show files & folders
- [+] Show files only
- [+] Search filename only
- [ ] Search file text

FIG. 7

| | NAME | LOCATION | FILE SIZE | DATE MODIFIED |
|---|---|---|---|---|
| | rabbit.txt | Home desktop | 1000 | January 1, 2011 |
| | peter-rabbit.mp4 | Web-storage.com | 123456 | July 4, 2008 |
| | rabbit-disco.mp3 | View 806 | 54321 | April 10, 2010 |
| | | Edit 808 | | |
| | | Print 810 | | |
| | bunny-rabbit.do | Share 812 | 666666 | October 24, 2009 |
| | bob-rabbit-x.jpg | Home desktop | 9876 | May 14, 2011 |

PRIVATE SEARCH SERVICE

Search for: rabbit

5 Results Found

Show results from:
- [+] All Locations
- [ ] Home desktop
- [ ] Web-storage.com cloud drive
- [ ] ABC Corporation Intranet
- [ ] Biology Lab Computer

- [ ] Show files & folders
- [+] Show files only

- [+] Search filename only
- [ ] Search file text

FIG. 8

METHOD AND APPARATUS FOR SEARCHING NON-PUBLIC DATA USING A SINGLE SEARCH QUERY

CROSS-REFERENCES TO RELATED APPLICATIONS

The present application claims the benefit of priority under 35 U.S.C. §119 from U.S. Provisional Patent Application Ser. No. 61/484,170, entitled "Method and Apparatus for Searching Information on Multiple Remote Locations," filed on May 9, 2011, and U.S. Provisional Patent Application Ser. No. 61/570,185, entitled "Method and Apparatus for Searching Non-Public Data on Multiple Remote Source Units Using a Single Search Query," filed on Dec. 13, 2011, both of which are hereby incorporated by reference in their entirety for all purposes.

FIELD

The subject technology relates in general to searches, and more particularly to, searching non-public data on multiple remote computing devices using a single search query.

BACKGROUND

A web crawler can browse and search a large number of web sites that contain publicly available data and then create a copy of the public web pages for later processing by a search engine to index the copied web pages. When a user makes a request to search the web, the web search engine does not search the real web sites, but rather searches the indexed copies of the web pages and returns the search hits from the indexed copies. A web search is not a real-time search and only provides publicly available data on the web.

SUMMARY

In one aspect, a method for facilitating real-time searching of non-public data using a single search query is provided. The method may include facilitating reporting of availability of a companion application of a remote source unit to an auto discovery module to enable a client device to automatically discover the remote source unit and to enable the client device to search, in real-time, non-public data on the remote source unit using the single search query, wherein the companion application is a non-public application, wherein the single search query comprises a search term. The method may include while obviating facilitation of a secure remote session log-on between the remote source unit and the client device and obviating mounting of the remote source unit onto the client device, enabling automatic access to non-public data on the remote source unit, by the single search query. The method may include facilitating receipt, at the remote source unit, of the single search query with the search term. The method may include, in response to the single search query: searching, in real-time, non-public data on the remote source unit using the search term; retrieving, in real-time, a non-public search result comprising one or more file names or folder names; and transmitting the non-public search result in real-time.

In one aspect, a non-transitory machine-readable medium for facilitating real-time searching of non-public data using a single search query is provided. The machine-readable medium comprises instructions. The instructions may include code to facilitate reporting of availability of a companion application of a remote source unit to an auto discovery module to enable a client device to automatically discover the remote source unit and to enable the client device to search, in real-time, non-public data on the remote source unit using the single search query, wherein the companion application is a non-public application, wherein the single search query comprises a search term. The instructions may include code to, while obviating facilitation of a secure remote session log-on between the remote source unit and the client device and obviating mounting of the remote source unit onto the client device, enable automatic access to non-public data on the remote source unit, by the single search query. The instructions may include code to facilitate receipt, at the remote source unit, of the single search query with the search term. The instructions may include code to, in response to the single search query, search, in real-time, non-public data on the remote source unit using the search term; retrieve, in real-time, a non-public search result comprising one or more file names or folder names; and transmit the non-public search result in real-time.

In one aspect, a system for facilitating real-time searching of non-public data using a single search query is provided. The system may include one or more processors. The system may include a memory comprising instructions. The instructions may include code to facilitate reporting of availability of a companion application of a remote source unit to an auto discovery module to enable a client device to automatically discover the remote source unit and to enable the client device to search, in real-time, non-public data on the remote source unit using the single search query, wherein the companion application is a non-public application, wherein the single search query comprises a search term. The instructions may include code to, while obviating facilitation of a secure remote session log-on between the remote source unit and the client device and obviating mounting of the remote source unit onto the client device, enable automatic access to non-public data on the remote source unit, by the single search query. The instructions may include code to facilitate receipt, at the remote source unit, of the single search query with the search term. The instructions may include code to, in response to the single search query, search, in real-time, non-public data on the remote source unit using the search term. The instructions may include code to retrieve, in real-time, a non-public search result comprising one or more file names or folder names. The instructions may include code to transmit the non-public search result in real-time.

In one aspect, a method for facilitating real-time searching of non-public data on multiple remote source units using a single search query is provided. The method may include automatically discovering, by the client device, the multiple remote source units via an auto discovery module while obviating identifying locations or addresses of the multiple remote source units by a user of the client device. The method may include facilitating provision, to the auto discovery module, of the single search query directed to the multiple remote source units to enable searching of non-public data simultaneously on all of the multiple remote source units based on the single search query while obviating initiation by the client device of a secure remote session log-on with each of the multiple remote source units and obviating mounting of the multiple remote source units onto the client device. The method may include, in response to facilitating provision of the single search query, receiving non-public search results in sequence or simultaneously, wherein each of the non-public search results is associated with a corresponding one of the multiple remote source units, wherein each of the non-public search results comprises one or more file names or folder names; automatically aggregating, in real-time, the non-public search results from a plurality of the multiple remote source units; automatically ranking, in real-time, the aggregated non-public search results; and facilitating displaying, in real-time, the ranked non-public search results.

In one aspect, a non-transitory machine-readable medium is provided for facilitating real-time searching of non-public data on multiple remote source units using a single search query. The machine-readable medium includes instructions. The instructions may include code to automatically discover, by the client device, the multiple remote source units via an auto discovery module while obviating identifying locations or addresses of the multiple remote source units by a user of the client device. The instructions may include code to facilitate provision, to the auto discovery module, of the single search query directed to the multiple remote source units to enable searching of non-public data simultaneously on all of the multiple remote source units based on the single search query while obviating initiation by the client device of a secure remote session log-on with each of the multiple remote source units and obviating mounting of the multiple remote source units onto the client device. The instructions may include code to in response to facilitating provision of the single search query, receive non-public search results in sequence or simultaneously, wherein each of the non-public search results is associated with a corresponding one of the multiple remote source units, wherein each of the non-public search results comprises one or more file names or folder names; automatically aggregate, in real-time, the non-public search results from a plurality of the multiple remote source units; automatically rank, in real-time, the aggregated non-public search results; and facilitate displaying, in real-time, the ranked non-public search results.

In one aspect, a method is provided. The method may include receiving an input comprising a search query and identifiers of a plurality of remote source units, wherein each of the plurality of remote source units is associated with a respective privacy hurdle. The method may include facilitating transmitting, to each of the plurality of remote source units, a message comprising a search request based on the search query and an input for overcoming the respective privacy hurdle of the remote source unit. The method may include facilitating receiving, from each of the plurality of remote source units, a respective set of search results. The method may include providing for display an indication of at least a first subset of a first respective set of search results from a first remote source unit in the plurality of remote source units. The method may include providing for display an indication of at least a second subset of a second respective set of search results from a second remote source unit in the plurality of remote source units.

In one aspect, a non-transitory machine-readable medium comprising instructions is provided. The instructions may include code to receive an input comprising a search query and identifiers of a plurality of remote source units, wherein each of the plurality of remote source units is associated with a respective privacy hurdle. The instructions may include code to facilitate transmitting, to each of the plurality of remote source units, a message comprising a search request based on the search query and an input for overcoming the respective privacy hurdle of the remote source unit. The instructions may include code to facilitate receiving, from each of the plurality of remote source units, a respective set of search results. The instructions may include code to provide for display an indication of at least a first subset of a first respective set of search results from a first remote source unit in the plurality of remote source units. The instructions may include code to provide for display an indication of at least a second subset of a second respective set of search results from a second remote source unit in the plurality of remote source units.

In one aspect, a method is provided. The method may include receiving an input comprising a search query and identifiers of a plurality of remote source units, wherein each of the plurality of remote source units is associated with a respective privacy hurdle. The method may include facilitating transmitting, to each of the plurality of remote source units, a message comprising a search request based on the search query and an input for overcoming the respective privacy hurdle of the remote source unit. The method may include facilitating receiving, at a first time, from a first remote source unit in the plurality of remote source units, a first set of search results. The method may include providing for display an indication of at least a first subset of the first set of search results within a single display unit. The method may include facilitating receiving, at a second time later than the first time, from a second remote source unit in the plurality of remote source units, a second set of search results. The method may include providing for display an indication of at least a second subset of the second set of search results within the single display unit, while continuing to provide for display the indication of the at least the first subset of the first set of search results within the single display unit.

In one aspect, a non-transitory machine-readable medium comprising instructions is provided. The instructions may include code to receive an input comprising a search query and identifiers of a plurality of remote source units, wherein each of the plurality of remote source units is associated with a respective privacy hurdle. The instructions may include code to facilitate transmitting, to each of the plurality of remote source units, a message comprising a search request based on the search query and an input for overcoming the respective privacy hurdle of the remote source unit. The instructions may include code to facilitate receiving, at a first time, from a first remote source unit in the plurality of remote source units, a first set of search results. The instructions may include code to provide for display an indication of at least a first subset of the first set of search results within a single display unit. The instructions may include code to facilitate receiving, at a second time later than the first time, from a second remote source unit in the plurality of remote source units, a second set of search results. The instructions may include code to provide for display an indication of at least a second subset of the second set of search results within the single display unit, while continuing to provide for display the indication of the at least the first subset of the first set of search results within the single display unit.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 3 illustrates an example of a client device in accordance with one aspect of the subject technology.

FIG. 7 illustrates an example of a web browser window displaying search results in accordance with one aspect of the subject technology.

FIG. 8 illustrates an example of a web browser window displaying an interface for interacting with a search result in accordance with one aspect of the subject technology.

DETAILED DESCRIPTION

Figure 1:
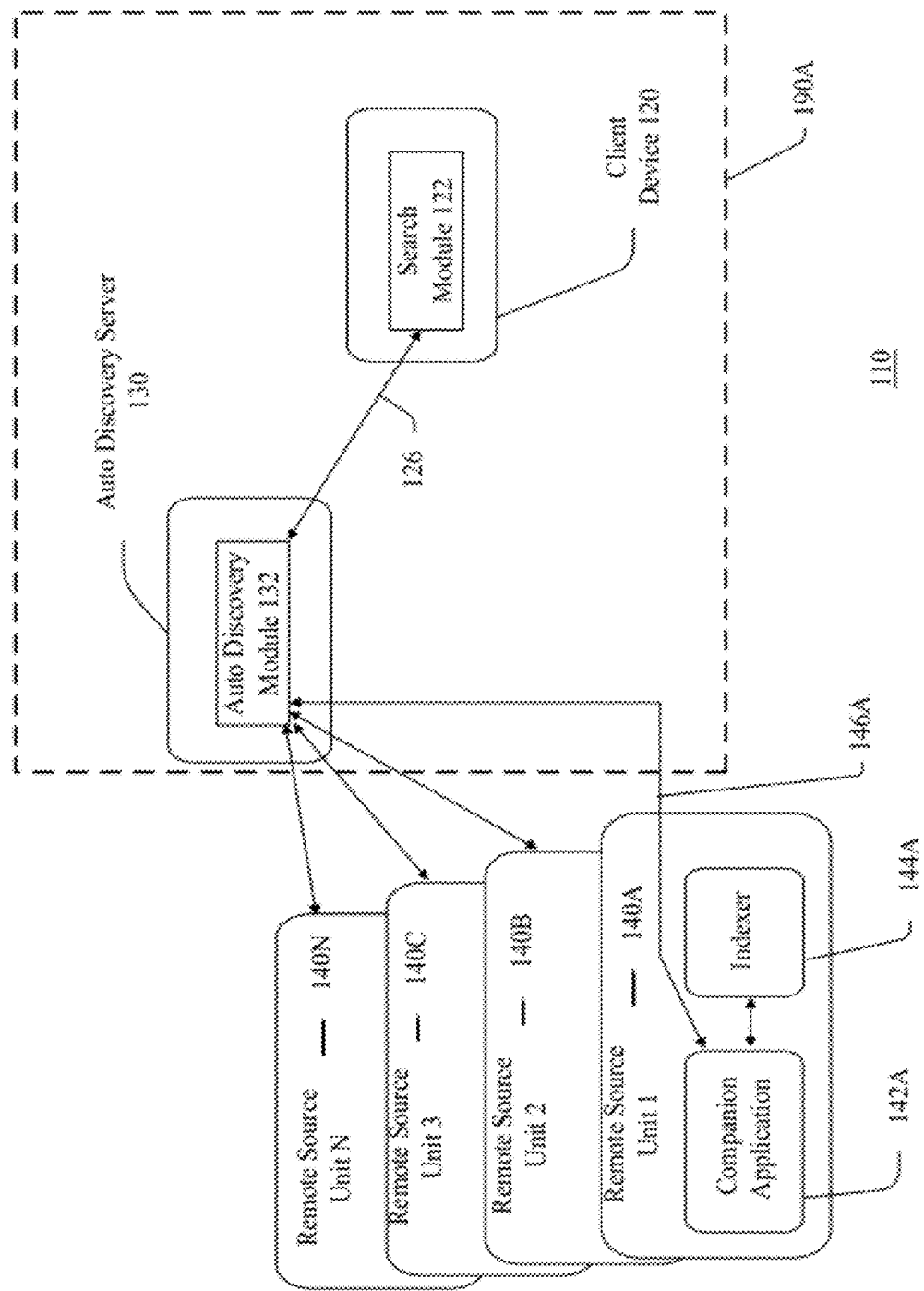
FIG. 1 illustrates an example of a system in accordance with one aspect of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

In one aspect, the subject technology facilitates securely searching non-public data on multiple remote locations. In one aspect, the subject technology allows a user to search non-public data (e.g., the user's personal data) from a plurality of sources with a single query regardless of the location of the data or the originating source of the search request.

In order to search for data that was distributed among multiple locations (e.g., computing devices at remote locations or network-based or virtual source units), users are traditionally forced to first identify and locate each remote computing device and then proceed to search each remote computing device independently. Furthermore, in certain instances, systems force users to first log into each remote computing device via remote desktop protocols in order to run the search. Once the user has executed the independent searches on each of the remote computing devices, the user has to manually aggregate the results and decide on the relative relevance of the results to select the best match to his/her search. In an advantageous aspect, the subject technology can obviate these shortcomings.

An important problem arises from the fact that the search procedure varies depending on the location/device/applications the user is searching from. More specifically, the search experience is dictated by factors such as the operating system, network connectivity and applications available to the user (i.e., client device) and on the remote computing devices.

Examples of some of the approaches to address the above-mentioned problems include the following: (a) Mount each remote location (e.g., folder/drive) onto a local file system of a client device and run a search through the local search functionality; and (b) Remotely connect to each of the remote locations, e.g., via a remote session using a remote desktop protocol, that need to be searched and then run independent searches on each of the remote locations.

These approaches, however, have the following shortcomings: A user must make a conscious decision on what locations they will search and access. As for the approach (a) above, when the remote locations are mounted into a local file system of a client device, the search is performed locally. This means that a significant amount of data needs to be transferred between the remote locations and the client device, resulting in a very slow process when connected over slow networks. A for the approach (b) above, this approach does not allow a user to search all remote computers simultaneously with one query. Users must log into each remote location, search the location for the data, then log out from that remote location and log into the next location and repeat the same sequence of actions at all of the remote locations sequentially. In an advantageous aspect, the subject technology can obviate these shortcomings In one aspect, a remote computing device, whether physical or virtual, may be referred to as a remote location, a remote source unit, a remote machine or a remote computer and vice versa. In one aspect, a client device may be referred to as a client, a user device, a local device, a client computing device, or a user and vice versa. In one aspect, a search query may be sometimes referred to as a search command and vice versa. In one aspect, a command may be sometimes referred to as a request or query and vice versa. In one aspect, the term non-public data may be sometimes exchanged with the term non-public data or personal data and vice versa.

Example of Configuration of Network System

FIG. 1 illustrates an example of a configuration of the subject technology in accordance with one aspect of the disclosure. A network system 110 may include one or more client devices 120, one or more auto discovery servers 130, and one or more remote source units (e.g., remote locations or virtual source units) 140A through 140N. In one implementation, a single machine (e.g., 190A which can be a client device) may implement the functions of both the client device 120 and the auto discovery server 130. Alternatively, different machines may implement the functions of each of the one or more client devices 120 and the one or more auto discovery servers 130. The client devices 120 and the auto discovery servers 130 may communicate with one another via hypertext transfer protocol (HTTP).

Client Device

In one aspect, a client device 120 (e.g., a mobile phone or tablet) may be the end point of the communication. In one aspect, most of the requests are initiated by the client device 120 (e.g., by the search module 122 within the client device 120). A client device 120 can be, for example, any network/internet enabled device. The client device 120 may be a physical machine or a virtual machine. A search module 122 of the client device 120 may be responsible for providing to its user a user interface to show the discovered connections and an input text box to enable searching. The search module 122 of the client device 120 can run an auto discovery component.

Remote Source Unit

In one aspect, there are N number of remote source units (or remote locations/remote storage units) 140A through 140N, where N is an arbitrary integer. For example, N may be one, two, three, four, five, or more than five. Each of the remote source units 140 can have any operating system and includes a companion application (e.g., 142A) installed. The remote source units 140 may include physical machines, for example, laptop computers, desktop computers, mobile phones, desktop computers, or home network source units. The remote source units 140 may include virtual machines, source units within a virtual private network, source units within an intranet, e.g., a corporate intranet, cloud or Internet based source units, or data source units within a social networking service storing, for example, photographs or comments. Remote source units 140 can be understood as the other end points of the system 110. Each companion application of a remote source unit is responsible for responding to the request from the client device. Each remote source unit 140 can run any operating system supported by its companion application (e.g., Windows™ 7, MAC™) Alternatively, a remote source unit 140 may include a database configured to respond to commands to access data, e.g. SQL commands, that does not run any operating system. Remote source units 140 have the software responsible for traversing the file systems and indexing the documents. In addition, the remote source units may include private source units, where a privacy hurdle must be overcome in order to access the private source unit. For example, in order to access a private source unit on a personal computing device or an Internet-based personal source unit, a username or password may need to be entered. In order to access a private source unit within a corporate network, a certificate may need to be provided. While FIG. 1 shows only one companion application 142A and one indexer 144A, it is understood that each remote source unit may include a companion application and an indexer.

In one implementation, the remote source units 140 communicate with the auto discover server 130 or the client device 120 over a network, e.g., the Internet or a cellular network. The remote source units 140 may communicate with the auto discovery server 130 or the client device 120 via Extensible Messaging and Presence Protocol (XMPP). The auto discovery server 130 may communicate with the client device 120 over the network via hypertext transfer protocol (HTTP).

Companion Application

In one aspect, a companion application is installed on each of the N remote source units 140A through 140N. A companion application can communicate with an auto discovery module 132 of the auto discovery server 130, other companion applications and one or more client devices.

In one aspect, each of the companion applications (e.g., 142A) runs on its corresponding remote source unit and it is responsible for all communications in and out of the corresponding remote location and for reporting its availability to the auto discovery module of the auto discovery server. It handles and interprets the messages that a client device sends over the auto discovery module. It also utilizes the available indexer (e.g., 144A) to retrieve relevant data (e.g., files, folders and applications) for a particular search term.

Indexer

In one aspect, a search indexer (or indexer) (e.g., 144A) is installed on each of the N remote source units. An indexer can perform different ranking and searching. The indexer runs as a part of the companion application utilizing operating system features. For example, the indexer can rank the documents' content by analyzing, e.g., word frequency distribution (i.e., the number of a search term found in a document), file name relevance, creation date of a file, author of a file, size of a file, and/or type of a file.

In one aspect, each of the indexers (e.g., 144A) is responsible for ranking the files/documents on each remote source unit. When a search query is received from the client device over the auto discovery module by a remote source unit, a companion application installed on each of the remote source units handles this search term and passes it onto its corresponding indexer. The indexer searches the remote source units at the corresponding remote location and returns ranks for the elements most relevant to the search term. The indexer can search the content of the document by creating a frequency word distribution, which identifies how relevant the search term is to that document/file. Alternatively, the indexer can narrow down the search by only searching the file names and not the content, or it can take into account other metadata such as file creation dates.

In one aspect, one or more of the indexers or each of the indexers (e.g., 144A) may be configured to traverse a file system of the remote source unit. One or more of the indexers or each of the indexers may be configured to index files and folders or subsets of files and folders on the remote source unit(s). A subset of a file may be, for example, a section or a chapter of a word processing document. A subset of a folder may be, for example, a sub-folder or a label attached to all or a portion of files within the folder.

Auto Discovery Server

In one aspect, an auto discovery server 130 includes an auto discovery module 132 which provides communication capabilities between all the components (e.g., client devices and remote source units), even if the components are not on the same network. In one aspect, the only requirement is that all the components have network connectivity to the auto discovery server 130 (e.g., auto discovery module 132).

In one aspect, an auto discovery module 132 of an auto discovery server 130 may run as a "middle man." It is responsible for relaying the messages between the client devices and the remote source units. These messages can be in any text format (e.g., JSON).

Example of Configuration of Remote Source units

Figure 2:
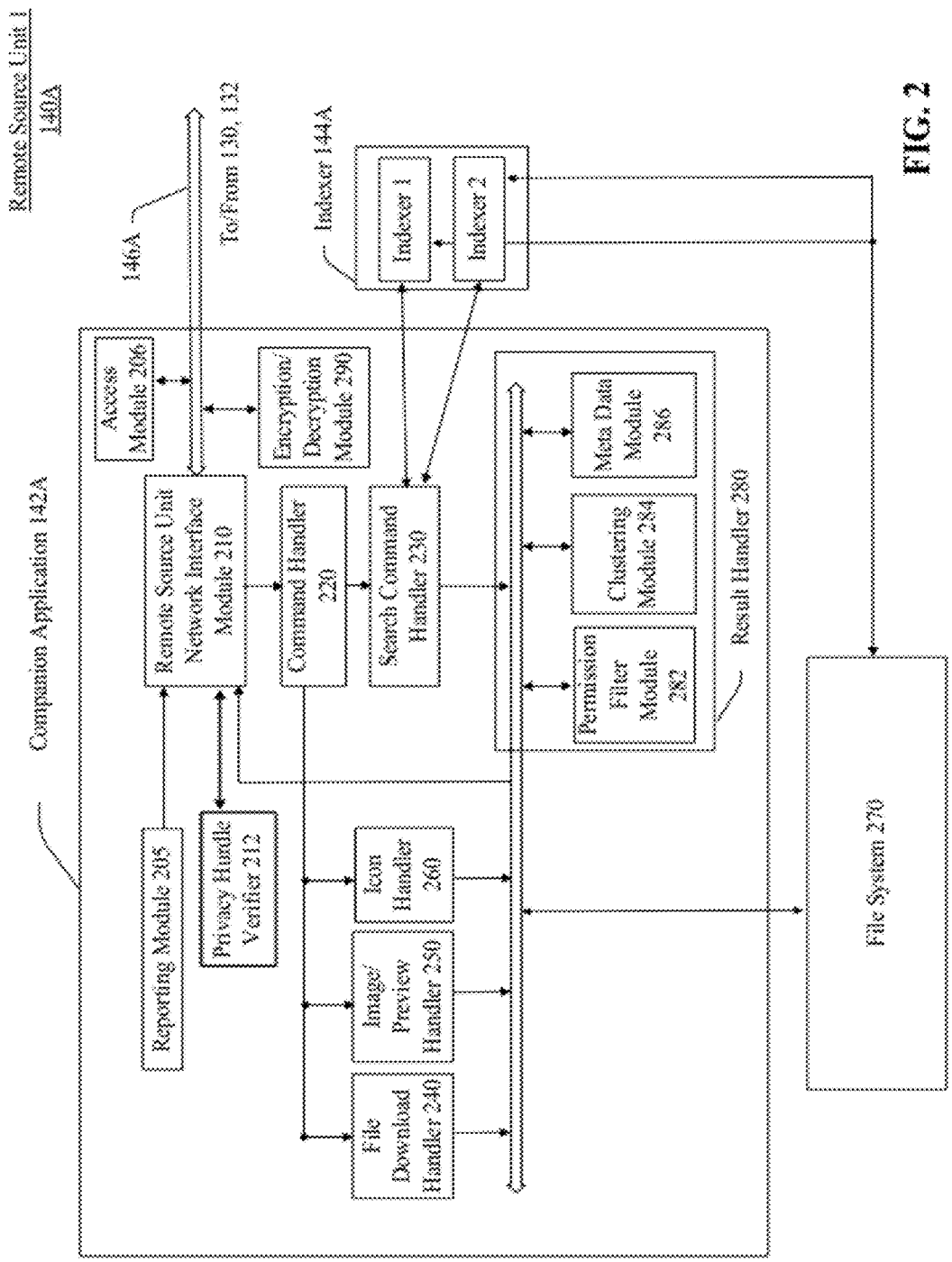
FIG. 2 illustrates an example of a remote source unit in accordance with one aspect of the subject technology.

FIG. 2 illustrates an example of a remote source unit in accordance with one aspect of the subject technology. A remote source unit (e.g., 140A) may include an indexer 144A, a companion application 142A and a file system 270.

Indexer

An indexer 144A may include one or more different types of indexers. For example, indexer 1 may be a Windows™ search indexer. Indexer 2 may be a customized indexer (e.g., a custom indexer for a remote source unit operating with a Linux operating system). An indexer may be selected by a user of a remote source unit or by another means.

Upon receiving a search query including a search term (e.g., from a search command handler 220), an indexer (e.g., indexer 1) may search its remote source unit (e.g., file system 270) using the search term. Depending on the search criteria selected by a user or by the indexer, an indexer may search the file names, file folder names, the content of files and folders, and/or the meta data of files and folders in its remote source unit.

In one example, an indexer may determine that the search criteria is to search the file and folder names only, and the indexer may search the file names and folder names using the search term. The indexer may then return the file names and folder names that contain the search term in the names. In another example, an indexer may determine that the search criteria is to search the contents of the files and folders, search the contents of the files and folders and return the file names and folder names whose contents contain the search term. In another example, the indexer may determine that the search criteria is to search the meta data of files and folders, search the meta data of the files and folders, and return the file names and folder names whose meta data matches the search term.

In one aspect, an indexer may rank the files and/or file folders found within a given remote source unit and may continuously update the ranking information as more files and/or file folders are found within the remote source unit or as the number of times a search term is found in a given file and/or folder of the remote source unit increases. For each file or file folder found in a given remote source unit, an indexer may identify, and continuously update, associated search ranking information (e.g., the number of times a search term is found in a given file or file folder and/or percentage ranking among the files and file folders found in a given remote source unit).

In another aspect, a companion application of one remote source unit may act as a master and communicate with companion applications of other remote source units to aggregate the search results among all of the remote source units and rank the files and/or file folders among all files and/or file folders across all of the remote source units, and the master companion application may provide the aggregated ranking to a client device.

In one example, an indexer may provide an indexer result that includes one or more names of the files or folders found and include any search ranking information associated with the files or folders. The file names or folder names may be those in the file system 270 of a remote source unit that match the search term in the file or folder names, in the content of the files or folders, and/or in the meta data fields of the files or folders (e.g., meta data associated with a file or folder or meta data associated with the content of a file or folder).

Remote Source Unit Network Interface Module

A companion application 142A may comprise a remote source unit network interface module 210 that facilitates communication to and from a client device via, e.g., an auto discovery module 132 over one or more channels 146A. The remote source unit network interface module 210 may be coupled to a privacy hurdle verifier 212. The privacy hurdle verifier 212 may be configured to verify that any external device (e.g., client device 120 or auto discovery server 130) accessing data stored in the remote source unite 140A has permissions to access the data. For example, the privacy hurdle verifier 212 may verify that a username and password provided by the external device are correct or that the external device has a certificate necessary to access the remote source unit 140A.

Command Handler

A companion application 142A may comprise a command handler 220 that may receive commands from the remote source unit network interface module 210 received over the channels 146A from the auto discovery module 132. Upon receipt, the command handler 220 may determine the type of each command received, the appropriate destination module, and provide the command to the appropriate destination module selected (e.g., 230, 240, 250 or 260).

In one example, upon receiving a command, if the command handler 220 determines that the command is a search command, then the command handler 220 forwards the command to the search command handler. If the command handler 220 determines that the command is an icon command, the command handler sends the command to an icon handler 260. If the command handler 220 determines that the command is an image/preview command, the command handler provides the command to an image/preview handler 250. If the command handler 220 determines that the command is a file download command, the command handler provides the command to a file download handler 240.

Search Command Handler

A companion application 142A may comprise a search command handler 230. When a search command handler 230 receives a search command from a command handler 220 including a search term (e.g., "university"), the search command handler frames a search query including the search term and provides the search query to one of the indexers selected for use (e.g., indexer 1, indexer 2). The search command handler 230 may also receive the search results from an indexer and forward the results to a result handler for processing and forwarding them to a client device (e.g., via 210).

Result Handler-Meta Data Module

A companion application 142A may comprise a result handler 280. A result handler 280 may comprise a meta data module 286 that can determine the type of meta data associated with each file, each file folder and/or the content of each file or file folder found by an indexer. Meta data may provide description about the files or file folders found that are relevant to the search. Meta data may include information about a file or a file folder (e.g., creation date, author, size, type, icon, or image of a file or file folder). Meta data may include information about the content of a file or file folder (e.g., a preview (or "look-and-feel") of the file content or file folder content, a thumbnail of the file content or file folder content, an image of the file content or file folder content, any other partial view of the file content or file folder content).

In one aspect, a meta data module may provide one or more indicators that identify whether a file or a file folder has an associated icon, an associated preview of the file content or file folder content, an associated thumbnail of the file content or file folder content, an associated image of the file, file folder, file content, or file folder content, and/or any other partial view of the file content or file folder content ("image or partial-view meta data" or "image/partial-view meta data"). In another aspect, a meta data module may provide one or more indicators that identify whether a file or a file folder has its creation date, author, size and/or type ("text meta data").

"Image or partial-view meta data" may be meta data that is relatively large in size. Image or partial-view meta data may be one or more attributes (or descriptions) about a file, folder or the content of a file or folder, and it may be represented as an icon, image, audio, video or partial view of the content of the file or folder. "Text meta data" may be meta data that is relatively small in size and it may be one or more attributes (or descriptions) about a file or folder that can be represented in text, rather than an image, icon, audio, or video.

In one example, if a file contains an essay, the file's image/partial-view meta data may include a snip of the essay. If a file is a picture of a bridge, then the file's image/partial-view meta data may include a portion of the picture of the bridge showing a person's face. A file's meta data may include a tag.

Result Handler-Clustering Module

A result hander 280 may comprise a clustering module 284 that can group the search results (e.g., the files and/or file folders found) based on a category identified by a user or by a companion application. For example, a clustering module may group the search results by file type, date, author or size. In one example, a clustering module may aggregate all word documents into one group. In another example, a clustering module may aggregate all photo documents into one group. In yet another example, a clustering module may aggregate all photo documents that belong to a selected person into one group.

Result Handler-Permission Filter Module

A result hander 280 may comprise a permission filter module 282 that can filter the search result based on the permission criteria of a user of a client device to allow transmission of the search result to the client device only to the extent the search result meets the permission criteria. For example, if a user of the client device who initiates a search query is permitted to access files only in certain directories of the remote source unit or files authored by the user, then the permission filter module 282 allows only those permitted files to be transmitted from the remote source unit.

Icon Handler

A companion application 142A may comprise an icon handler 260. Upon receipt of a command (e.g., from a client device via 210, 132), if a command handler 220 determines that the command is a request for an icon of a file or file folder, the command handler 220 provides the command to an icon handler 260. The icon handler may determine the icon associated with the file or file folder in the file system 270 and facilitate providing the requested icon from the file system 270 to the client device (e.g., via 210, 132).

Image/Preview Handler

A companion application 142A may comprise an image/preview handler 250. Upon receipt of a command (e.g., from a client device via 210, 132), if a command handler 220 determines that the command is a request for an image or a preview of a file or file folder, the command handler 220 provides the command to an image/preview handler 250. The image/preview handler may determine the image or preview associated with the file or file folder in the file system 270 and facilitate providing the requested image or preview from the file system 270 to the client device (e.g., via 210, 132).

File Download Handler

A companion application 142A may comprise a file download handler 240. Upon receipt of a command (e.g., from a client device via 210, 132), if a command handler 220 determines that the command is a request for a file download, the command handler 220 provides the command to a file download handler 240. The file download handler may identify the file in the file system 270 and facilitate providing the content of the requested file from the file system 270 to the client device (e.g., via 210, 132).

Other Types of Handlers

While not shown for brevity, a companion application may have other types of handlers. For instance, upon receipt of a command, if a command handler 220 determines that the command is a request for other types of meta data (e.g., audio, video meta data) of a file or file folder, the command handler 220 can provide the command to an appropriate meta data handler (not shown), and such meta data handler can determine the meta data associated with the file or file folder and facilitate providing the content of the meta data from the file system 270 to the client device (e.g., via 210, 132).

Encryption/Decryption Module

A companion application 142A may comprise an encryption/decryption module 290. Before transmitting information (e.g., a response to a request such as a search result, the content of a file, an image, an icon) from a companion application to a client device (e.g., via 132), an encryption/decryption module 290 may encrypt the information so that the information can be kept secure during transmission. Furthermore, the encryption/decryption module 290 can decrypt information (e.g., a request or command) received by a companion application from a client device (e.g., via 132).

Example of Configuration of Client Device

FIG. 3 illustrates an example of a client device in accordance with one aspect of the subject technology. A client device (e.g., 120) may comprise a search module 122 and a user interface (UI) 360. A client device may have a memory (e.g., 319) that may communicate with each of the components shown in FIG. 3 and that may store various data and search results.

Client Network Interface Module

A search module 122 may comprise a client network interface module 310 that facilitates communication to and from remote source units via, e.g., an auto discovery module 132 over one or more channels 126. A client network interface module 310 may provide information to a result aggregator module 330, send/receive information to/from an action handler 350, send/receive information to/from a meta data cacher 340 and send/receive information to/from a sign-in module 305.

Command Generator Module

A search module 122 may comprise a command generator module 320 that can communicate with UI 360. Upon receiving and determining that a search term is received from UI 360, a command generator module 320 may combine the search term with a command to generate a search command and facilitate providing the search command to a client device (via, e.g., 310, 132).

Result Aggregator Module

A search module 122 may comprise a result aggregator module 330. In response to a search command, remote source units may provide the search results to the client network interface module 310 of the client device (e.g., via 132). Upon receiving the search results (via 310), a result aggregator module 330 may aggregate the results received from all of the remote source units and sort, order and rank all of the results by category (e.g., by word frequency distribution of the search term in the files found, by remote source unit, by date, by author, by file type, etc.). The category may be selected by a user of the client device or by the search module 122. The result aggregator module may aggregate, sort and rank the results immediately as received without awaiting all results from all of the remote source units, and the result aggregator module may continuously update its aggregated, sorted and ranked information until it determines that all results from all of the remote source units are received, aggregated, sorted and ranked.

The result aggregator module may rank the files and/or folders in the search result by sorting or ordering their associated search ranking information (e.g., word frequency distribution) or associated meta data (e.g., date, author, file type). The result aggregator module may facilitate providing the aggregated and ranked search results (e.g., the file names and/or file folder names in the ranked order, any associated aggregated search ranking information, and some of the associated meta data (e.g., text meta data that is relatively small in size) to UI 360 for display to a user (e.g., utilizing memory 319 and/or meta data cacher 340).

Meta Data Cacher

A search module 122 may comprise a meta data cacher 340 that may determine whether a file or file folder in the search results has, or is associated with, any "large" meta data. For instance, the meta data cacher 340 may determine whether a file or folder has, or is associated with, one or more of the image/partial-view meta data (e.g., an icon, an image, a preview) by examining the meta data indicators in the search results. The meta data cacher 340 may then determine whether the client device has already received, from the remote source units, and cached the content of the meta data of the file or folder (e.g., an icon, image or preview of a file or folder) in a memory.

If the meta data cacher 340 determines that the content of the meta data does not exist in the client device (e.g., 319) because, for example, this is the first time the associated file or folder is searched and found, then the meta data cacher 340 may determine the applicable remote source unit, formulate a command for requesting the content of the meta data (e.g., an icon, an image, a preview) from the applicable remote source unit, and facilitate sending it to the applicable remote source unit (e.g., via 310, 132). Upon receipt of the requested content of the meta data, the meta data cacher 340 may cache the received content of the meta data (e.g., in 319) so that the meta data cacher 340 may simply fetch and re-use it at a later time (rather than re-requesting it from the remote source units). This provides efficient remote computing.

If the meta data cacher 340 determines that the content of the meta data already exists in the client device (e.g., 319) because, for example, this is a second time the associated file or folder is searched, then the meta data cacher 340 is prevented from re-requesting the content of the meta data from the remote source unit(s) and simply fetches the content of the meta data from the memory of the client device.

The meta data cacher 340 may facilitate providing the content of the meta data (e.g., an icon or image associated with a file or file folder) to UI 360 for display to a user.

Action Handler

A search module 122 may comprise an action handler 350 that can monitor a user's requested action(s) for a file(s) via UI 360 and facilitate performance of the requested actions. For example, if a user requests a file found to be opened, copied, stored, attached to an email or printed, the action handler 350 may determine that it is a request for the content of a file, determine the applicable remote source unit, formulate a command for requesting the content of the file from the applicable remote source unit, and facilitate sending the command to the applicable remote source unit (e.g., via 310, 132). Upon receipt of the requested content of the file by the client device (e.g., 319), the action handler 350 may facilitate performing the action requested by the user for the file while utilizing other resources of the client device (e.g., opening and displaying the content of the file on UI, attaching the file to an email or printing the file, etc.).

Encryption/Decryption Module

A search module 122 may comprise an encryption/decryption module 390. Before transmitting information (e.g., a command or request such as a search command, a request for the content of meta data or the content of a file) from a search module to remote source units (e.g., via 132), an encryption/decryption module 390 may encrypt the information so that the information can be kept secure during transmission. Furthermore, the encryption/decryption module 390 can decrypt information (e.g., a response to a command or request) received by a search module from remote source units (e.g., via 132).

Remote Source Unit Privacy Hurdle Information

As shown, the client device 120 includes remote source unit privacy hurdle information 395. The remote source unit privacy hurdle information 395 may be configured to allow the client device 120 to access the remote source units 140. The remote source unit privacy hurdle information 395 may be stored in the long-term memory of the client device 120 or entered by the user and stored in the short-term memory of the client device 120. The remote source unit privacy hurdle information 395 may include login information, e.g., a username or a password, or a certificate to access one or more of the remote source units 140.

User Interface

UI 360 may comprise an input device (e.g., a keyboard, mouse, microphone, touch screen), an output device (e.g., a display, speaker, touch screen, printer) and/or interfaces (e.g., drivers).

Various Illustrations of Operations

Described below are various illustrations of facilitating searching of data on multiple remote computing devices in different levels of detail in accordance with various aspects of the disclosure.

Illustration 1

In accordance with one aspect of the disclosure, an exemplary operation of non-public data searching on multiple remote computing devices is illustrated.

Companion applications (e.g., 142A, 205) on the remote source units (e.g., 140A through 140N) report their availability to an auto discovery module (e.g., 132).

A client device (e.g., 120, 122, 305) signs into the auto discovery module.

The client device (e.g., 120, 122, 305) discovers the remote source units automatically via the service provided by the auto discovery module without having to specify the locations or Internet Protocol (IP) addresses of the remote source units.

The client device requests an asynchronous search query (via the auto discovery module) to all the remote source units (e.g., 140A through 140N) that the client device has discovered from the auto discovery module. For example, when the client device transmits a single search query, in response the auto discovery module may transmit the single search query to all of the remote source units simultaneously (rather than sending a query to remote source units sequentially one at a time). The client device can simply transmit a single search query to search all of the remove devices, and the client device does not need to transmit a search query separately for each individual remote source unit.

Upon arrival of the search query, each indexer (e.g., 144A) of the remote source units uses the indexing based search algorithm to rank all the documents/files in its respective remote source unit by relevance, and each companion application of the remote source units returns the results to the client device via the auto discovery module.

The client device receives and aggregates the results according to its ranking sent by each remote source unit via the auto discovery module. The client device starts displaying the search results as soon as it obtains them from each of the remote source units.

The client device sends a second query, to the companion applications of the remote source units via the auto discovery module, to retrieve additional information such as icons, meta data or more details (e.g., previews, download) associated with the files and folders found, if the client device does not already have such information. In one aspect, meta data comprises information about a file or a folder. In one aspect, meta data comprises information about the contents of the file or the folder.

The remote source units respond back with the additional information over the auto discovery module.

The client device receives the additional information and caches it for later use.

Illustration 2

In accordance with one aspect of the disclosure, another example of non-public data searching on multiple remote computing devices is illustrated.

In one advantageous aspect, each companion application of a remote source unit (e.g., an access module 206) may allow a search query initiated by a client device to access and search the non-public data on the remote source unit without the intervention by the user/administrator of the remote source unit, for example, by allowing the search query to automatically bypass the firewall at the remote source unit.

In one advantageous aspect, a companion application (e.g., an access module 206) may determine whether a firewall is enabled at a remote source unit. In general, when a remote source unit receives an "unsolicited" request to establish a connection (e.g., a communication not initiated or requested by the remote source unit) and if the remote source unit has a firewall, the firewall blocks the initiation of connection. In this example, a companion application desires to allow a request for connection initiated by the auto discovery module. Thus, if the firewall is enabled, then the companion application (e.g., 206) may selectively disable the firewall for all communications directed to the companion application that are originated or initiated by an outside source (e.g., client device, auto discovery module that are outside the remote source unit). In another example, if the firewall is enabled, then a companion application (e.g., 206) may selectively disable the firewall for all communication originated or initiated by the auto discovery module and/or directed to the companion application.

In an advantageous aspect, this selective firewall disablement or exception (or selectively bypassing the firewall) can allow the client device to have automatic access to the non-public data on the remote source units without requiring the intervention of the users or administrators of the remote source units to unblock every communication directed to the companion applications of the remote source units.

In one example, each companion application (e.g., 206) may perform selective firewall disablement automatically at the time the companion application is installed on its respective remote source unit (e.g., for the first time) and allow the selective firewall disablement to persist in its respective remote source unit so long as the companion application remains installed on the remote source unit. In another example, a companion application (e.g., 206) may perform selective firewall disablement automatically whenever the companion application is started or running. In one aspect, a companion application may perform selective firewall disablement before the companion application reports its availability to an auto discovery module.

In one advantageous aspect, when a remote source unit (e.g., 140A) is powered on and a companion application (e.g., 142A) is running on the remote source unit, the companion application (e.g., reporting module 205) may facilitate reporting of its availability to an auto discovery module (e.g., 132, 130). Similarly, the companion applications of other remote source units may also facilitate reporting of their availability to the auto discovery module. In one aspect, a companion application(s) may automatically report its availability without requiring an action on the part of a user. In one example, an companion application(s) may automatically report its availability upon startup of the remote source unit(s). In one example, an companion application(s) may automatically report its availability at a regular interval if it is operational and available.

Figure 4A:
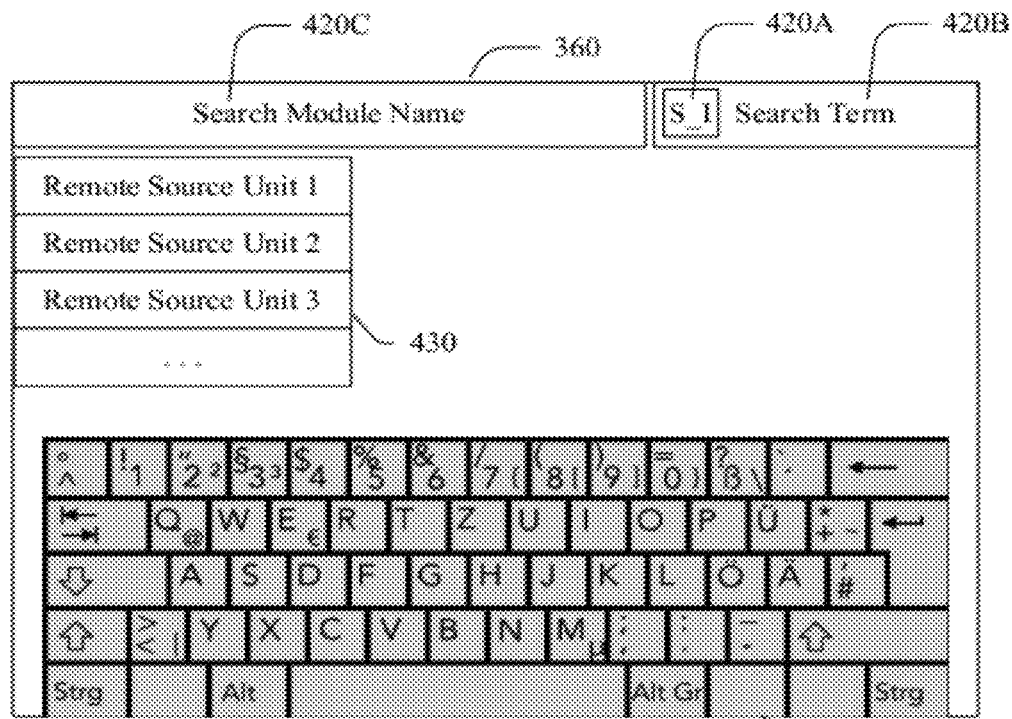
FIG. 4A illustrates an example of a display at a client device in accordance with one aspect of the subject technology.

When a client device (e.g., sign-in module 305) signs into the auto discovery module, the client device (e.g., 305) may automatically discover the remote source units that are available without the user searching or identifying the remote source units. The client device (e.g., 122, 305, 360) may automatically display on its display (e.g., 360 in FIGS. 3 and 4A) the remote source units that are available (see, e.g., 430 in FIG. 4A). When a user selects a search icon (e.g., 420A in FIG. 4A), the client device (e.g., 122, 305) may provide a search box (e.g., 420B) into which the user may enter a search term using, e.g., a touch-screen keyboard (e.g., 440 in FIG. 4A). In one advantageous aspect, all of the remote source units can be searched automatically without the user selecting the remote source units. In another example, a user can choose to select only some of the remote source units for searching.

A command generator (e.g., 320) may determine that a search term has been entered at UI 360, generate a search command with the search term, and facilitate providing the search command to the remote source units simultaneously.

When the auto discovery module (e.g., 132) receives the search command, it may transmit a search command to all of the remote source units simultaneously.

Upon receipt, if a command handler (e.g., 220) of each remote source unit determines that the received command is a search command, then the command handler forwards the command to a search command handler (e.g., 230) of each associated remote source unit, which frames a search query with the search term and provide the search query to an indexer (e.g., indexer 1 or indexer 2) of each associated remote source unit.

An indexer of each remote source unit may search its associated remote source unit (e.g., file system 270) using the search term. Depending on the search options selected by a user, a search module or a companion application, an indexer may search the term in the file and folder names, in the content of the files, and/or in the meta data of the files and folders. An indexer may rank the files and/or folders found by its match quality or other ranking category within its remote source unit or across some or all of the remote source units. An indexer can provide the ranking information for the files and/or folders found.

A meta data module (e.g., 286) of each remote source unit may determine whether a file/folder found is represented by one or more meta data. Some of the meta data may be large in size (e.g., icon or image), and thus the meta data module may generate a meta data indicator specifying whether a file/folder found is represented by a particular type of meta data. In this disclosure, this type of meta data is sometimes referred to as image/partial-view meta data for convenience.

A clustering module (e.g., 284) of each remote source unit may group the files/folders found into one or more groups depending on a grouping criteria.

A permission filter module (e.g., 282) of each remote source unit may filter the files/folders based on the permission criteria of a user who has made the search request so that only those files/folders authorized to be accessed by the user are transmitted from each of the remote source units.

In response to the single search command, a companion application of each remote source unit (e.g., 270, 230, 280) may facilitate transmission, to the auto discovery module, of a search result including one or more file names and/or folder names, associated search ranking information (e.g., number of matches found in each file, as generated by an indexer, if any) and associated meta data indicators (e.g., indicator as to whether a file has an icon, as generated by a meta data module, if any). The search result may include the content of certain meta data, if any, that is small in size (e.g., author, file size, file type, file creation date). In this disclosure, this type of meta data is sometimes referred to as text meta data for convenience. The search result transmitted in response to the search query does not contain any image/partial-view meta data to improve efficiency of remote computing.

The auto discovery module may forward each of the search results received to the client device as soon as it is received.

A result aggregator module of a client device (e.g., 330) may aggregate and rank the search results as soon as they arrive and update the consolidated and ranked search result until all search results are received.

A meta data cacher (e.g., 340) may determine whether the search results include any meta data indicators for image/partial-view meta data and if so, may facilitate transmission of a request or command for the content of such meta data to all applicable remote source units (via 132).

Upon receipt of the request or command, an applicable meta data handler (e.g., icon handler 260 or image/preview handler 250) at a remote source unit may facilitate providing the content of the requested meta data to the client device.

Upon receipt, the meta data cacher of the client device may cache the retrieved content of the meta data (e.g., icon of a file).

Figure 4B:
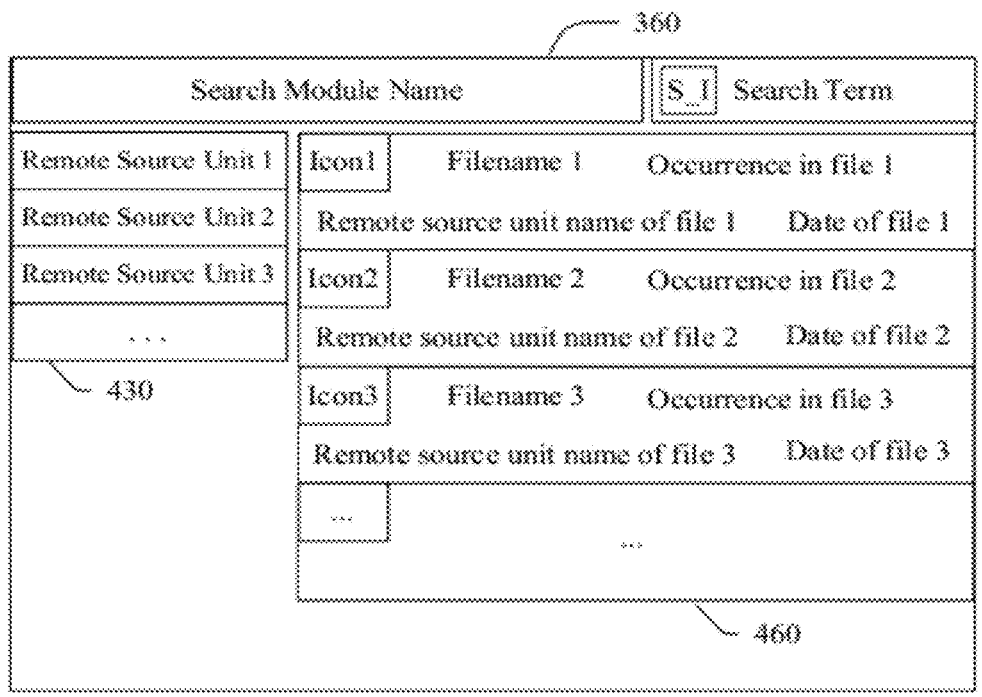
FIG. 4B illustrates an example of a display at a client device in accordance with one aspect of the subject technology.

As shown in FIG. 4B, upon completion of aggregating, ranking and retrieving the search results, the client device (e.g., 330 and 340) may facilitate displaying the consolidated and ranked search result (e.g., 460) for all remote source units onto UI 360. For example, as shown in FIG. 4B, a result aggregator module may facilitate providing to UI the filenames (e.g., Filename 1, Filename 2, Filename 3) and certain meta data (small in size) associated with the files such as the associated names of the remote source units where the files are found (e.g., Remote source unit name of file 1, Remote source unit name of file 2, Remote source unit name of file 3) and file creation dates (e.g., Date of file 1, Date of file 2, Date of file 3) and associated word frequency distribution for each file (e.g., Occurrence in file 1, Occurrence in file 2, Occurrence in file 3). A meta data cacher 340 may facilitate providing to UI certain meta data (large in size) associated with the files such as the icons (e.g., Icon1, Icon2, Icon3).

When a user clicks on a filename (e.g., Filename 1) and selects a file action such as printing, attaching to an email or opening a file, an action handler (e.g., 350) may detect the user action for the file, determine the applicable remote source unit, and facilitate sending a command to the applicable remote source unit.

Upon receipt, a file download handler (e.g., 240) of the applicable remote source unit may identify and facilitate providing the content of the requested file to the client device.

Upon receipt, the client device (e.g., action handler 350) may facilitate performing the requested action (e.g., printing, attaching, opening the file).

In one aspect, all or some information may be encrypted for transmission and decrypted upon receipt using, for example, encryption/decryption modules 290 and 390.

In one aspect, the remote source units may search, retrieve and transmit the non-public search results to a client device all in real-time (e.g., less than 1 hour, 30 minutes, 5 minutes or 1 minute depending on the amount of data searched) in response to a search query initiated by the client device.

Illustration 3

Figure 4C:
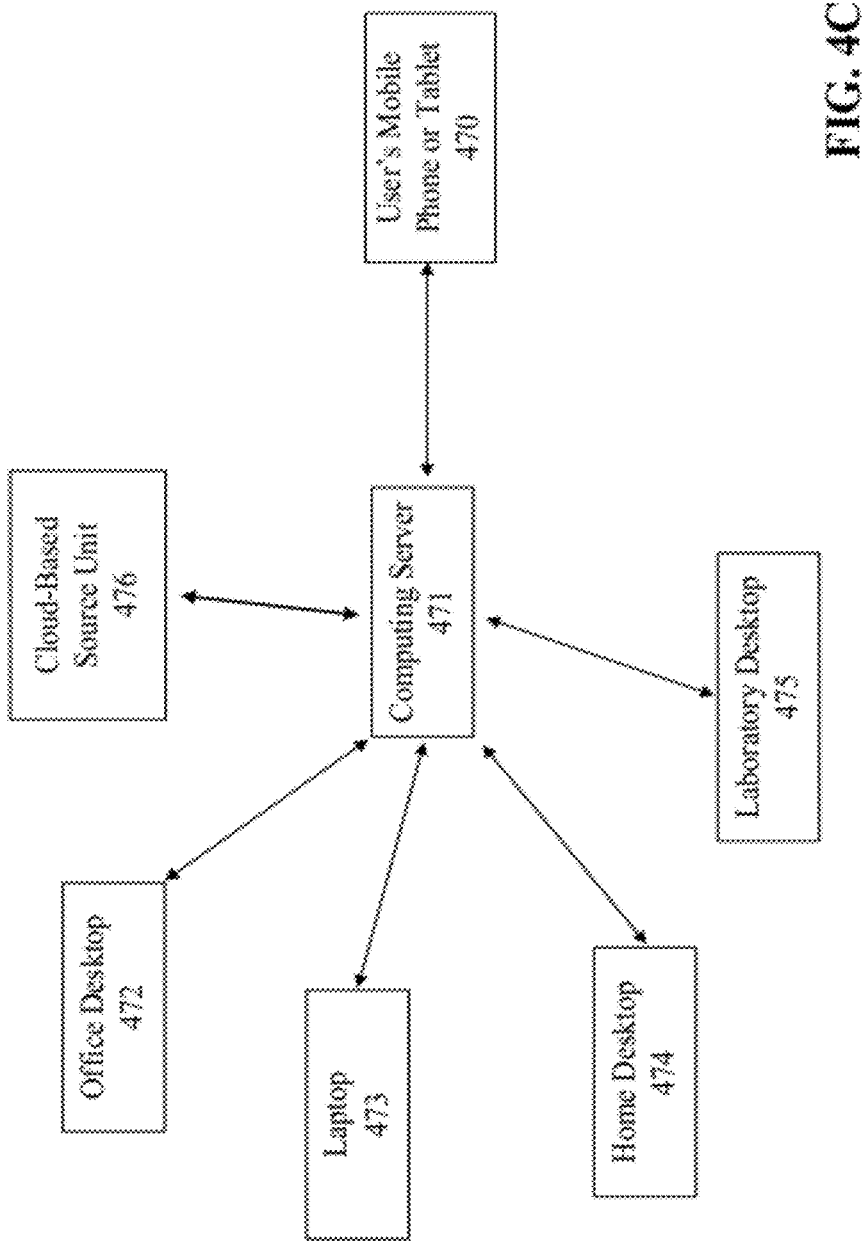
FIG. 4C illustrates an example of a network system according to one scenario.

In one advantageous aspect, an auto discovery server, remote source units and a client device are different and separate apparatus and located remotely from each other. Referring to FIG. 4C, in one advantageous example, a client device is a hand-held mobile device (e.g., a user's mobile phone or portable tablet 470), an auto discovery server is a stationary computing server 471, and the remote source units may be mobile or stationary computing devices. In one example, (not illustrated) the computing server 471 may be a component within the user's mobile phone or tablet 470. In the illustrated example, the remote source units may include the user's desktop computer 472 at the office, the user's laptop computer 473, the user's desktop computer 474 at home, a desktop computer 475 in a laboratory shared by multiple users, and a cloud-based source unit 476 belonging to the user. The cloud-based source unit 476 may be associated with an Internet-based document, image, music, or video storage system. The cloud-based source unit 476 may be associated with an online store or an online social networking service and may include content purchased from the online store or content posted to the online social networking service. The user's data is stored in each of the remote source units behind a firewall.

Furthermore, each of the office desktop 472, the laptop 473, the home desktop 474, the laboratory desktop 475, and the cloud-based source unit 476 may be associated with a privacy hurdle that the computing server needs to overcome in order to access the content stored in source units 472, 473, 474, 475, and 476. For example, to access data stored on the office desktop 472, the computing server 471 may need a corporate network certificate and a username or password of the user. To access data stored on the personal laptop 473 and the home desktop 474, the computing server 471 may need login credentials to the user's home network. To access data stored on the laboratory desktop 475, the computing server 471 may need a laboratory certificate. To access data stored on the cloud-based source unit 476, the computing server 471 may need a username and password of the user. The information needed to overcome the privacy hurdle may be stored on the user's mobile phone or tablet 470 or manually entered by the user via the mobile phone or tablet 470.

The user's data (e.g., files and folders) in the remote source units is non-public data in that such data is not accessible to the public and not searchable by a web search engine or web crawler. A copy of the data may have been published on a web server or some of the user's data stored in a remote source unit may have been copied from a web site. However, the data as stored in the remote source units behind a firewall or other privacy hurdle, as set forth above, may not be publically accessible or searchable.

The user's data (e.g., files and folders) in the remote source units is personal to the user as it may have been authored, created, stored, modified, printed, provided, copied, sent, received, viewed or otherwise acted on by the user or on behalf of the user or may have been made available to the user. In this scenario, a user may represent a group that the user belongs to or an organization or company of the user.

In one scenario, the user may have saved some word and presentation documents and emails on his office desktop 472, may have downloaded pictures and emails onto his laptop 473, may have saved drawings, pictures and games on his home desktop 474, and may have saved spreadsheets, drawings and analysis documents on the laboratory desktop 475. When the user is on the road and needs to review file(s) on one or more of the remote source units 472, 473, 474 and 475, the user can simply sign into an auto discovery module in the computing server 471 and input a search term to search all files in all of the remote source units simultaneously using a single search query.

Various Illustrations of Advantages

According to various aspects, the subject technology may provide, among others, the following advantages and benefits:

Allows all remote source units to be searched with a single query without having to transmit vast amounts of information ("distributed search"). Previous approaches did not allow users to initiate a distributed search.

Enable the searching client to automatically aggregate all results into one list of search results ordered by an arbitrary ranking system (e.g., match quality) (e.g., simply based on a ranking criteria selected by a search module without the user intervention or based on a ranking criteria selected by the user).

The users do not need to initiate a remote session (e.g., using a remote desktop protocol) to each remote machine. The search can be performed seamlessly on all available remote source units without the users having to identify them or determine whether they are available. This was not previously possible.

Do not require a user to make a conscious decision as to what locations should be searched. All available remote source units can be searched and the response to the user can be a consolidated view of the search results regardless of the location of the information.

Allow a user to access all the searched information. For example, the user is able to open/view a file that was part of the search results when the user simply clicks on the search results (e.g., without any other actions by the user of the client device or by the users/administrators of the remote source units).

In one advantageous aspect, the reporting in combination with other aspect(s) of the subject technology can enable a client device (e.g., 122, 120) to automatically and simultaneously discover all of the remote source units reported to the auto discovery module when a client device (e.g., 305, 122, 120) signs into the auto discovery module.

In one advantageous aspect, the reporting in combination with other aspect(s) of the subject technology (e.g., signing-in) can allow searching of non-public data on all of the remote source units simultaneously and seamlessly in real-time using a single search query. This can advantageously eliminate the need for the client device to initiate a separate secure remote session log-on with each of the remote source units (e.g., eliminate the need for a user to log in, search and log out of each of the remote source units separately and sequentially).

In one advantageous aspect, the reporting in combination with other aspect(s) of the subject technology (e.g., signing-in) can eliminate the need for the client device to mount each of the remote source units onto the client device and eliminate the need to transfer vast amounts of data between the remote source units and the client device over the bandwidth limited network channels.

In one advantageous aspect, the selective firewall disablement on the remote source units in combination with other aspect(s) of the subject technology (e.g., reporting or other aspects) can allow automatic access to the non-public data on the remote source units without jeopardizing the security of the non-public data on the remote source units and without requiring user/administrator intervention. This also advantageously allows a user of a client device to open, view, print, and/or attach a non-public file found in the remote source units by simply clicking on the search result (e.g., one or two clicks).

In one advantageous aspect, the reporting in combination with other aspect(s) of the subject technology (e.g., signing-in) can eliminate the need for a user to make a conscious cumbersome decision as to which remote source units should be searched.

In one advantageous aspect, the reporting by the remote source units can allow searching of the non-public data simultaneously with a single query regardless of the location of the non-public data or the remote source units.

In one advantageous aspect, the signing-in by a client device to an auto discovery module can allow searching of the non-public data simultaneously with a single query regardless of the location of the originating source or the client device.

In one advantageous aspect, the reporting by the remote source units and the signing-in and result-aggregating actions by a client device can allow a client device to automatically aggregate the non-public search results into one consolidated list for all search results from all of the remote source units ordered by a ranking system.

In one advantageous aspect, the search results include meta data indicators (particularly for large meta data such as an icon or image) such that a client device (e.g., 340) can determine whether a file found is represented with large meta data, and if so, retrieving such large meta data and caching it so that it may be re-used without re-retrieving it from remote source units over the bandwidth limited network. This provides efficient remote computing.

In one advantageous aspect, the reporting and the selective firewall disablement in combination with other aspect(s) of the subject technology can allow searching of original non-public data (rather than web pages that contain public data) located at multiple remote source units simultaneously in response to a search query (rather than searching copies of the non-public data that have been retrieved prior to making the search query).

Example of Computing Device

Figure 5:
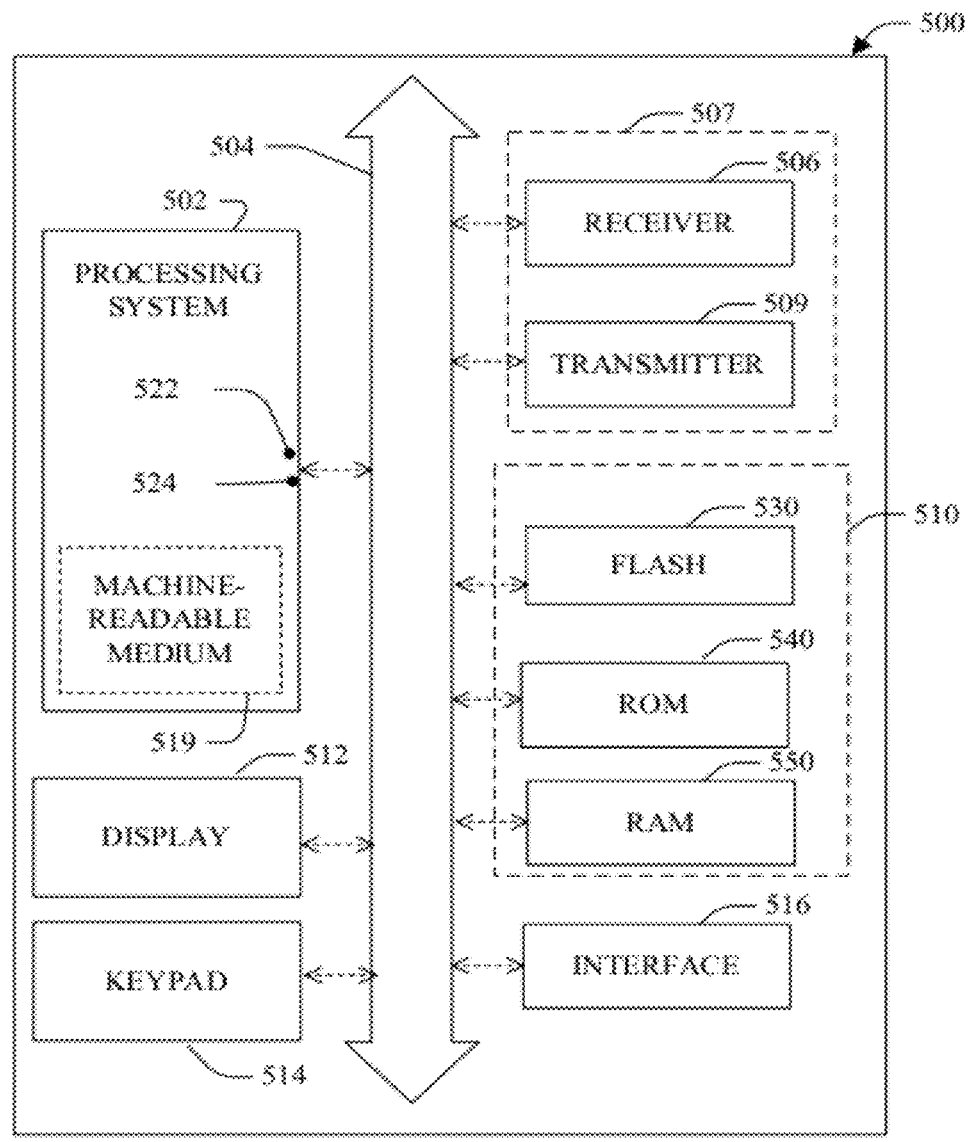
FIG. 5 is a conceptual block diagram illustrating an example of a computing device.

FIG. 5 is a conceptual block diagram illustrating an example of a computing device.

A computing device 500 may be, for example, a client device 120, an auto discovery server 130, or any of remote source units 140A through 140N. A computing device may comprise one or more computing devices.

A computing device 500 may include a processing system 502. The processing system 502 is capable of communication with a receiver 506 and a transmitter 508 through a bus 504 or other structures or devices. It should be understood that communication means other than busses could be utilized with the disclosed configurations. The processing system 502 can generate audio, video, multimedia, and/or other types of data to be provided to the transmitter 509 for communication. In addition, audio, video, multimedia, and/or other types of data can be received at the receiver 506, and processed by the processing system 502.

The processing system 502 may include a general-purpose processor or a specific-purpose processor for executing instructions and may further include a machine-readable medium 519 for storing data and/or instructions for software programs. The instructions, which may be stored in a machine-readable medium 510 and/or 519, are executable by the processing system 502 to control and manage access to the various networks, as well as provide other communication and processing functions. The instructions may also include instructions executable by the processing system 502 for various user interface devices, such as a display 512 and a keypad 514. The processing system 502 may include an input port 522 and an output port 524. Each of the input port 522 and the output port 524 may include one or more ports. The input port 522 and the output port 524 may be the same port (e.g., a bi-directional port) or may be different ports.

The processing system 502 may be implemented using software, hardware, or a combination of both. By way of example, the processing system 502 may be implemented with one or more processors. A processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, and/or any other suitable device that can perform calculations or other manipulations of information. Those skilled in the art will recognize how best to implement the described functionality for the processing system 502.

Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code). Instructions may be executable, for example, by a computing device (e.g., a client device, an auto discovery server or a remote source unit) or by a processing system (e.g., a processing system of a client device, an auto discovery server or a remote source unit). Instructions can be, for example, a computer program including code.

A machine-readable medium can be one or more machine-readable media. A machine-readable medium (e.g., 510) may include storage external to a processing system, such as a random access memory (RAM) 550, a flash memory 530, a read only memory (ROM) 540, a programmable read-only memory (PROM), an erasable PROM (EPROM), registers, a hard disk, a removable disk, a CD-ROM, a DVD, or any other suitable storage device. A machine-readable medium 519 may also have a volatile memory and a non-volatile memory. A machine-readable medium 519 may include storage integrated into a processing system, such as might be the case with an application specific integrated circuit (ASIC). A memory may be a machine-readable medium (e.g., 510 or 519) or a part thereof.

According to one aspect of the disclosure, a machine-readable medium is a machine-readable medium encoded or stored with instructions and is a computing element, which defines structural and functional interrelationships between the instructions and the rest of the computing device, which permit the instructions' functionality to be realized. In one aspect, a machine-readable medium is a non-transitory machine-readable medium, a machine-readable storage medium, or a non-transitory machine-readable storage medium. In one aspect, a machine-readable medium is a machine-readable medium, a non-transitory machine-readable medium, a computer-readable storage medium, or a non-transitory computer-readable storage medium. A non-transitory medium may include one or more volatile and/or non-volatile memories.

An interface 516 may be any type of interface and may reside between any of the components shown in FIG. 5. An interface 516 may also be, for example, an interface to the outside world (e.g., an Internet network interface). A transceiver block 507 may represent one or more transceivers, and each transceiver may include a receiver 506 and a transmitter 509. A functionality implemented in a processing system 502 may be implemented in a portion of a receiver 506, a portion of a transmitter 509, a portion of a machine-readable medium 510, a portion of a display 512, a portion of a keypad 514, or a portion of an interface 516, and vice versa. In one aspect, a computing device may include only some or all of the elements shown in FIG. 5. A computing device may include other elements not shown in FIG. 5. A computing device may include more than one of the same elements.

Example of Network Systems

Figure 6A:
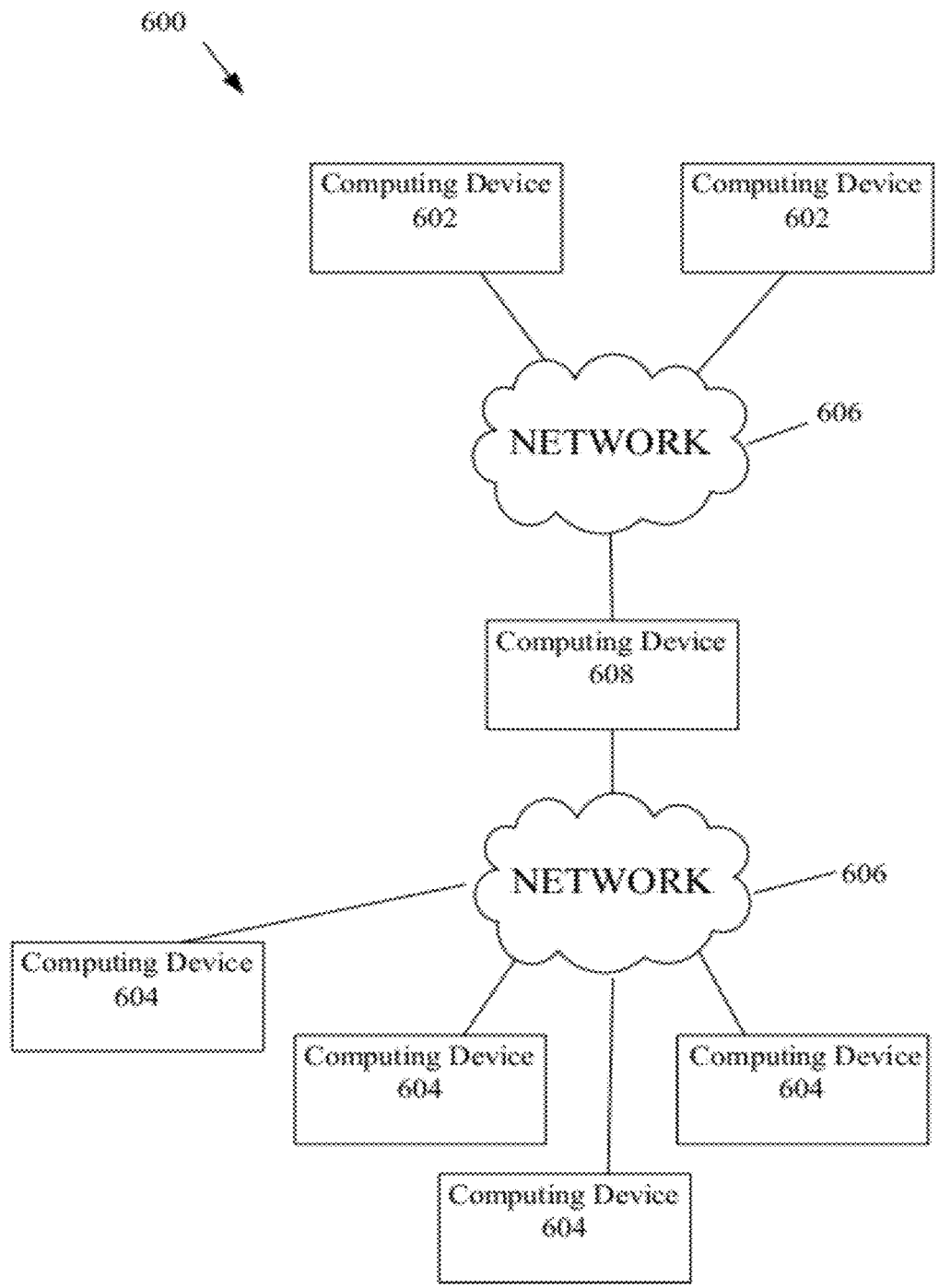
FIG. 6A is a diagram of an example of a network system.

FIG. 6A is a diagram of an example of a network system. A system 600 may include one or more computing devices 602 (e.g., client devices 120) for communicating with one or more computing devices 604 (e.g., remote source units 140A through 140N) via one or more computing devices 608 (e.g., auto discovery server 130) and one or more networks 606. The networks 606 may be the same or different networks.

Figure 6B:
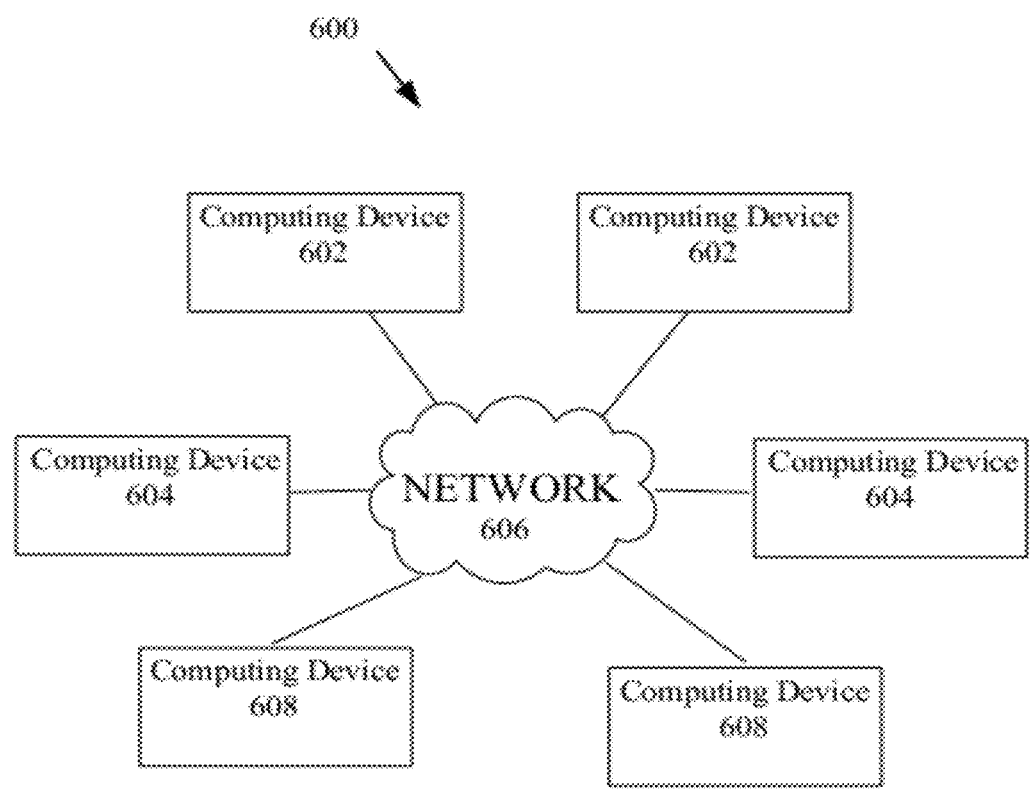
FIG. 6B is a diagram of another example of a network system.

FIG. 6B is a diagram of another example of a network system. A system 600 may include one or more computing devices 602 (e.g., client devices 120), one or more computing devices 604 (e.g., remote source units 140A through 140N) and one or more computing devices 608 (e.g., auto discovery server 130) for communicating via a network 606. In yet another example, computing devices 604 may be connected in a serial fashion.

By way of illustration and not limitation, a computing device 602 can represent a mobile phone, a portable tablet, a hand-held device, a laptop computer, a thin computing device, a personal digital assistant (PDA), a portable computing device, or a suitable device with a processor. In one example, a computing device 602 may be a smartphone (e.g., iPhone™, Android™ phone, Blackberry™, etc.). In certain configurations, a computing device 602 can represent an audio player, a game console, a camera, a camcorder, an audio device, a video device, a multimedia device, or a device capable of supporting a connection to a remote source unit. In a preferred example, a computing device 602 is mobile. In one advantageous aspect, a computing device 602 is a handheld device. In another example, a computing device 602 can be stationary. According to one aspect of the disclosure, a computing device 602 may be a device having at least a processor and memory, where the total amount of memory of the computing device 602 is less than the total amount of memory in a computing device 604 or 608. In one example, a computing device 602 does not have a hard disk. In one aspect, a computing device 602 has a display smaller than a display supported by a computing device 604 or 608.

In one aspect, a computing device 604 or 608 represents a computer. In another aspect, a computing device 604 or 608 may represent a laptop computer, a computing device, a virtual machine (e.g., VMware® Virtual Machine), a desktop session (e.g., Microsoft Terminal Server), a published application (e.g., Microsoft Terminal Server) or a suitable device with a processor. In one example, a computing device 604 or 608 is stationary. In another aspect, a computing device 604 or 608 can be mobile. In certain configurations, a computing device 604 or 608 may be any device that can represent a client device.

In one aspect, a computing device may include one or more computing devices.

In one example, a first device is remote to a second device when the first device is not directly connected to the second device. In one example, a first remote source unit may be connected to a second device over a communication network.

When a computing device 602, a computing device 608 and a computing device 604 are remote with respect to one another, a computing device 602 may connect to a computing device 608 over a network 606, and a computing device 604 may connect to a computing device 608 over a network 606 via a network connection, for example, a modem connection, a local area network (LAN) connection including the Ethernet or a broadband wide area network (WAN) connection including DSL, Cable, T1, T3, Fiber Optics, Wi-Fi, or a mobile network connection including GSM, GPRS, 3G, WiMax or other network connection. A network 606 can be a LAN network, a WAN network, a wireless network, the Internet, an intranet or other network. A computing device (e.g., 120, 130, or any of 140A-140N) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. But the subject technology is not limited to these examples.

In one aspect, the terms "local" and "remote" are relative terms, and a computing device may be referred to as a local computing device or a remote computing device, depending on whether a computing device is on one side of a network or on another side of the network.

For example, a client device may be referred to as a local device or a remote source unit, depending on whether a client device is described from a client side (e.g., 120) or from a server side (e.g., 130) or a remote source unit's side (e.g., 140A). A remote source unit (e.g., 140A) may be referred to as a local device or a remote source unit, depending on whether a remote source unit is described from the remote source unit' side (e.g., 140A) or from a client (e.g., 120) or server side (e.g., 130). Similarly, an auto discovery server may be referred to as a local server or a remote server, depending on whether a server is described from a server side or from a client side or a remote source unit's side.

Furthermore, an application running on a remote source unit may be referred to as a local application, if described from a remote source unit's side, and may be referred to as a remote application, if described from a client side or a server side.

In one aspect, devices placed on a client side (e.g., devices connected directly to a client device(s) or to one another using wires or a short range wireless connection (e.g., Bluetooth)) may be referred to as local devices with respect to a client device 120 and remote source units with respect to remote locations 140A through 140N or auto discovery server 130. Similarly, devices placed on a remote location (e.g., devices connected directly using wires or a short-range wireless connection) to a remote source unit 140A may be referred to as local devices with respect to the remote source unit 140A.

Web Browser Window Displaying Search Results

FIG. 7 illustrates an example of a web browser window 700 displaying search results in accordance with one aspect of the subject technology.

As shown, the web browser window 700 includes a title bar 702, a close button 704, a search box 706, a search results counter 708, search control regions 710, 712, and 714, and a search results region 716.

The title bar 702 may include a title of a web page being displayed in the web browser window 700, for example, "PRIVATE SEARCH SERVICE." In one example, the web browser window 700 may include one or more web browser tabs, and a title of the active tab may be displayed in the title bar 702.

The close button 704, when selected, may be configured to cause the web browser window 700 to close. The close button 704 may be selected, for example, by clicking the close button 704 with a mouse, touching the close button 704 via a touch screen, or clicking a hot key associated with the close button 704 on a keyboard.

The search box 706 may be configured to allow a user to enter a search query, for example, a text query. As illustrated, the user has entered the query "rabbit" in the search box 706. The user may cause a search based on the search query in the search box 706 to run, for example, by clicking the "Enter" or "Return" key while the text cursor is in the search box or by clicking a "Search" button (not illustrated).

The search results counter 708 may be configured to display a number of search results found, based on the search query. As illustrated, the search results counter 708 indicates that five results have been found. It should be noted that five search results appear in the search results region 716.

The search control regions 710, 712, or 714 may include one or more radio buttons or check boxes configured to control the search. The search may be directed to personal or non-public data sources, for example, personal computing devices, personal cloud source units, a corporate intranet, a computing device shared by a small number of users (e.g., less than 100 users) that may not be accessible to the public at large, or a personal storage area within an email account, an online calendar account, a social networking service, an online document management account, etc.

As shown, the search control region 710 allows a user to select which personal or non-public locations are to be searched via a check box interface. The user may be able to direct the search to one or more of a "home desktop," a "web-storage.com cloud drive," an "ABC Corporation Intranet," and a "biology lab computer." The user may have access to each of these sources and may have access to a privacy hurdle, e.g., a username and password or a certificate, to access each of these sources. For example, the user may have a certificate for ABC Corporation Intranet and may know the username and password to access web-storage.com cloud drive. The certificate or username and password may be stored in association with the web-browser window or the user may provide the certificate or username and password in response to a prompt after initiating the search. The prompt may appear in a web browser pop-up.

The search control region 712 allows a user of the web browser window 700 to select whether the user desires the search results to includes files and folders or files only via a check box interface. The search control region 714 allows a user of the web browser window 700 to select whether the user desires to search based on filename only or based on file text.

As illustrated, the search results region 716 includes a set of search results 718, 720, 722, 724, and 726. While five search results are indicated, the subject technology may be implemented with any number of search results. A name, a location, a file size, and a date modified of each search result may be displayed. In one example, the search results in the search results region may be arranged according to an order, e.g., an order of relevance to the search query in the search box 706, an order based on the name, an order based on the location, an order based on the file size, or an order based on the date modified. The relevance to the search query in the search box 706 may be calculated using any technique. For example, the relevance may be based on the number of times the text of the search query appears in the file or how frequently the file is accessed. Alternatively, the search results 718, 720, 722, 724, or 726 may be displayed according to an arbitrary order. In one implementation, the search results may be provided in real-time and updated in real-time after more search results are found. For example, the client computing device displaying the web browser window 700 may first receive search results 718 and 726 from the home desktop, and later receive search result 720 from web-storage.com. Upon receiving result 720, the client computing device may facilitate updating the data displayed in the web browser window to include the search results 718, 720, and 726. One example of a process by which a displayed set of search results may be updated based on additional received search results is described below in conjunction with FIG. 12.

While web browser window 700 illustrates one format in which a search query may be entered and search results may be displayed, persons skilled in the art will, undoubtedly, recognize other formats in which a search query may be entered and search results may be displayed. For example, a special purpose application, e.g., a mobile phone or tablet computer application, may be used to enter the search query and display the search results in place of a web browser window 700. Alternatively, the web browser window 700 may lack a search results counter 708 or search control regions 710, 712, and 714. In one implementation, the format in which the search query may be entered and in which the results may be displayed is determined based on one or more of the screen size of the client device, the hardware of the client device, or the software installed on the client device. For example, results may be displayed in a different format on each of a laptop/desktop computer client device, a tablet computer client device, or a mobile phone/personal digital assistant (PDA) client device.

Interface for Interacting with a Search Result

FIG. 8 illustrates an example of the web browser window 700 displaying an interface for interacting with a search result in accordance with one aspect of the subject technology.

As shown, the user has placed a mouse cursor 802 over a region of the web browser window 700 associated with search result 724 "bunny-rabbit.doc." In response to the user placing and holding the mouse cursor 802 over the region associated with the search result 724, the web browser window may display an interface element, e.g., hover card 804, for interacting with the search result 724. As shown, the hover card 804 includes a view link 806, an edit link 808, a print link 810, and a share link 812. The view link 806, when selected, may cause the file associated with search result 724 to be displayed. The edit link 808, when selected, may cause the file associated with search result 724 to be presented for editing. The print link 810, when selected, may cause an interface for printing the file associated with the search result 724 to be presented or for the file associated with the search result 724 to be printed via a default printer. The share link 812, when selected, may cause an interface for sharing the file associated with the search result 724 to be presented. The file associated with the search result 724 may be shared, for example, via email, via instant messaging, or via a local or long-range network-based sharing protocol.

While the hover card 804 is one format in which the user may interact with a search result, persons skilled in the art will recognize other formats in which a user may interact with a search result. For example, the links 806, 808, 810, or 812 may be replaced with different links; a web browser pop-up may replace the hover card 804; or clicking on the filename of a search result may cause the file associated with the search result to open.

Process by which a Remote Source Unit including Non-Public Data may be Searched

Figure 9A:
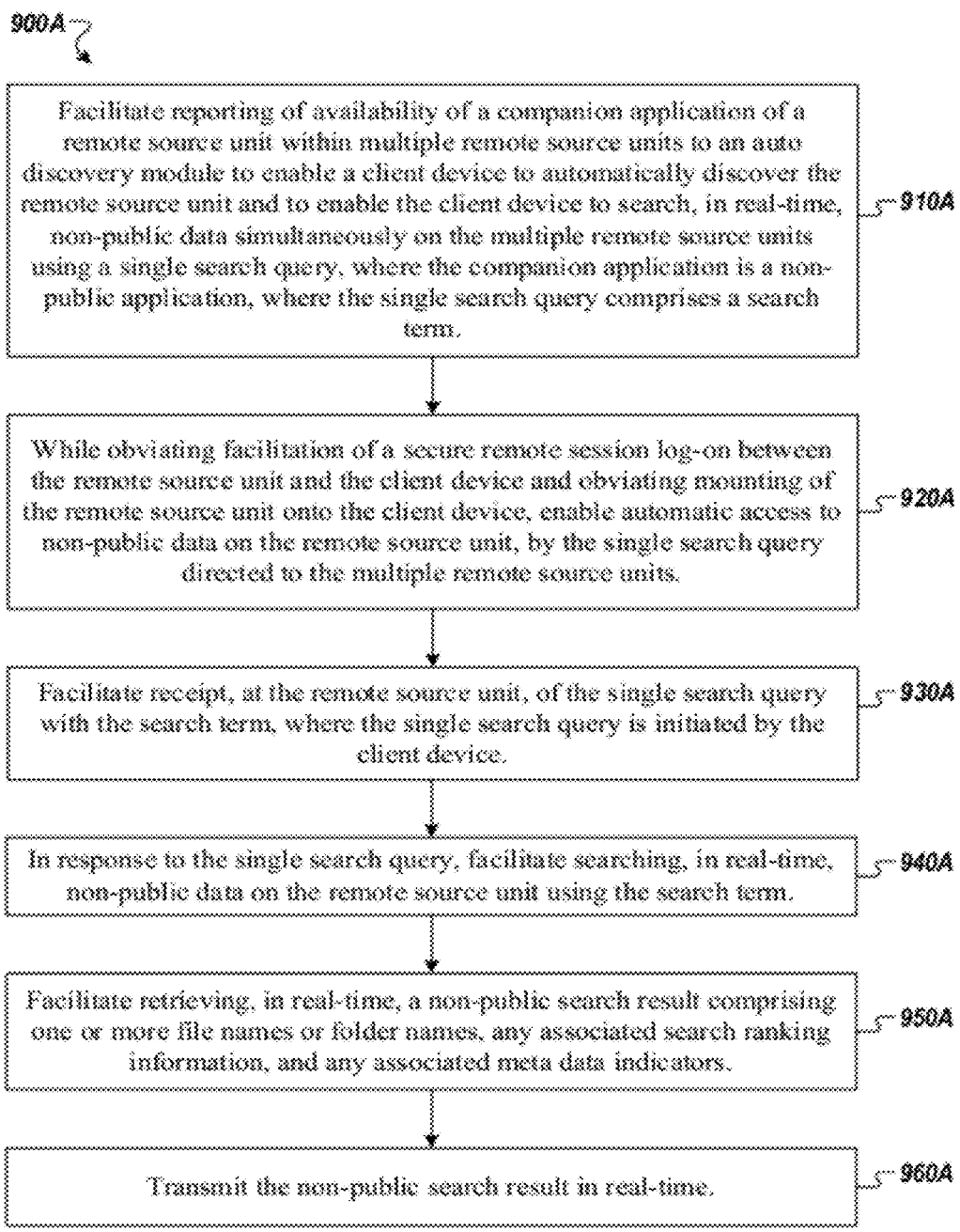
FIG. 9A illustrates an example of a process by which a remote source unit including non-public data may be searched in accordance with one aspect of the subject technology.

FIG. 9A illustrates an example of a process 900A by which a remote source unit including non-public data may be searched, for example, based on a request from a client device, in accordance with one aspect of the subject technology. The remote source unit may be one of multiple remote source units. The remote source unit may include one or more of a remote personal computing device, a corporate intranet, a network-based source unit for non-public data, e.g., a personal cloud drive, an email account, an online calendar account, an online photograph source unit, a social networking account, etc.

The process 900A begins at step 910A, where the remote source unit facilitates reporting of availability of a companion application to an auto discovery module to enable a client device to automatically discover the remote source unit and to enable the client device to search, in real-time, non-public data simultaneously on multiple remote source units using a single search query. The auto discovery module may be within the client device or external to the client device. The companion application may be a non-public application. The single search query may include one or more search terms. The companion application may also be configured to search the file system of the remote source unit or the data stored on the remote source unit in association with an account based on a search query. The search query may include one or more search terms.

In step 920A, the remote source unit, while observing facilitation of a secure remote session log-on between the remote source unit and the client device and obviating mounting of the remote source unit onto the client device, enables automatic access to non-public data on the remote source unit by the single search query directed to the multiple remote computing devices.

In step 930A, the remote source unit, facilitates receipt of the single search query with the one or more search terms initiated by the client device. In one example, the search term may be accompanied by additional information, e.g., an indication whether only filenames or filenames and file content are to be searched or whether only files or files and folders are to be searched.

In step 940A, the remote source unit, in response to the single search query, facilitates searching, in real-time, non-public data using the search term. The non-public data that is searched may include non-public data stored in the remote source unit. The non-public data may be accessible to a user of a client device, but not accessible to the public at large, e.g., a member of the public who does not know a password that is known by the user or who lacks a certificate or token that is stored on the client device. Real time may refer to, for example, less than 1 hour, 30 minutes, 5 minutes or 1 minute depending on the amount of data searched.

In step 950A, the remote source unit retrieves, in real-time, a non-public search result comprising one or more file names or folder names, any associated search ranking information, and any associated meta data indicators. For example, if the search term is "rabbit," the remote source unit may search for files having the string "rabbit" in the file name, for example, rabbit.txt or bob-rabbit-x.jpg.

In step 960A, the remote source unit transmits the non-public search result in real-time. The remote source unit may transmit the non-public search result either to the auto discover module (e.g., auto discovery module 132) for forwarding to the client device (e.g., client device 120) in real time or directly to the client device. Real time may refer to, for example, less than 1 hour, 30 minutes, 5 minutes or 1 minute depending on the amount of data transmitted. After step 960A, the process 900A ends.

Figure 9B:
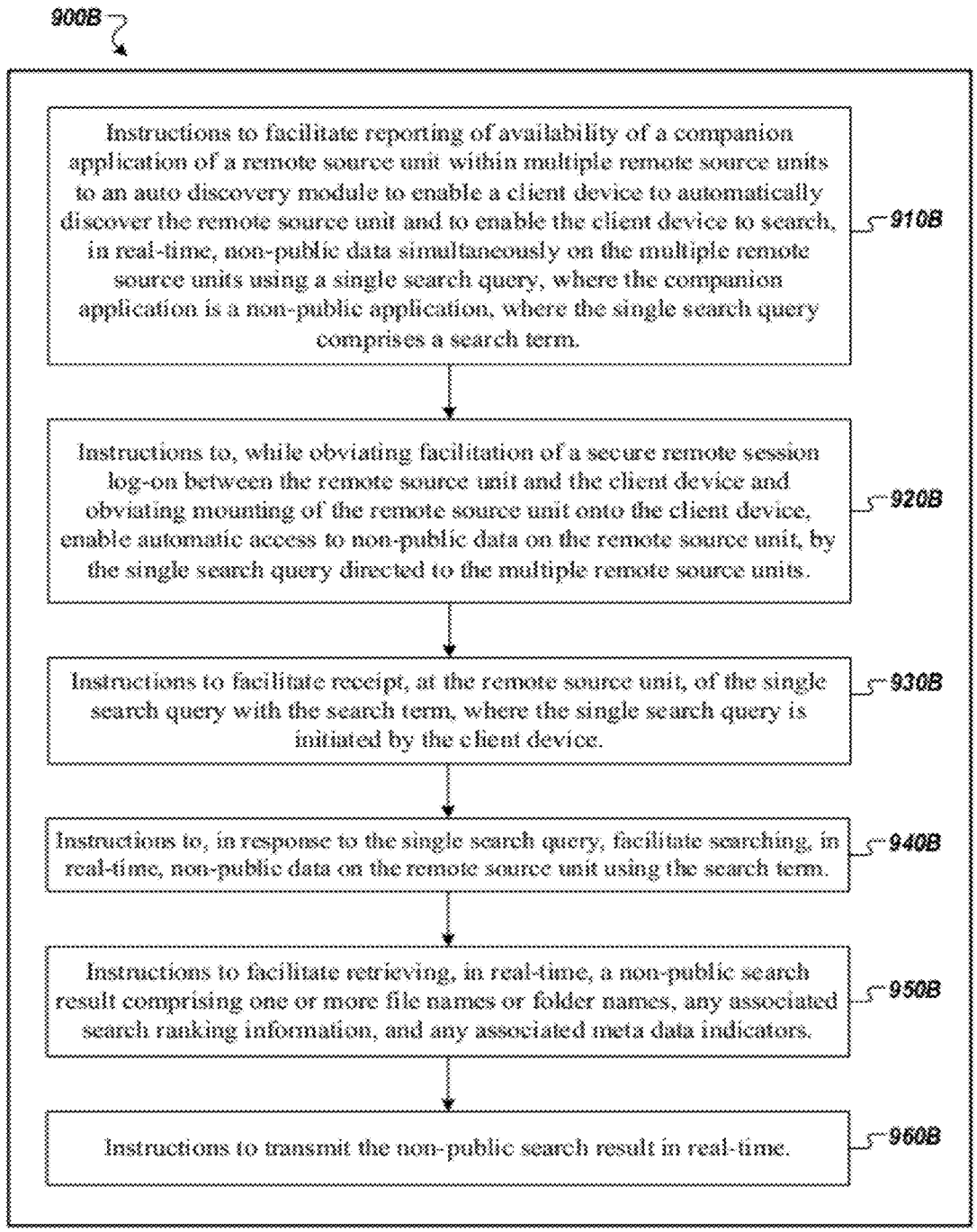
FIG. 9B illustrates an example of a device including instructions by which a remote source unit including non-public data may be searched in accordance with one aspect of the subject technology.

Device with Instructions for Process by which a Remote Source Unit including Non-Public Data may be Searched FIG. 9B illustrates an example of a device 900B.

The device 900B may include instructions 910B to facilitate reporting of availability of a companion application of a remote source unit within multiple remote source units to an auto discovery module to enable a client device to automatically discover the remote source unit and to enable the client device to search, in real-time, non-public data simultaneously on the multiple remote source units using a single search query, where the companion application is a non-public application, where the single search query comprises a search term.

The device 900B may include instructions 920B to, while obviating facilitation of a secure remote session log-on between the remote source unit and the client device and obviating mounting of the remote source unit onto the client device, enable automatic access to non-public data on the remote source unit, by the single search query directed to the multiple remote source units.

The device 900B may include instructions 930B to, while obviating facilitation of a secure remote session log-on between the remote source unit and the client device and obviating mounting of the remote source unit onto the client device, enable automatic access to non-public data on the remote source unit, by the single search query directed to the multiple remote source units.

The device 900B may include instructions 940B to, in response to the single search query, facilitate searching, in real-time, non-public data on the remote source unit using the search term.

The device 900B may include instructions 950B to facilitate retrieving, in real-time, a non-public search result comprising one or more file names or folder names, any associated search ranking information, and any associated meta data indicators.

The device 900B may include instructions 960B to transmit the non-public search result in real-time.

Figure 9C:
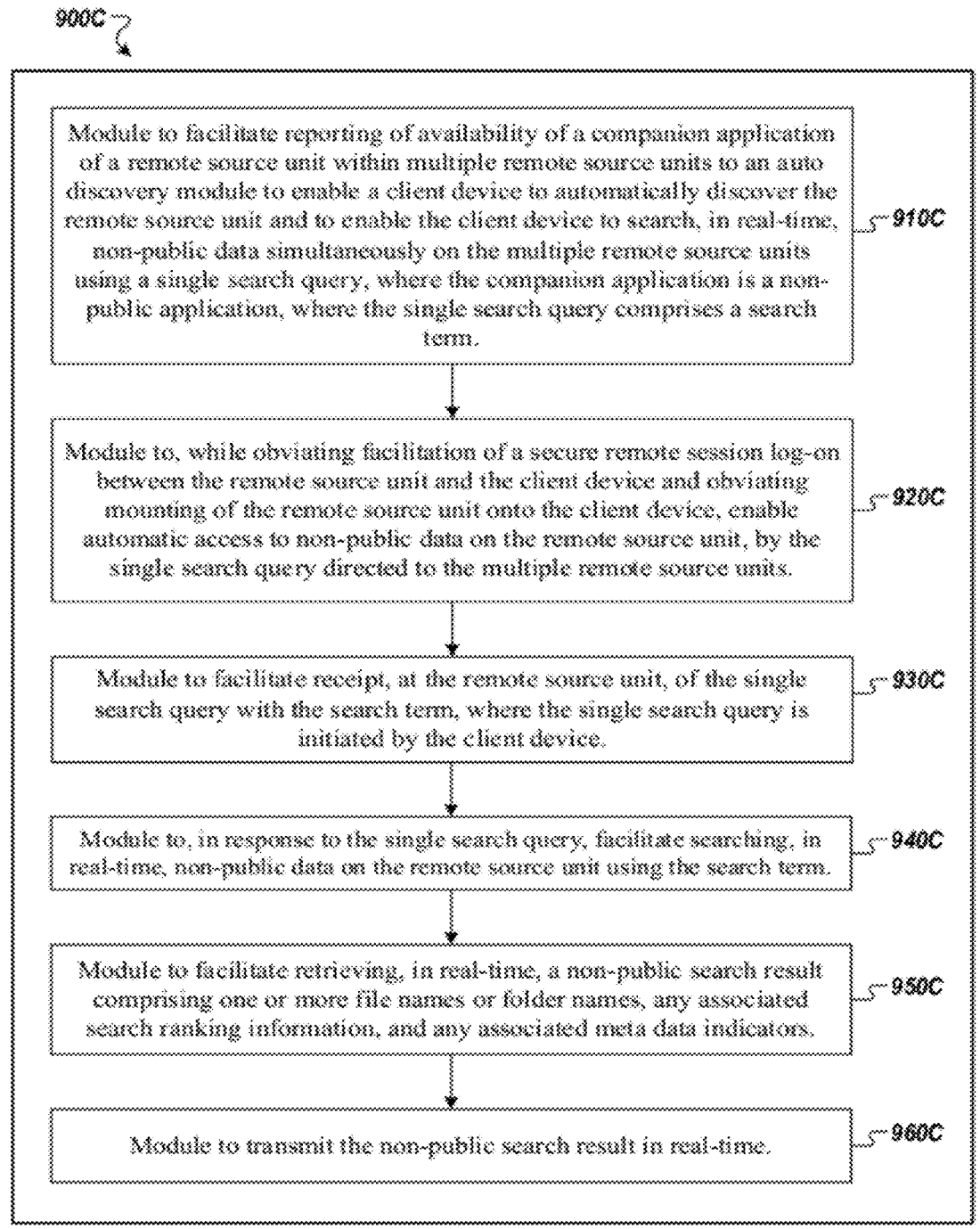
FIG. 9C illustrates an example of a device including modules by which a remote source unit including non-public data may be searched in accordance with one aspect of the subject technology.

Device with Modules for Process by which a Remote Source Unit including Non-Public Data may be Searched FIG. 9C illustrates an example of a device 900C.

The device 900C may include one or more modules 910C to facilitate reporting of availability of a companion application of a remote source unit within multiple remote source units to an auto discovery module to enable a client device to automatically discover the remote source unit and to enable the client device to search, in real-time, non-public data simultaneously on the multiple remote source units using a single search query, where the companion application is a non-public application, where the single search query comprises a search term.

The device 900C may include one or more modules 920C to, while obviating facilitation of a secure remote session log-on between the remote source unit and the client device and obviating mounting of the remote source unit onto the client device, enable automatic access to non-public data on the remote source unit, by the single search query directed to the multiple remote source units.

The device 900C may include one or more modules 930C to, while obviating facilitation of a secure remote session log-on between the remote source unit and the client device and obviating mounting of the remote source unit onto the client device, enable automatic access to non-public data on the remote source unit, by the single search query directed to the multiple remote source units.

The device 900C may include one or more modules 940C to, in response to the single search query, facilitate searching, in real-time, non-public data on the remote source unit using the search term.

The device 900C may include one or more modules 950C to facilitate retrieving, in real-time, a non-public search result comprising one or more file names or folder names, any associated search ranking information, and any associated meta data indicators.

The device 900C may include one or more modules 960C to transmit the non-public search result in real-time.

Figure 10A:
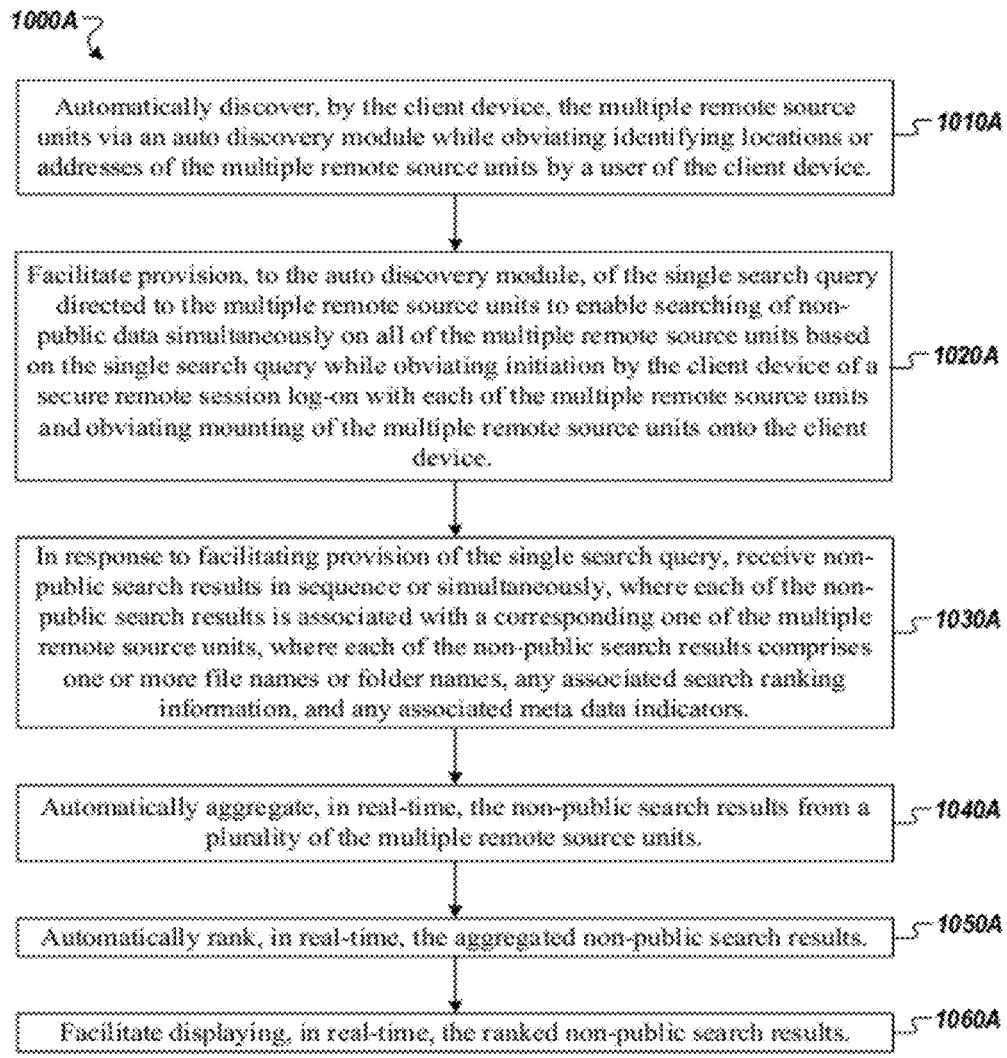
FIG. 10A illustrates an example of a process by which a client device may search non-public data on multiple remote source units in accordance with one aspect of the subject technology.

Process by which a Client Device may Search Non-Public Data on Multiple Remote Source Units FIG. 10A illustrates an example of a process 1000A by which a client device may search non-public data on multiple remote source units in accordance with one aspect of the subject technology. The client device may be signed into an auto discovery module (e.g., auto discovery module 132). The auto discovery module may reside within an auto discovery server (e.g., auto discovery server 130) external to the client device. Alternatively, the auto discovery module may be a component in an application of the client device. For example, the auto discovery module may be a component within a web browser application or within a software application independent of the web browser.

The process 1000A begins at step 1010A, where the client device automatically discovers the multiple remote source units via the auto discovery module. The multiple remote source units may include physical source units, e.g., a remote laptop or desktop computer or a remote home or office network source unit, or virtual source units, e.g., a cloud drive or a source unit in an email or social networking account. The client device may obviate identifying locations or addresses of the multiple remote source units by a user of the client computing device. For example, the client device may store the addresses of the remote source units. Alternatively, the auto discovery server may store the addresses of the remote source units. In one implementation, one or more of the remote source units may be virtual source units (e.g., a cloud drive) that is not necessarily associated with a specific physical address.

In step 1020A, the client device facilitates providing, to the auto discovery module, of the single search query directed to the multiple remote source units to enable searching of the non-public data simultaneously on all of the multiple remote source units based on the single search query while obviating initiation by the client device of secure remote session log-on with each of the multiple remote source units onto the client device. In one example, each remote source unit may be associated with a privacy hurdle. For example, a cloud drive may require a username and a password to log-on. A remote office network source unit may require a certificate or a token to log-on. The information necessary to overcome the privacy hurdle, e.g., the certificate, the token, or the username and password, may be stored on the client device or on the auto discovery server in association with the account of the user of the client device. As a result, the client device or the auto discovery server may be able to access the remote source unit.

In step 1030A, the client device, in response to the single search query, receives non-public search results in sequence or simultaneously. Each of the non-public search results may be associated with a corresponding one of the multiple remote computing devices. Each of the non-public search results may include one or more file names or folder names. The non-public search results may further include search ranking information or metadata indicators. Example search ranking information may include how often a search term appears in the search result or a frequency with which the search result is accessed. Example metadata indicators may include a location of the file, a file size, a date of file creation, file modification, or file access.

In step 1040A, the client device automatically aggregates, in real-time, the non-public search results from a plurality of the multiple remote source units. The client device may aggregate the non-public search results from all or a portion of the multiple remote source units. The aggregated collection of non-public search results may include results from two or more remote source units. Real time may refer to, for example, less than 1 hour, 30 minutes, 5 minutes or 1 minute depending on the amount of data aggregated.

In step 1050A, the client device automatically ranks, in real-time, the aggregated non-public search results. In one implementation, the client device may rank the aggregated non-public search results according to relevance to the search term or the search query, e.g., by how many times the search term(s) in the search query appears in the file or by a frequency with which the file is accessed. In one implementation, the order may involve interlacing search results from different remote source units. Real time may refer to, for example, less than 1 hour, 30 minutes, 5 minutes or 1 minute depending on the amount of data ranked.

In step 1060A, the client device facilitates displaying, in real-time, the ranked non-public search results. The search results may be displayed on a screen of the client device, for example, in a web browser window or in special purpose application window, for example, a window of an application on a mobile phone or a tablet computer. After step 1060A, the process 1000A ends.

In some aspects, a client device can request for more or additional information (e.g., in step 1060A). This process may occur as needed by the client device. For instance, a client device can request (e.g., an auto discovery module, or one or more remote source units) more or additional information on one or more search results that were received initially or thereafter. In response, the client device may receive the requested information (additional search results, or additional information about one or more search results) from the auto discovery module or the remote source unit(s).

In some aspects, one or more remote source units (or each unit) may receive one or more requests for more or additional information. For instance, one or more remote source units (or each unit) may receive one or more requests for more or additional information on one or more search results that were provided initially or thereafter. In response, one or more remote source units (or each unit) may provide the requested information. As an example, one or more remote source units (or each unit) may, by default, provide only the top 10 results to minimize the amount of traffic. One or more remote source units (or each unit) may do this initially, and then provide the next 10 best results in response to each subsequent request.

In some aspects, an auto discovery module may perform the above-mentioned actions.

In some aspects, the client device may present subsets of files or folders, in addition to or in place of files or folders, if the client device has appropriate settings and/or permissions. For example, the client computing device may present portions of a file (e.g., sections of a word processing documents) or file labels within a folder that are associated with the search query. For example, if the search query is "elephant," the search results may include a section in a document may be titled "baby-elephant" and/or a label of files within a folder titled "elephant-safari."

Figure 10B:
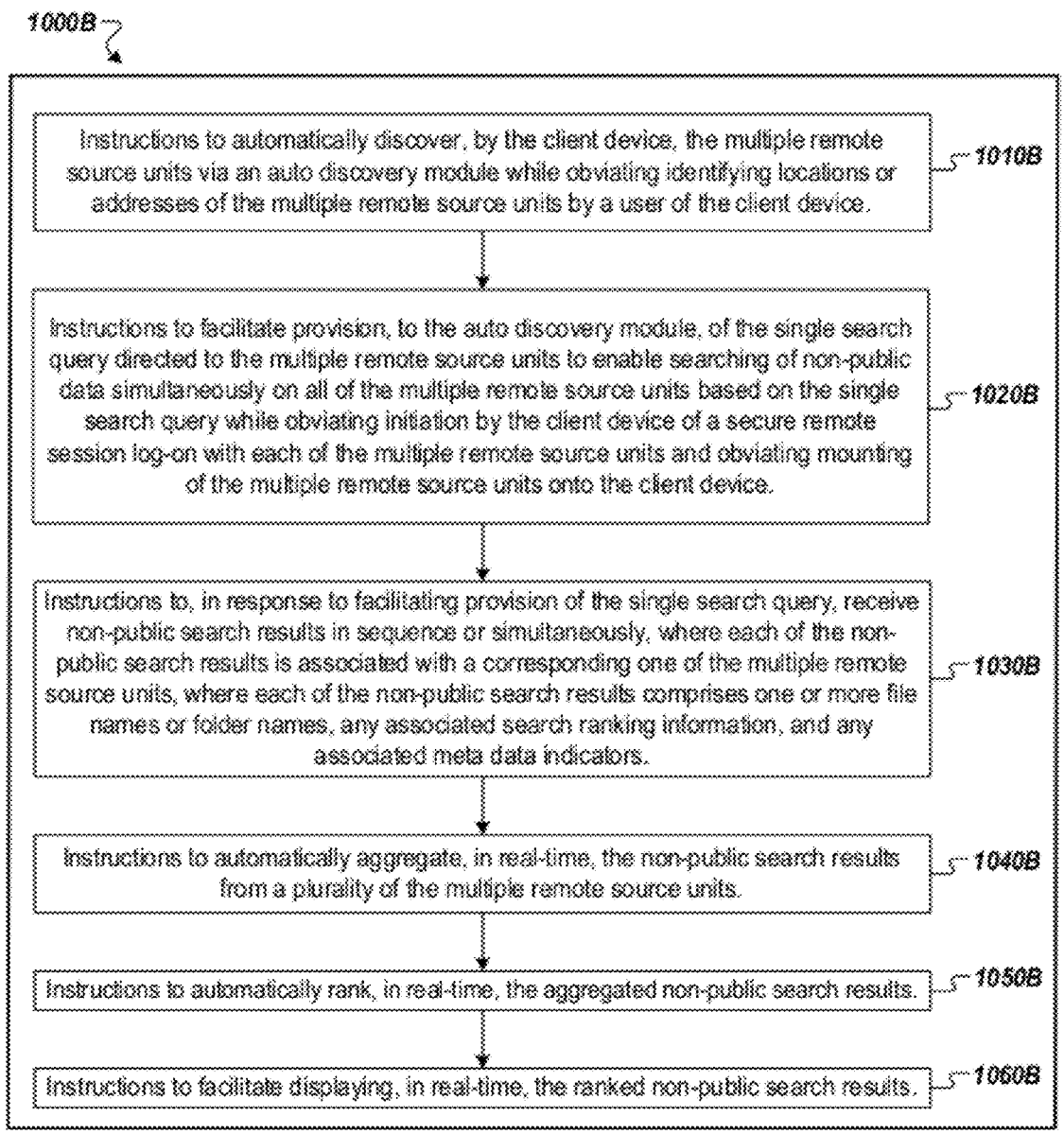
FIG. 10B illustrates an example of a device including instructions by which a client device may search non-public data on multiple remote source units in accordance with one aspect of the subject technology.

Device with Instructions for Process by which a Client Device may Search Non-Public Data on Multiple Remote Source Units FIG. 10B illustrates an example of a device 1000B.

The device 1000B may include instructions 1010B to automatically discover, by the client device, the multiple remote source units via an auto discovery module while obviating identifying locations or addresses of the multiple remote source units by a user of the client device.

The device 1000B may include instructions 1020B to facilitate provision, to the auto discovery module, of the single search query directed to the multiple remote source units to enable searching of non-public data simultaneously on all of the multiple remote source units based on the single search query while obviating initiation by the client device of a secure remote session log-on with each of the multiple remote source units and obviating mounting of the multiple remote source units onto the client device.

The device 1000B may include instructions 1030B to, in response to facilitating provision of the single search query, receive non-public search results in sequence or simultaneously, where each of the non-public search results is associated with a corresponding one of the multiple remote source units, where each of the non-public search results comprises one or more file names or folder names, any associated search ranking information, and any associated meta data indicators.

The device 1000B may include instructions 1040B to automatically aggregate, in real-time, the non-public search results from a plurality of the multiple remote source units.

The device 1000B may include instructions 1050B to automatically rank, in real-time, the aggregated non-public search results.

The device 1000B may include instructions 1060B to facilitate displaying, in real-time, the ranked non-public search results.

Figure 10C:
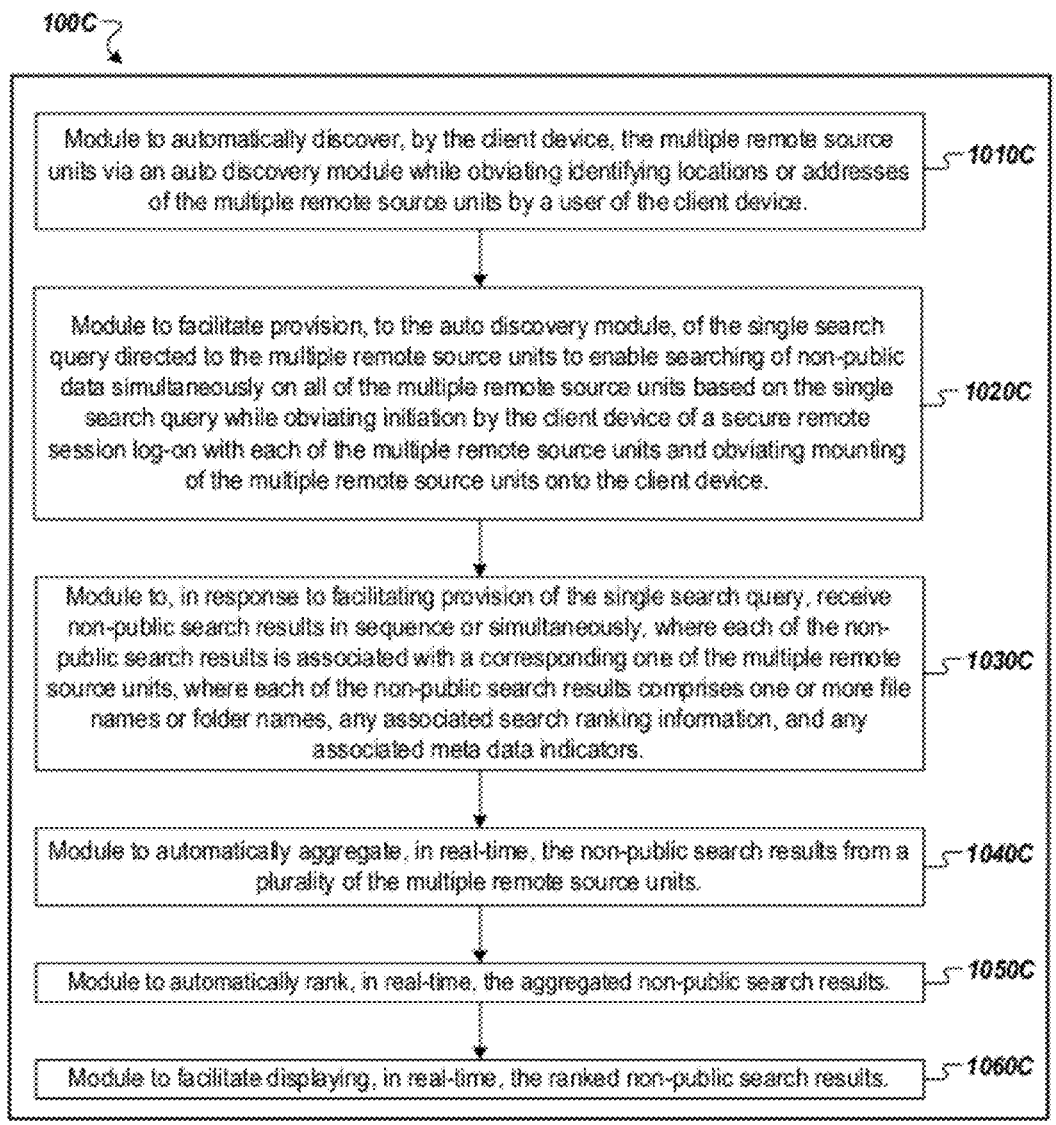
FIG. 10C illustrates an example of a device including modules by which a client device may search non-public data on multiple remote source units in accordance with one aspect of the subject technology.

Device with Modules for Process by which a Client Device may Search Non-Public Data on Multiple Remote Source Units FIG. 10C illustrates an example of a device 1000C.

The device 1000C may include one or more modules 1010C to automatically discover, by the client device, the multiple remote source units via an auto discovery module while obviating identifying locations or addresses of the multiple remote source units by a user of the client device.

The device 1000C may include one or more modules 1020C to facilitate provision, to the auto discovery module, of the single search query directed to the multiple remote source units to enable searching of non-public data simultaneously on all of the multiple remote source units based on the single search query while obviating initiation by the client device of a secure remote session log-on with each of the multiple remote source units and obviating mounting of the multiple remote source units onto the client device.

The device 1000C may include one or more modules 1030C to, in response to facilitating provision of the single search query, receive non-public search results in sequence or simultaneously, where each of the non-public search results is associated with a corresponding one of the multiple remote source units, where each of the non-public search results comprises one or more file names or folder names, any associated search ranking information, and any associated meta data indicators.

The device 1000C may include one or more modules 1040C to automatically aggregate, in real-time, the non-public search results from a plurality of the multiple remote source units.

The device 1000C may include one or more modules 1050C to automatically rank, in real-time, the aggregated non-public search results.

The device 1000C may include one or more modules 1060C to facilitate displaying, in real-time, the ranked non-public search results.

Process for Searching Non-Public Data and Displaying Search Results

Figure 11A:
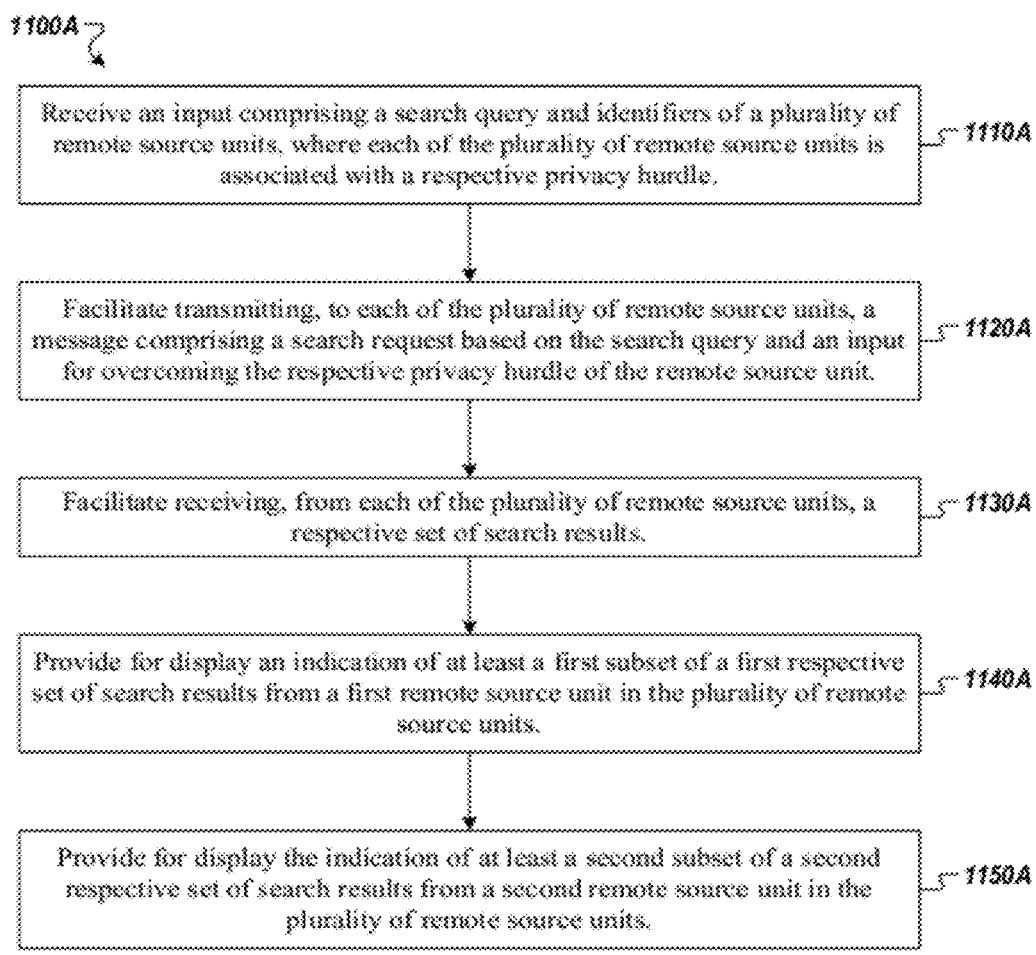
FIG. 11A illustrates an example of a process for searching non-public data and displaying search results in accordance with one aspect of the subject technology.

FIG. 11A illustrates an example of a process 1100A for searching non-public data and displaying search results in accordance with one aspect of the subject technology.

The process 1100A begins at step 1110A, where the client device receives (e.g., from the user) an input including a search query and identifiers of a plurality of remote source units. In one implementation, the search query is a text query. Alternatively, the search query may include one or more of a text query, an image query, an audio query, or a video query. The remote source units may include, for example, a remote desktop, a remote network source unit in an office, a cloud drive, or a source unit associated with a social networking service. Each of the plurality of remote source units may be associated with a privacy hurdle. For example, a cloud drive may require a username and a password to log-on. A remote office network source unit may require a certificate or a token to log-on. The information necessary to overcome the privacy hurdle, e.g., the certificate, the token, or the username and password, may be stored on the client device or on the auto discovery server in association with the account of the user of the client device.

In step 1120A, the client device transmits, to each of the plurality of remote source units, a message including a search request based on the search query and an input for overcoming the respective privacy hurdle of the remote source unit. For example, if the remote source unit is a cloud drive that requires a username and a password for access, the message to the remote source unit may include the search request based on the search query and the username and the password for the account of the user in the service providing the cloud drive. The data transmitted from the client device to a remote source unit may pass through the auto discovery server. Alternatively, the client device may transmit the data directly to the remote source unit.

In step 1130A, the client device receives, from each of the plurality of remote source units, a respective set of search results. The search results may be based on the search query. Each of the respective sets of search results may be received in real-time. Real time may refer to, for example, less than 1 hour, 30 minutes, 5 minutes or 1 minute depending on the amount of data to be searched and transmitted or the speed of a processor conducting the search. In one example, one or more of the respective sets of search results may have an order. For example, a respective set of search results may be ordered by edit date, frequency of access, or relevance to the search query. The relevance to the search query may be determined using any known technique, for example, based on access frequency or based on the number of times the terms in the query appear in the search result.

In step 1140A, the client device provides for display an indication of at least a first subset of a first representative set of search results from a first remote source unit in the plurality of remote source units. For example, the client device may display a filename of one or more files in the first subset and an indication, e.g., a name, of the first source unit. The data provided for display may be displayed via a screen of the client computing device.

In step 1150A, the client device provides for display an indication of at least a second subset of a second representative set of search results from a second remote source unit in the plurality of remote source units. For example, the client device may display a filename of one or more files in the second subset and an indication, e.g., a name, of the second source unit. The data provided for display may be displayed via a screen of the client device.

In one implementation, the end-user may place a cursor over a display element on the screen of the client computing device. Responsive to the input indicating the cursor being placed over the display element associated with the file, the client device may provide for display a hover card. The display element associated with the file may include the file name or a region of the screen associated with the file or information related to the file. The hover card may include one or more links for interaction with the file. Interaction with the file may include viewing the file, editing the file, printing the file, or sharing (e.g., via email or instant messaging) the file. After step 1150A, the process 1100A ends.

Figure 11B:
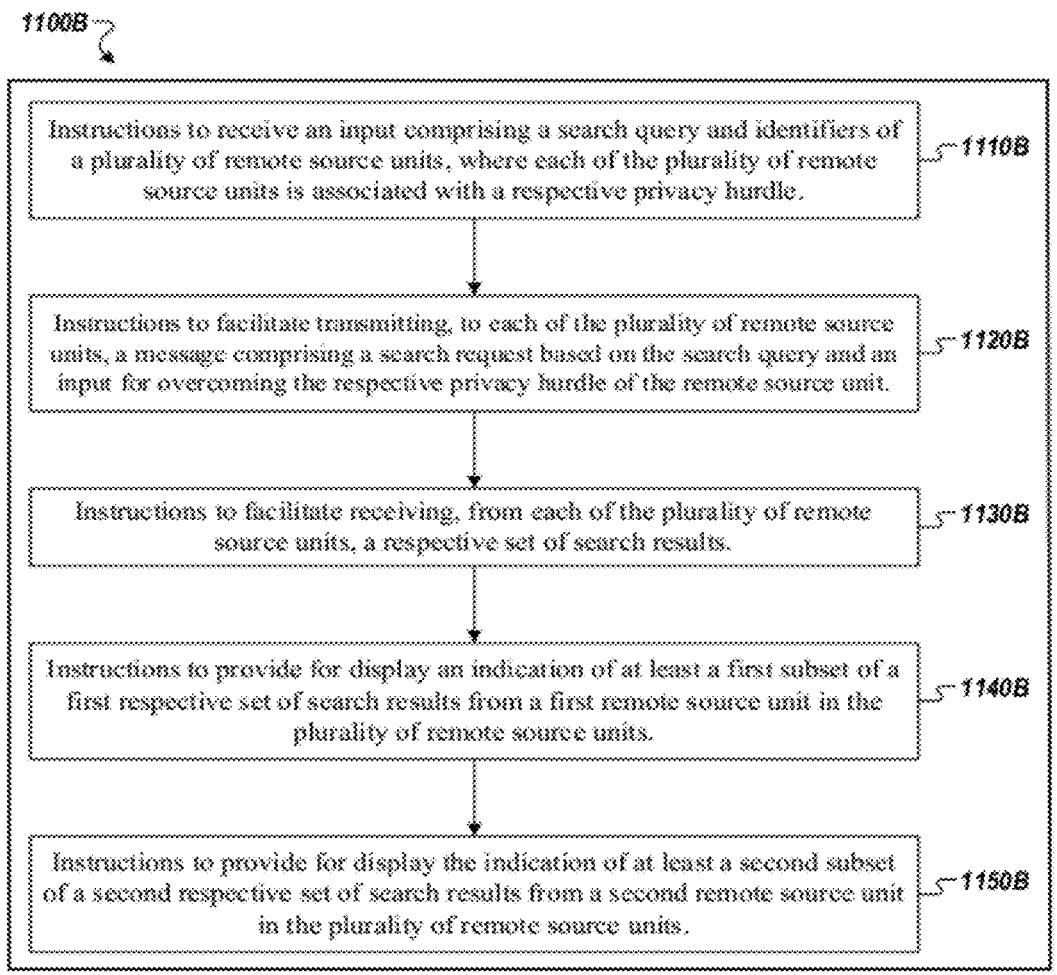
FIG. 11B illustrates an example of a device including instructions for searching non-public data and displaying search results in accordance with one aspect of the subject technology.

Device with Instructions for Process for Searching Non-Public Data and Displaying Search Results FIG. 11B illustrates an example of a device 1100B.

The device 1100B may include instructions 1110B to receive an input comprising a search query and identifiers of a plurality of remote source units, where each of the plurality of remote source units is associated with a respective privacy hurdle.

The device 1100B may include instructions 1120B to facilitate transmitting, to each of the plurality of remote source units, a message comprising a search request based on the search query and an input for overcoming the respective privacy hurdle of the remote source unit.

The device 1100B may include instructions 1130B to facilitate receiving, from each of the plurality of remote source units, a respective set of search results.

The device 1100B may include instructions 1140B to provide for display an indication of at least a first subset of a first respective set of search results from a first remote source unit in the plurality of remote source units.

The device 1100B may include instructions 1150B to provide for display the indication of at least a second subset of a second respective set of search results from a second remote source unit in the plurality of remote source units.

Figure 11C:
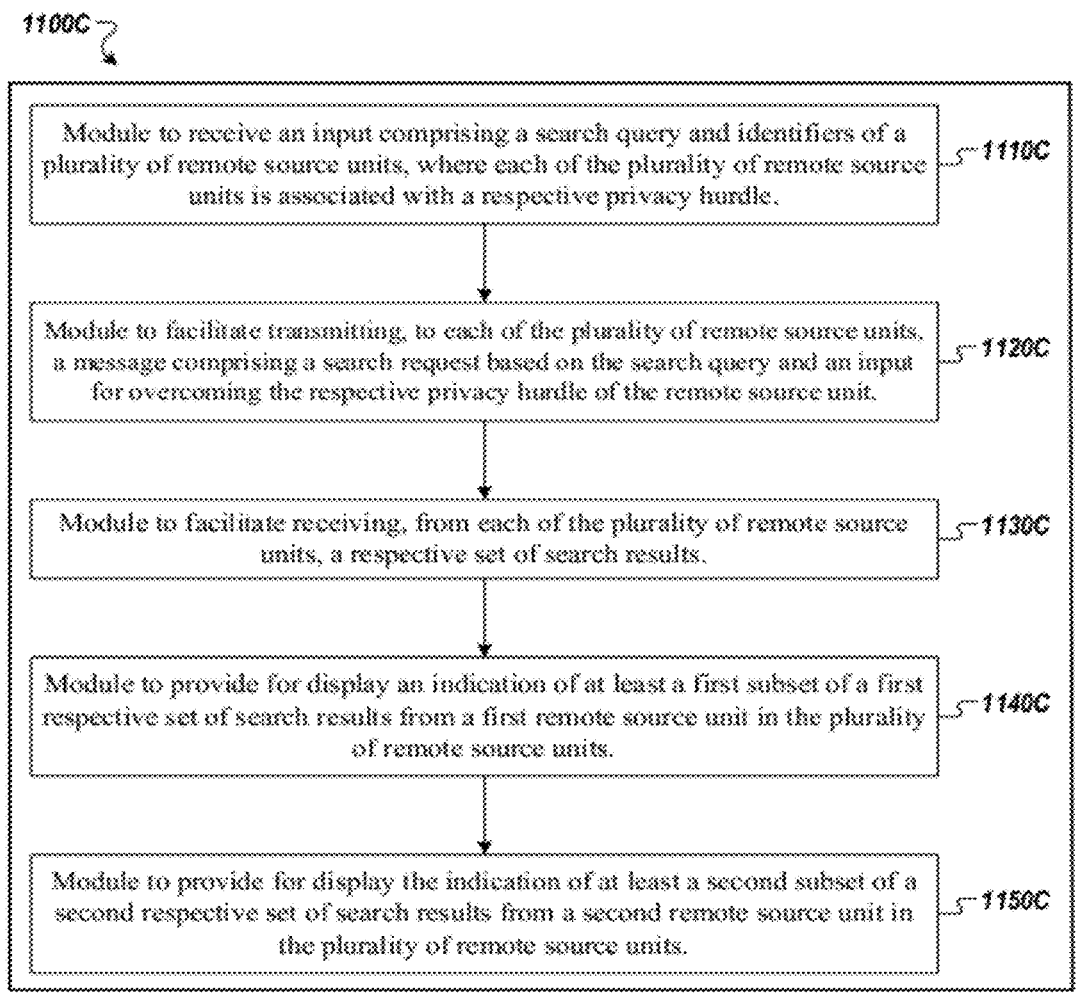
FIG. 11C illustrates an example of a device including modules for searching non-public data and displaying search results in accordance with one aspect of the subject technology.

Device with Modules for Process for Searching Non-Public Data and Displaying Search Results FIG. 11C illustrates an example of a device 1100C.

The device 1100C may include one or more modules 1110C to receive an input comprising a search query and identifiers of a plurality of remote source units, where each of the plurality of remote source units is associated with a respective privacy hurdle.

The device 1100C may include one or more modules 1120C to facilitate transmitting, to each of the plurality of remote source units, a message comprising a search request based on the search query and an input for overcoming the respective privacy hurdle of the remote source unit.

The device 1100C may include one or more modules 1130C to facilitate receiving, from each of the plurality of remote source units, a respective set of search results.

The device 1100C may include one or more modules 1140C to provide for display an indication of at least a first subset of a first respective set of search results from a first remote source unit in the plurality of remote source units.

The device 1100C may include one or more modules 1150C to provide for display the indication of at least a second subset of a second respective set of search results from a second remote source unit in the plurality of remote source units.

Figure 12A:
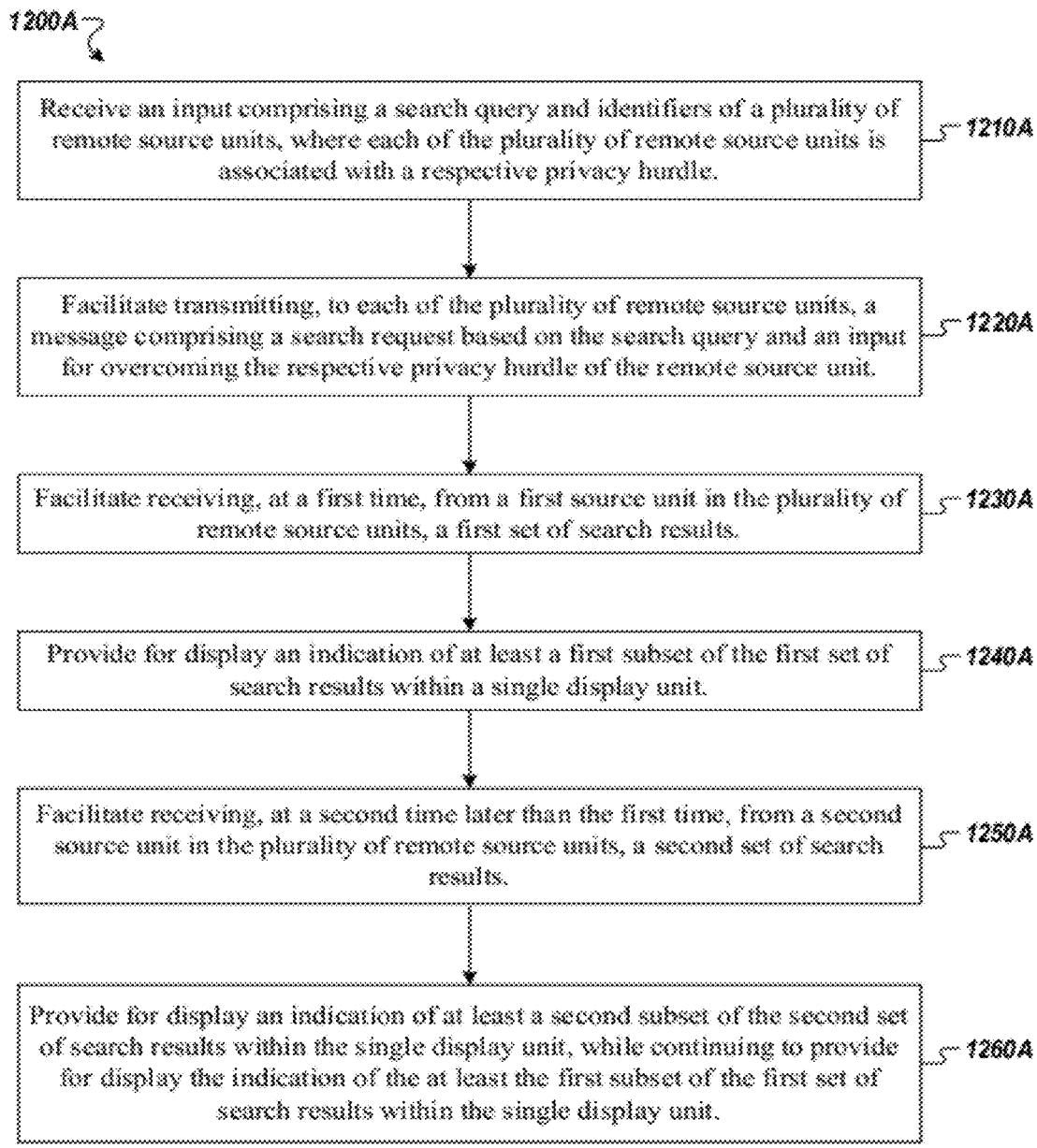
FIG. 12A illustrates an example of a process for searching non-public data from a plurality of remote source units and displaying search results in accordance with one aspect of the subject technology.

Process for Searching Non-Public Data From a Plurality of Remote Source Units and Displaying Search Results FIG. 12A illustrates an example of a process 1200A for searching non-public data from a plurality of remote source units and displaying search results in accordance with one aspect of the subject technology.

The process 1200A begins at step 1210A, where the client device receives (e.g., from the user) an input including a search query and identifiers of a plurality of remote source units. The remote source units may include, for example, a remote desktop, a remote network source unit in an office, a cloud drive, or a source unit associated with a social networking service. Each of the plurality of remote source units may be associated with a privacy hurdle. For example, a cloud drive may require a username and a password to log-on. A remote office network source unit may require a certificate or a token to log-on. The information necessary to overcome the privacy hurdle, e.g., the certificate, the token, or the username and password, may be stored on the client device or on the auto discovery server in association with the account of the user of the client device.

In step 1220A, the client device transmits, to each of the plurality of remote source units, a message including a search request based on the search query and an input for overcoming the respective privacy hurdle of the remote source unit. For example, if the remote source unit is a cloud drive that requires a username and a password for access, the message to the remote source unit may include the search request based on the search query and the username and the password for the account of the user in the service providing the cloud drive. The data transmitted from the client device to a remote source unit may pass through the auto discovery server. Alternatively, the client device may transmit the data directly to the remote source unit.

In step 1230A, the client device receives, at a first time, from a first source unit in the plurality of remote source units, a first set of search results.

In step 1240A, the client device provides for display an indication of at least a first subset of the first set of search results within a single display unit. For example, the client device may display the filenames of the files in the first subset. The single display unit may be, for example, a single tab in a web browser window. Alternatively, the single display unit may be a single application window, for example, in a mobile phone or tablet computer application. The data provided for display may be transmitted to a screen of the client device to be displayed.

In step 1250A, the client device receives, at a second time later than the first time, from a second source unit in the plurality of remote source units, a second set of search results. The second source unit may be different from the first source unit. The second time may be any amount of time later than the first time, for example, five seconds, ten seconds, one minute, five minutes, ten minutes, or one hour later than the first time. The time difference between the first time and the second time may depend on the relative processing speeds or file system sizes of the first source unit and the second source unit.

In step 1260A, the client device provides for display an indication of at least a second subset of the second set of search results within the single display unit, while continuing to provide for display the indication of the at least the first subset of the first set of search results within the single display unit. For example, the client device may display the filenames of the files in the first subset. The files may be displayed according to an order based on the relevance of the files to the search query e.g., by how many times the search term(s) in the search query appears in the file or by a frequency with which the file is accessed. In one implementation, the file names of the files in the first subset and the filenames of the files in the second subset may be interlaced with one another such that the files from both the first subset and the second subset are displayed according to the order of relevance to the search query. After step 1260A, the process 1200A ends.

Figure 12B:
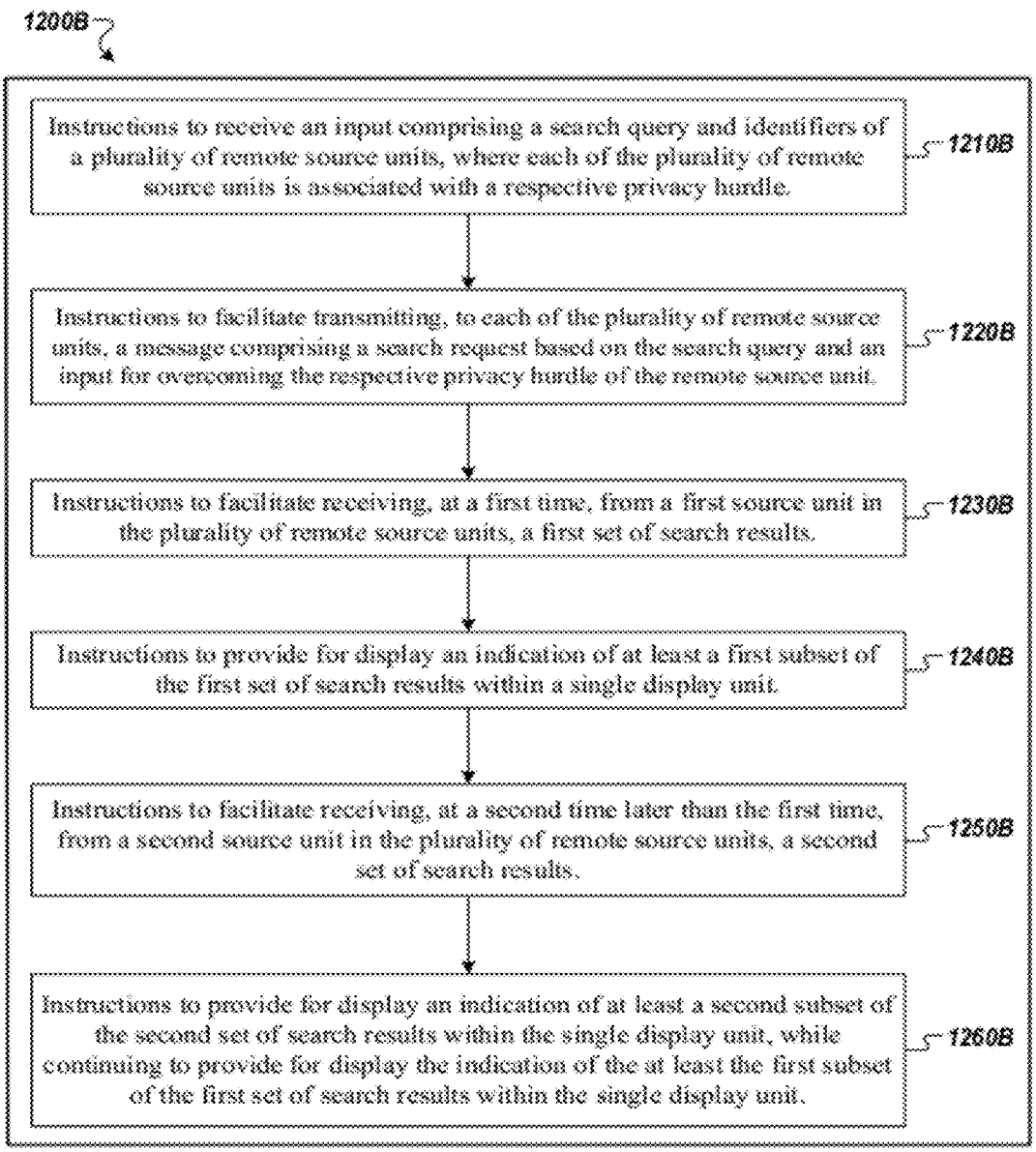
FIG. 12B illustrates an example of a device including instructions for searching non-public data from a plurality of remote source units and displaying search results in accordance with one aspect of the subject technology.

Devices with Instructions for Process for Searching Non-Public Data from a Plurality of Remote Source Units and Displaying Search Results FIG. 12B illustrates an example of a device 1200B.

The device 1200B may include instructions 1210B to receive an input comprising a search query and identifiers of a plurality of remote source units, where each of the plurality of remote source units is associated with a respective privacy hurdle.

The device 1200B may include instructions 1220B to facilitate transmitting, to each of the plurality of remote source units, a message comprising a search request based on the search query and an input for overcoming the respective privacy hurdle of the remote source unit.

The device 1200B may include instructions 1230B to facilitate receiving, at a first time, from a first source unit in the plurality of remote source units, a first set of search results.

The device 1200B may include instructions 1240B to provide for display an indication of at least a first subset of the first set of search results within a single display unit.

The device 1200B may include instructions 1250B to facilitate receiving, at a second time later than the first time, from a second source unit in the plurality of remote source units, a second set of search results.

The device 1200B may include instructions 1260B to provide for display an indication of at least a second subset of the second set of search results within the single display unit, while continuing to provide for display the indication of the at least the first subset of the first set of search results within the single display unit.

Figure 12C:
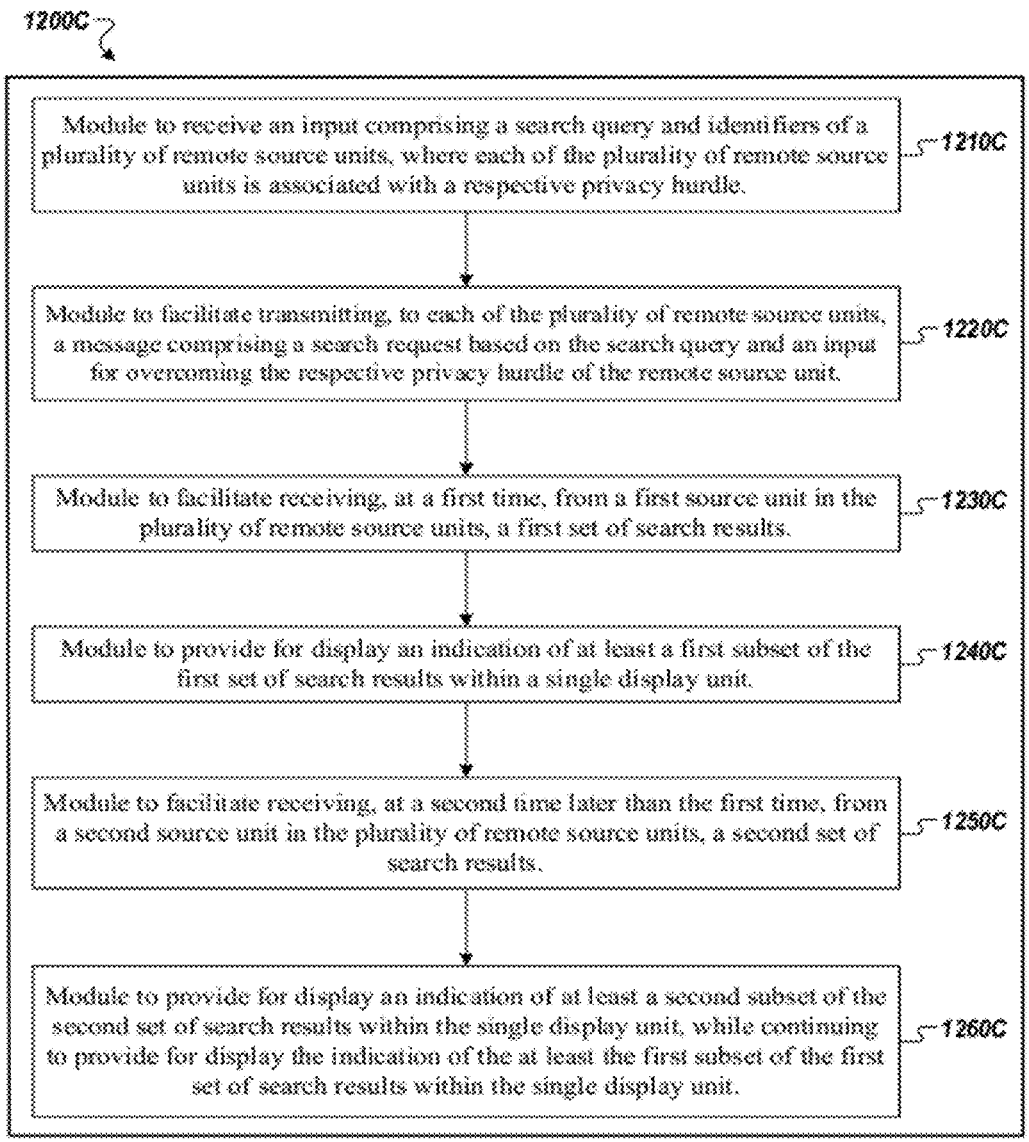
FIG. 12C illustrates an example of a device including modules for searching non-public data from a plurality of remote source units and displaying search results in accordance with one aspect of the subject technology.

Device with Modules for Process for Searching Non-Public Data from a Plurality of Remote Source Units and Displaying Search Results FIG. 12C illustrates an example of a device 1200C.

The device 1200C may include one or more modules 1210C to receive an input comprising a search query and identifiers of a plurality of remote source units, where each of the plurality of remote source units is associated with a respective privacy hurdle.

The device 1200C may include one or more modules 1220C to facilitate transmitting, to each of the plurality of remote source units, a message comprising a search request based on the search query and an input for overcoming the respective privacy hurdle of the remote source unit.

The device 1200C may include one or more modules 1230C to facilitate receiving, at a first time, from a first source unit in the plurality of remote source units, a first set of search results.

The device 1200C may include one or more modules 1240C to provide for display an indication of at least a first subset of the first set of search results within a single display unit.

The device 1200C may include one or more modules 1250C to facilitate receiving, at a second time later than the first time, from a second source unit in the plurality of remote source units, a second set of search results.

The device 1200C may include one or more modules 1260C to provide for display an indication of at least a second subset of the second set of search results within the single display unit, while continuing to provide for display the indication of the at least the first subset of the first set of search results within the single display unit.

Virtualization System

Figure 13:
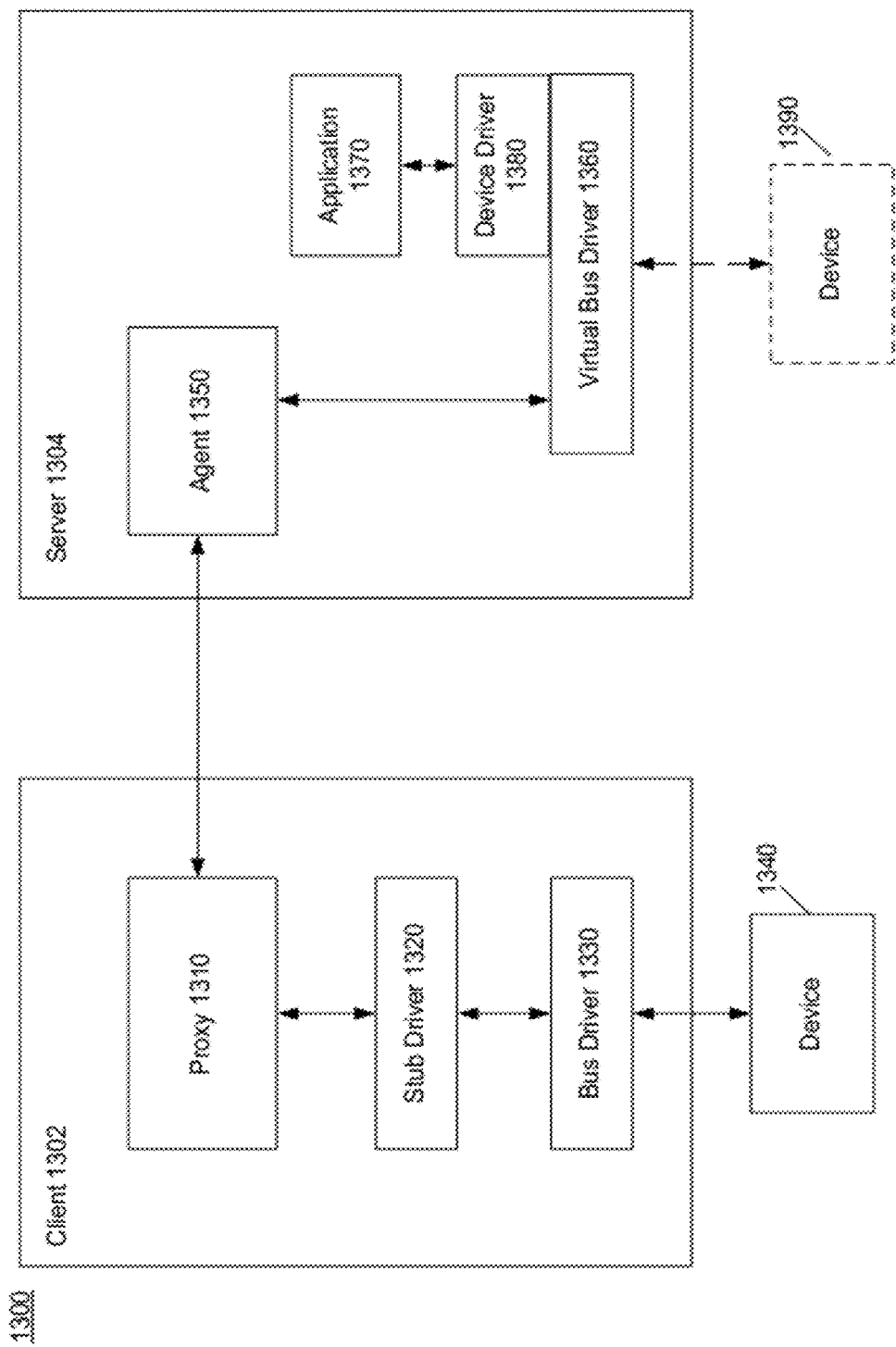
FIG. 13 is a conceptual block diagram of a local device virtualization system, in accordance with various aspects of the subject technology.

FIG. 13 is a block diagram of a local device virtualization system 1300, according to an aspect of the disclosure. The system 1300 may include the client 1302 in communication with the server 1304, for example, over a network, e.g., network 606 in FIGS. 6A and 6B. The client 1302 may include a proxy 1310, a stub driver 1320, and a bus driver 1330. The client 1302 can be connected to a device 1340, as shown in FIG. 13. The server 1304 may include an agent 1350, and a virtual bus driver 1360.

According to the illustrated configuration, while the device 1340 is not locally or physically connected to the server 1304 and is remote to the server 1304, the device 1340 appears to the server 1304 as if it is locally connected to the server 1304, as discussed further below. Thus, the device 1340 appears to the server 1304 as a virtual device 1390. In one implementation, one or more of the remote source units 140 of FIG. 1 may be implemented as a virtual device (e.g., virtual device 1390).

By way of illustration and not limitation, the device 1340 may be a machine-readable storage medium (e.g., flash storage device), a printer, a scanner, a camera, a facsimile machine, a phone, an audio device, a video device, a peripheral device, or other suitable device that can be connected to the client 1302. The device 1340 may be an external device (i.e., external to the client 1302) or an internal device (i.e., internal to the client 1302).

In one aspect of the disclosure, the device 1340 is a Universal Serial Bus (USB) device that can be locally connected to the client 1302 using a wired USB or wireless USB connection and communicates with the client 1302 according to a USB communications protocol. In another aspect, the device 1340 may be a device other than a USB device.

As used herein, a "local" device of a system, or a device "locally" connected to a system, may be a device directly connected to the system using one or more wires or connectors (e.g., physically connected to the system), or a device directly connected to the system using a wireless link (e.g., Bluetooth). For example, device 1340 is a local device of client 1302. Furthermore, in one aspect of the disclosure, a local device of a system or a device locally connected to a system may include a device within the system (e.g., an internal device of client 1302).

A "remote" device, or a device "remote" to a system, may be a device that is not directly connected to the system. For example, the server 1304 is remote to both client 1302 and device 1340 because server 1304 is not directly connected to client 1302 or device 1340 but connected indirectly through the network, which can include, for example, another server, or the Internet.

The bus driver 1330 can be configured to allow the operating system and programs of the client 1302 to interact with the device 1340. In one aspect, when the device 1340 is connected to the client 1302 (e.g., plugged into a port of the client 1302), the bus driver 1330 may detect the presence of the device 1340 and read information regarding the device 1340 ("device information") from the device 1340. The device information may include features, characteristics and other information specific to the device. For an example of a USB device, the device information may comprise a device descriptor (e.g., product ID, vender ID and/or other information), a configuration descriptor, an interface descriptor, an endpoint descriptor and/or a string descriptor. The bus driver 1330 may communicate with the device 1340 through a computer bus or other wired or wireless communications interface.

In one aspect, a program (e.g., application) running locally on the client 1302 may access the device 1340. For example, the device 1340 may be accessed locally when the client 1302 is not connected to the server 1304. In this aspect, the operating system (e.g., Microsoft Windows®) of the client 1302 may use the device information to find and load an appropriate device driver (not shown) for the device 1340. The device driver may provide the program with a high-level interface to the device 1340.

In one aspect, the device 1340 may be accessed from the server 1304 as if the device were connected locally to the server 1340. For example, the device 1340 may be accessible from the desktop running on the server 1304 (i.e., virtual desktop environment). In this aspect, the bus driver 1330 may be configured to load the stub driver 1320 as the default driver for the device 1340. The stub driver 1320 may be configured to report the presence of the device 1340 to the proxy 1310 and to provide the device information (e.g., device descriptor) to the proxy 1310.

The proxy 1310 may be configured to report the presence of the device 1340, along with the device information, to the agent 1350 of the server 1304 over the network. Thus, the stub driver 1320 redirects the device 1340 to the server 1304 via the proxy 1310.

The agent 1350 may be configured to receive the report from the proxy 1310 that the device 1340 is connected to the client 1302 and the device information. The agent 1350 can provide notification of the device 1340, along with the device information, to the virtual bus driver 1360. The virtual bus driver 1360 may be configured to report to the operating system of the server 1304 that the device 1340 is connected and to provide the device information to the operating system. This allows the operating system of the server 1304 to recognize the presence of the device 1340 even though the device 1340 is connected to the client 1302. The operating system of the server 1304 may use the device information to find and load an appropriate device driver 1380 for the device 1340 at the server 1304, an example of which is illustrated in FIG. 13. As a result, the device 1340 is enumerated on the server 1304. Once the presence of the device 1340 is reported to the operating system of the server 1304, the device 1340 may be accessible from the desktop running on the server 1304 (i.e., virtual desktop environment). For example, the device 1340 may appear as an icon on the virtual desktop environment and/or may be accessed by applications running on the server 1304.

In one aspect, an application 1370 running on the server 1304 may access the device 1340 by sending a transaction request for the device 1340 to the virtual bus driver 1360 either directly or through the device driver 1380. The virtual bus driver 1360 may direct the transaction request to the agent 1350, which sends the transaction request to the proxy 1310 over the network. The proxy 1310 receives the transaction request from the agent 1350, and directs the received transaction request to the stub driver 1320. The stub driver 1320 then directs the transaction request to the device 1340 through the bus driver 1330.

The bus driver 1330 receives the result of the transaction request from the device 1340 and sends the result of the transaction request to the stub driver 1320. The stub driver 1320 directs the result of the transaction request to the proxy 1310, which sends the result of the transaction request to the agent 1350 over the network. The agent 1350 directs the result of the transaction request to the virtual bus driver 1360. The virtual bus driver 1360 then directs the result of the transaction request to the application 1370 either directly or through the device driver 1380.

Thus, the virtual bus driver 1360 may receive transaction requests for the device 1340 from the application 1370 and send results of the transaction requests back to the application 1370 (either directly or through the device driver 1380). As such, the application 1370 may interact with the virtual bus driver 1360 in the same way as a bus driver for a device that is connected locally to the server 1304. The virtual bus driver 1360 may hide the fact that it sends transaction requests to the agent 1350 and receives the results of the transaction requests from the agent 1350 instead of a device that is connected locally to the server 1304. As a result, the device 1340 connected to the client 1302 may appear to the application 1370 as if the physical device 1340 is connected locally to the server 1304.

Illustration of Subject Technology as Clauses for Remote Source Unit

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

1. A method for facilitating real-time searching of non-public data using a single search query, the method comprising:

facilitating reporting of availability of a companion application of a remote source unit to an auto discovery module to enable a client device to automatically discover the remote source unit and to enable the client device to search, in real-time, non-public data on the remote source unit using the single search query, wherein the companion application is a non-public application, wherein the single search query comprises a search term;

while obviating facilitation of a secure remote session log-on between the remote source unit and the client device and obviating mounting of the remote source unit onto the client device, enabling automatic access to non-public data on the remote source unit, by the single search query;

facilitating receipt, at the remote source unit, of the single search query with the search term; and in response to the single search query, searching, in real-time, non-public data on the remote source unit using the search term;

retrieving, in real-time, a non-public search result comprising one or more file names or folder names; and transmitting the non-public search result in real-time.

2. The method of clause 1, wherein the remote source unit is one of multiple remote source units, further wherein the single search query is directed to each of the multiple remote source units.

3. The method of clause 2, wherein the auto discovery module is configured to enable the client computing device to simultaneously search non-public data on the multiple remote source units.

4. The method of clause 1, wherein the single search query is initiated by the client device.

5. The method of clause 1, wherein the remote source unit is associated with a privacy hurdle, wherein the method further comprises receiving, at the remote source unit, an input for overcoming the privacy hurdle.

6. The method of clause 5, wherein the privacy hurdle comprises one or more of: a firewall, a login information verification module, a certificate verification module, or a token verification module.

7. The method of clause 5, wherein the input for overcoming the privacy hurdle comprises one or more of: login information, a username, a password, a certificate, or a token.

8. The method of clause 1, wherein the facilitating reporting is performed at least in part by a reporting module of the remote source unit, wherein the enabling automatic access is performed at least in part by an access module, wherein the facilitating receipt is performed at least in part by a search command handler of the remote source unit, wherein the facilitating searching is performed at least in part by the search command handler, wherein the searching is performed at least in part by an indexer of the remote source unit, wherein the retrieving is performed at least in part by a result handler of the remote source unit, wherein the transmitting is performed at least in part by the result handler, and wherein the method comprises:

providing the single search query by the search command handler to the indexer;

creating, by the indexer, a word frequency distribution indicating how relevant the search term is to files in the remote source unit, and providing the word frequency distribution by the indexer to the companion application, wherein the non-public search result is associated with search ranking information, and wherein the search ranking information comprises the word frequency distribution.

9. A non-transitory machine-readable medium for facilitating real-time searching of non-public data using a single search query, the machine-readable medium comprising instructions that, when executed by one or more processors, cause the one or more processors to:

facilitate reporting of availability of a companion application of a remote source unit to an auto discovery module to enable a client device to automatically discover the remote source unit and to enable the client device to search, in real-time, non-public data on the remote source unit using the single search query, wherein the companion application is a non-public application, wherein the single search query comprises a search term;

while obviating facilitation of a secure remote session log-on between the remote source unit and the client device and obviating mounting of the remote source unit onto the client device, enable automatic access to non-public data on the remote source unit, by the single search query;

facilitate receipt, at the remote source unit, of the single search query with the search term; and in response to the single search query, search, in real-time, non-public data on the remote source unit using the search term;

retrieve, in real-time, a non-public search result comprising one or more file names or folder names; and transmit the non-public search result in real-time.

10. The non-transitory machine-readable medium of clause 9, wherein the single search query is initiated by the client device.

11. The non-transitory machine-readable medium of clause 9, wherein the remote source unit comprises one or more of: a remote computing device, a cloud-based source unit, an email account storing email messages, an online calendar account storing appointments, an online document management account, a social networking account storing social networking content.

12. The non-transitory machine-readable medium of clause 9, wherein the instructions to enable automatic access to non-public data on the remote source unit comprise instructions that, when executed by the one or more processors, cause the one or more processors to automatically and selectively disable a firewall at the remote source unit for communications directed to the companion application.

13. The non-transitory machine-readable medium of clause 12, wherein the instructions to automatically and selectively disable the firewall comprise instructions that, when executed by the one or more processors, cause the one or more processors to automatically and selectively disable the firewall when the companion application is installed on the remote source unit for the first time, and the firewall remains selectively disabled while the companion application remains installed on the remote source unit.

14. The non-transitory machine-readable medium of clause 12, wherein the non-public search result further comprises associated search ranking information and one or more one or more associated metadata indicators.

15. The non-transitory machine-readable medium of clause 14, wherein the one or more file names or folder names are one or more names of one or more files or folders that match the search term in name, content or metadata of the one or more files or folders in the remote source unit, wherein the machine-readable medium further comprises instructions that, when executed by the one or more processors, cause the one or more processors to: in response to the single search query, identify metadata associated with the one or more files or folders and identify metadata associated with the content of the one or more files or folders, wherein the metadata associated with the one or more files or folders comprises one or more icon indicators of the one or more files or folders, wherein the metadata associated with the content of the one or more files or folders comprises of one or more preview indicators, one or more thumbnail indicators, one or more partial content indicators, and one or more partial image indicators, wherein an icon indicator indicates whether an icon associated with a file or folder exists in the remote source unit, wherein a preview indicator indicates whether a preview associated with a file or folder exists in the remote source unit, wherein a thumbnail indicator indicates whether a thumbnail associated with a file or folder exists in the remote source unit, wherein a partial content indicator indicates whether a partial content associated with a file or folder exists in the remote source unit, wherein a partial image indicator indicates whether a partial image associated with a file or folder exists in the remote source unit, and wherein the one or more associated metadata indicators comprise at least one of metadata associated with the one or more files or folders and metadata associated with the content of the one or more files or folders.

16. The non-transitory machine-readable medium of clause 14, further comprising instructions that, when executed by the one or more processors, cause the one or more processors to:

after facilitating the transmission of the non-public search result, receive, at the remote source unit, a request for an icon associated with one or more files or folders of the one or more file names or folder names, based on the one or more associated metadata indicators;

in response to the request for the icon, retrieve and facilitate transmission of the icon to the auto discovery module for forwarding to the client device in real-time, wherein the non-public search result does not contain the icon.

17. The non-transitory machine-readable medium of clause 12, further comprising instructions that, when executed by the one or more processors, cause the one or more processors to:

after facilitating the transmission of the non-public search result, receive, at the remote source unit, a request for a preview, a thumbnail, a partial content or a partial image associated with the content of one or more files or folders of the one or more file names or folder names, based on the one or more associated metadata indicators;

in response to the request for the preview, the thumbnail, the partial content or the partial image, retrieve and facilitate transmission of the preview, the thumbnail, the partial content or the partial image to the auto discovery module for forwarding to a portion of the client device in real-time, wherein the non-public search result does not contain the preview, the thumbnail, the partial content or the partial image.

18. The non-transitory machine-readable medium of clause 9, further comprising instructions that, when executed by the one or more processors, cause the one or more processors to:

after facilitating the transmission of the non-public search result, receive, at the remote source unit, a request for the content of one or more files of the one or more file names;

in response to the request for the content, retrieve and facilitate transmission of the content to the auto discovery module for forwarding to a portion of the client device in real-time, wherein the non-public search result does not contain the content.

19. The non-transitory machine-readable medium of clause 9, wherein the instructions to search comprise instructions that, when executed by the one or more processors, cause the one or more processors to:

identify the one or more file names or folder names of one or more files or folders that match the search term in name, content or metadata of the one or more files or folders in the remote source unit;

compute the associated search ranking information based on word frequency distribution of the search term in the one or more files or folders in the remote source unit.

20. The non-transitory machine-readable medium of clause 9, further comprising instructions that, when executed by the one or more processors, cause the one or more processors to: filter the non-public search result based on a permission criteria of a user of the client device to allow transmission of the non-public search result only to the extent the non-public search result meets the permission criteria.

21. The non-transitory machine-readable medium of clause 9, further comprising instructions that, when executed by the one or more processors, cause the one or more processors to: group the non-public search result based on a clustering criteria.

22. The non-transitory machine-readable medium of clause 9, further comprising instructions that, when executed by the one or more processors, cause the one or more processors to: prior to facilitating the transmission, encrypt the non-public search result to enable secure transmission of the non-public search result.

23. The non-transitory machine-readable medium of clause 9, wherein the remote source unit is one of multiple remote source units, further wherein the single search query is directed to each of the multiple remote source units, further wherein the auto discovery module is configured to enable the client computing device to simultaneously search non-public data on the multiple remote source units.

24. The non-transitory machine-readable medium of clause 23, further comprising instructions that, when executed by the one or more processors, cause the one or more processors to:
  facilitate reporting of availability of a companion application of a second remote source unit within the multiple remote source units to the auto discovery module to enable the client device to automatically discover the second remote source unit and to enable the client device to search, in real-time, non-public data simultaneously on the multiple remote source units using the single search query;
  while obviating facilitation of a secure remote session log-on between the second remote source unit and the client device and obviating mounting of the second remote source unit onto the client device, enable automatic access to non-public data on the second remote source unit by the single search query directed to the multiple remote source units;
  facilitate receipt, at the second remote source unit, of the single search query with the search term, wherein the single source query is initiated by the client device; and
  in response to the single search query,
    facilitate searching, in real-time, non-public data on the second remote source unit using the search term;
    retrieve, in real-time, a second non-public search result comprising one or more file names or folder names, associated search ranking information, and one or more associated metadata indicators; and
    facilitate, in real-time, transmission of the second non-public search result to the auto discovery module for forwarding to the client device in real-time.

25. The non-transitory machine-readable medium of clause 23, further comprising instructions that, when executed by the one or more processors, cause the one or more processors to:
  facilitate communication of the companion application of the remote source unit within the multiple remotes source units with companion applications of other remote source units within the multiple remote source units.

26. The non-transitory machine-readable medium of clause 23, further comprising instructions that, when executed by the one or more processors, cause the one or more processors to:
  facilitate communication of the companion application of the remote source unit with companion applications of other remote source units, wherein the multiple remote source units comprise the remote source unit and the other remote source units,
  wherein the instructions to facilitate communication comprise instructions that, when executed by the one or more processors, cause the one or more processors to enable sharing of information including search ranking information among the remote source unit and the other remote source units,
  wherein the instructions further comprise instructions that, when executed by the one or more processors, cause the one or more processors to update associated search ranking information based on search ranking information of the remote source unit and search ranking information from the other remote source units.

27. The non-transitory machine-readable medium of clause 9, further comprising instructions that, when executed by the one or more processors, cause the one or more processors to: rank files or folders found in the remote source units from the searching, wherein the ranking comprises analyzing one or more of search term frequency distribution, date of creation of the files or folders, and relevance of the files or folders.

28. The non-transitory machine-readable medium of clause 9, further comprising instructions that, when executed by the one or more processors, cause the one or more processors to:
  traverse a file system of the remote source unit;
  index files and folders or subsets of files and folders on the remote source unit;
  index contents of the files or subsets of the files on the remote source unit.

29. A system for facilitating real-time searching of non-public data using a single search query, the system comprising:
  one or more processors; and
  a memory comprising instructions that, when executed by the one or more processors, cause the one or more processors to:
    facilitate reporting of availability of a companion application of a remote source unit to an auto discovery module to enable a client device to automatically discover the remote source unit and to enable the client device to search, in real-time, non-public data on the remote source unit using the single search query, wherein the companion application is a non-public application, wherein the single search query comprises a search term;
    while obviating facilitation of a secure remote session log-on between the remote source unit and the client device and obviating mounting of the remote source unit onto the client device, enable automatic access to non-public data on the remote source unit, by the single search query;
    facilitate receipt, at the remote source unit, of the single search query with the search term; and
    in response to the single search query,
      search, in real-time, non-public data on the remote source unit using the search term;
      retrieve, in real-time, a non-public search result comprising one or more file names or folder names; and
      transmit the non-public search result in real-time.

30. The system of clause 29, wherein the remote source unit is one of multiple remote source units, further wherein the single search query is directed to each of the multiple remote source units.

31. The system of claim 30, wherein the auto discovery module is configured to enable the client computing device to simultaneously search non-public data on the multiple remote source units.

32. The system of clause 29, wherein the single search query is initiated by the client device.

Illustration of Subject Technology as Clauses for Client Device

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

1. A method for facilitating real-time searching of non-public data on multiple remote source units using a single search query, comprising:

automatically discovering, by the client device, the multiple remote source units via an auto discovery module while obviating identifying locations or addresses of the multiple remote source units by a user of the client device;

facilitating provision, to the auto discovery module, of the single search query directed to the multiple remote source units to enable searching of non-public data simultaneously on all of the multiple remote source units based on the single search query while obviating initiation by the client device of a secure remote session log-on with each of the multiple remote source units and obviating mounting of the multiple remote source units onto the client device; and in response to facilitating provision of the single search query, receiving non-public search results in sequence or simultaneously, wherein each of the non-public search results is associated with a corresponding one of the multiple remote source units, wherein each of the non-public search results comprises one or more file names or folder names;

automatically aggregating, in real-time, the non-public search results from a plurality of the multiple remote source units;

automatically ranking, in real-time, the aggregated non-public search results; and facilitating displaying, in real-time, the ranked non-public search results.

2. The method of clause 1, further comprising: signing into an auto discovery module by a sign-in module of the client device, wherein the automatically discovering is performed at least in part by the sign-in module, wherein the facilitating provision is performed at least in part by a command generator module of the client device, wherein the receiving non-public search results is performed at least in part by a result aggregator module of the client device, wherein the automatically aggregating is performed at least in part by the result aggregator module, wherein the automatically ranking is performed at least in part by the result aggregator module, wherein the facilitating displaying is performed at least in part by the result aggregator module.

3. The method of clause 1, wherein the automatically ranking the aggregated non-public search results comprises associating each of a plurality of search results in the aggregated non-public search results with associated search ranking information, wherein, the method further comprises: automatically updating the associated search ranking information for each of the plurality of the search results based on the aggregated non-public search results, wherein the associated search ranking information in each of the non-public search results provides search ranking among all files or folders found in a corresponding one of the multiple remote source units, wherein the updated associated search ranking information provides search ranking among all files or folders found in all of the multiple remote source units.

4. A non-transitory machine-readable medium for facilitating real-time searching of non-public data on multiple remote source units using a single search query, the machine-readable medium comprising instructions that, when executed by one or more processors, cause the one or more processors to:

automatically discover, by the client device, the multiple remote source units via an auto discovery module while obviating identifying locations or addresses of the multiple remote source units by a user of the client device;

facilitate provision, to the auto discovery module, of the single search query directed to the multiple remote source units to enable searching of non-public data simultaneously on all of the multiple remote source units based on the single search query while obviating initiation by the client device of a secure remote session log-on with each of the multiple remote source units and obviating mounting of the multiple remote source units onto the client device; and in response to facilitating provision of the single search query, receive non-public search results in sequence or simultaneously, wherein each of the non-public search results is associated with a corresponding one of the multiple remote source units, wherein each of the non-public search results comprises one or more file names or folder names;

automatically aggregate, in real-time, the non-public search results from a plurality of the multiple remote source units;

automatically rank, in real-time, the aggregated non-public search results; and facilitate displaying, in real-time, the ranked non-public search results.

5. The non-transitory machine-readable medium of clause 4, wherein each of the non-public search results further comprises associated search ranking information and one or more associated metadata indicators.

6. The non-transitory machine-readable medium of clause 5, further comprising instructions that, when executed by the one or more processors, cause the one or more processors to:

after receiving the non-public search results, automatically determine, by the client device, based on the one or more associated metadata indicators, whether one or more files or folders of the one or more file names or folder names are associated with one or more image or partial-view metadata, wherein the one or more image or partial-view metadata comprises one or more of an icon, a preview, a thumbnail, a partial content and a partial image associated with the one or more files or folders;

based on the determination, automatically facilitate provision of a request to one or more corresponding remote source units, wherein the request is for requesting the one or more image or partial-view metadata;

in response to the facilitating provision of the request, receive, by the client device, the one or more image or partial-view metadata, wherein the ranked non-public search results do not contain the one or more image or partial-view metadata.

7. The non-transitory machine-readable medium of clause 5, further comprising instructions that, when executed by the one or more processors, cause the one or more processors to: automatically facilitate caching, by the client device, the received one or more image or partial-view metadata for later use.

8. The non-transitory machine-readable medium of clause 5, further comprising instructions that, when executed by the one or more processors, cause the one or more processors to: facilitate displaying, in real-time, the received one or more image or partial-view metadata.

9. The non-transitory machine-readable medium of clause 4, further comprising instructions that, when executed by the one or more processors, cause the one or more processors to:

after executing the instructions to facilitate displaying the ranked non-public search results, determine whether a request is made, at the client device, for the content of a file of the ranked non-public search results;

based on the determination, automatically facilitate provision of a request for the content of the file to the associated remote source unit;

in response to execution of the instructions to facilitate provision of the request, receive, by the client device, the content of the file, wherein the ranked non-public search results do not contain the content of the file.

10. The non-transitory machine-readable medium of clause 4, further comprising instructions that, when executed by the one or more processors, cause the one or more processors to: facilitate, in real-time, execution of at least one of the following instructions based on the request: instructions to display, instructions to print, instructions to save, or instructions to attach to an email the received content of the file.

11. The non-transitory machine-readable medium of clause 4, wherein the instructions to automatically rank the aggregated non-public search results comprise instructions that, when executed by the one or more processors, cause the one or more processors to: associate each of a plurality of search results in the aggregated non-public search results with associated search ranking information, further wherein the associated search ranking information in each of the non-public search results is a representation of a word frequency distribution of a search term of the single search query found in files or folders in the corresponding one of the multiple remote source units.

12. The non-transitory machine-readable medium of clause 4, further comprising instructions that, when executed by the one or more processors, cause the one or more processors to:

after the automatically discovering, facilitate automatically displaying a representation of the discovered multiple remote source units;

receive an indication to initiate a search;

in response to the indication, facilitate displaying an input search box to enable a user to input a search term;

receive the search term; and generate the single search query based on the search term.

13. The non-transitory machine-readable medium of clause 4, further comprising instructions that, when executed by the one or more processors, cause the one or more processors to: prior to executing the instructions to facilitate provision of the single search query, encrypt the single search query to enable secure transmission of the single search query.

14. A method comprising:

receiving an input comprising a search query and identifiers of a plurality of remote source units, wherein each of the plurality of remote source units is associated with a respective privacy hurdle;

facilitating transmitting, to each of the plurality of remote source units, a message comprising a search request based on the search query and an input for overcoming the respective privacy hurdle of the remote source unit;

facilitating receiving, from each of the plurality of remote source units, a respective set of search results; and providing for display an indication of at least a first subset of a first respective set of search results from a first remote source unit in the plurality of remote source units; and providing for display an indication of at least a second subset of a second respective set of search results from a second remote source unit in the plurality of remote source units.

15. The method of clause 14, wherein facilitating receiving, from each of the plurality of remote source units, the respective set of search results, comprises facilitating receiving, from each of the plurality of remote source units, the respective set of search results in real-time.

16. The method of clause 14, wherein providing for display the indication of the at least the first subset of the first respective set of search results from the first remote source unit in the plurality of remote source units comprises:

providing for display at least a filename of a file in the first subset and an indication of the first remote source unit.

17. A non-transitory machine-readable medium comprising instructions that, when executed by one or more processors, cause the one or more processors to:

receive an input comprising a search query and identifiers of a plurality of remote source units, wherein each of the plurality of remote source units is associated with a respective privacy hurdle;

facilitate transmitting, to each of the plurality of remote source units, a message comprising a search request based on the search query and an input for overcoming the respective privacy hurdle of the remote source unit;

facilitate receiving, from each of the plurality of remote source units, a respective set of search results; and provide for display an indication of at least a first subset of a first respective set of search results from a first remote source unit in the plurality of remote source units; and provide for display an indication of at least a second subset of a second respective set of search results from a second remote source unit in the plurality of remote source units.

18. The non-transitory machine-readable medium of clause 17, wherein the instructions to facilitate receiving, from each of the plurality of remote source units, the respective set of search results, comprise instructions that, when executed by the one or more processors, cause the one or more processors to facilitate receiving, from each of the plurality of remote source units, the respective set of search results in real-time.

19. The non-transitory machine-readable medium of clause 17, wherein the instructions to provide for display the indication of the at least the first subset of the first respective set of search results from the first remote source unit in the plurality of remote source units comprise instructions that, when executed by the one or more processors, cause the one or more processors to:

provide for display at least a filename of a file in the first subset and an indication of the first remote source unit.

20. The non-transitory machine-readable medium of clause 19, further comprising instructions that, when executed by the one or more processors, cause the one or more processors to:

receive an input indicating a cursor being placed over a display element associated with the file; and responsive to the input indicating the cursor being placed over the display element associated with the file, provide for display a hover card, wherein the hover card includes at least one link for interaction with the file.

21. The non-transitory machine-readable medium of clause 20, wherein the display element associated with the file comprises one or more of: a region on a display associated with the file or the filename of the file.

22. The non-transitory machine-readable medium of clause 20, wherein the at least one link for interaction with the file comprises one or more of: a link for viewing the file, a link for editing the file, a link for printing the file, or a link for sharing the file.

23. A method comprising:

receiving an input comprising a search query and identifiers of a plurality of remote source units, wherein each of the plurality of remote source units is associated with a respective privacy hurdle;

facilitating transmitting, to each of the plurality of remote source units, a message comprising a search request based on the search query and an input for overcoming the respective privacy hurdle of the remote source unit;

facilitating receiving, at a first time, from a first remote source unit in the plurality of remote source units, a first set of search results;

providing for display an indication of at least a first subset of the first set of search results within a single display unit;

facilitating receiving, at a second time later than the first time, from a second remote source unit in the plurality of remote source units, a second set of search results; and providing for display an indication of at least a second subset of the second set of search results within the single display unit, while continuing to provide for display the indication of the at least the first subset of the first set of search results within the single display unit.

24. The method of clause 23, wherein the single display unit comprises a single tab of a single web browser window.

25. The method of clause 23, wherein the single display unit comprises a single application window.

26. The method of clause 23, wherein the second time is at least five seconds later than the first time.

27. A non-transitory machine-readable medium comprising instructions that, when executed by one or more processors, cause the one or more processors to:

receive an input comprising a search query and identifiers of a plurality of remote source units, wherein each of the plurality of remote source units is associated with a respective privacy hurdle;

facilitate transmitting, to each of the plurality of remote source units, a message comprising a search request based on the search query and an input for overcoming the respective privacy hurdle of the remote source unit;

facilitate receiving, at a first time, from a first remote source unit in the plurality of remote source units, a first set of search results;

provide for display an indication of at least a first subset of the first set of search results within a single display unit;

facilitate receiving, at a second time later than the first time, from a second remote source unit in the plurality of remote source units, a second set of search results; and provide for display an indication of at least a second subset of the second set of search results within the single display unit, while continuing to provide for display the indication of the at least the first subset of the first set of search results within the single display unit.

28. The non-transitory machine-readable medium of clause 27, wherein the single display unit comprises a single tab of a single web browser window.

29. The non-transitory machine-readable medium of clause 27, wherein the single display unit comprises a single application window.

30. The non-transitory machine-readable medium of clause 27, wherein the instructions to provide for display the indication of the at least the first subset comprise instructions to provide for display filenames of files in the first subset, wherein the instructions to provide for display the indication of the at least the second subset comprise instructions to provide for display filenames of files in the second subset.

31. The non-transitory machine-readable medium of clause 30, wherein the instructions to provide for display the filenames of the files comprise instructions to provide for display the file names of the files according to an order of relevance to the search query.

32. The non-transitory machine-readable medium of clause 31, wherein the instructions to provide for display the indication of the at least the second subset of the second set of search results within the single display unit, while continuing to provide for display the indication of the at least the first subset of the first set of search results within the single display unit comprise instructions to interlace the file names of the files in the first subset and the filenames of the files in the second subset according to the order of relevance to the search query.

33. The non-transitory machine-readable medium of claim 27, further comprising instructions that, when executed by one or more processors, cause the one or more processors to:

receive, from a user, a request for additional information about one or more members of the first set of search results or one or more members of the second set of search results, wherein the additional information is not provided for display in conjunction with the indication of the at least the first subset of the first set of search results, and wherein the additional information is not provided for display in conjunction with the indication of the at least the second subset of the second set of search results; and provide for display of the additional information.

Other Remarks

In one aspect, any of the clauses herein may depend from any one of the independent clauses or any one of the dependent clauses. In one aspect, any of the clauses (e.g., dependent or independent clauses) may be combined with any other clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

In one aspect, any methods, instructions, code, means, logic, components, blocks, modules and the like (e.g., software or hardware) described or claimed herein can be represented in drawings (e.g., flow charts, block diagrams), such drawings (regardless of whether explicitly shown or not) are expressly incorporated herein by reference, and such drawings (if not yet explicitly shown) can be added to the disclosure without constituting new matter. For brevity, some (but not necessarily all) of the clauses/descriptions/claims are explicitly represented in drawings, but any of the clauses/descriptions/claims can be represented in drawings in a manner similar to those drawings explicitly shown. For example, a flow chart can be drawn for any of the clauses, sentences or claims for a method such that each operation or step is connected to the next operation or step by an arrow. In another example, a block diagram can be drawn for any of the clauses, sentences or claims having means-for elements (e.g., means for performing an action) such that each means-for element can be represented as a module for element (e.g., a module for performing an action).

Those of skill in the art would appreciate that items such as the various illustrative blocks, modules, elements, components, methods, operations, steps, and algorithms described herein (e.g., 210, 220, 230, 240, 250, 260, 280, 282, 284, 286, 142A, 144A, 310, 320, 330, 340, 350, 390, and the components therein, or the blocks encompassing any of the foregoing) may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (e.g., one or more of blocks, modules, elements, components or processors) for performing one or more functions or operations. In one aspect, such an item may be an apparatus, hardware, or a portion thereof. In one example, an item may have a structure in the form of, for example, an instruction(s) for performing the function(s) or operation(s), where the instruction(s) are encoded or stored on a machine-readable medium, on another device, or on a portion thereof, where an instruction(s) may be software, an application(s), a subroutine(s), or a portion thereof. In an example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., a digital signal processor (DSP), an application specific integrated circuit (ASIC), a field programmable gate array (FPGA), etc., or a portion(s) or a combination(s) of any of the foregoing). Those skilled in the art will recognize how to implement the instructions, circuits, and processing systems.

In one aspect of the disclosure, when actions or functions are described as being performed by an item (e.g., receiving, determining, providing, generating, converting, skipping, displaying, notifying, accepting, selecting, controlling, issuing, transmitting, reporting, or any other action or function), it is understood that such actions or functions may be performed by the item directly or indirectly. As an example, when a module is described as performing an action, it is understood that the module may perform the action directly or may perform the action indirectly, for example, by facilitating such an action (e.g., enabling, causing, or performing at least a portion of an action).

Various items may be arranged differently (e.g., arranged in a different order, or partitioned in a different way) all without departing from the scope of the subject technology. In one aspect of the disclosure, the elements recited in the accompanying claims may be performed by one or more modules or sub-modules.

In one example, items such as 210, 220, 230, 240, 250, 260, 280, 282, 284, 286, 142A, 144A, 310, 320, 330, 340, 350, 390, the components therein, and the blocks encompassing any of the foregoing, may be arranged in a different order, connected in a different way or combined in a different way. The functions of these items may be performed by the blocks as described above or by a combination of blocks or other blocks. Some of these items may be placed outside of its higher-level blocks. For example, items, 210, 290 and 206 may be placed outside a companion application 141A. In another example, items 310, 305 and 390 may be placed outside a search module 122. In one example, an auto discovery module 132 may be implemented in one of the remote source units 140A through 140N. In another example, an auto discovery module 132 may be implemented in a client device 120. In one example, an auto discovery module is utilized for establishing a connection as well as relaying all requests, commands, responses and data among the client device and remote source units. In another example, an auto discovery module is utilized only for establishing a connection. For example, after the remote source units (e.g., 140A-140N) report their availability to an auto discovery module (e.g., 132), after a client device (e.g., 120) signs into the auto discovery module, and after the firewalls are selectively disabled (if applicable), the client device and the remote source units may exchange their requests, commands, responses and data without utilizing the auto discovery module. In one example, a module or a block (e.g., 210, 220, 230, 240, 250, 260, 280, 282, 284, 286, 142A, 144A, 310, 320, 330, 340, 350, 390) may represent one or more subroutines encoded on a machine-readable medium, may represent circuits for performing the functions, or may represent one of the foregoing in combination with a portion of a memory.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims and their legal equivalents, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

What is claimed is:

1. A method for facilitating real-time searching of non-public data using a single search query, the method comprising: reporting an availability of a non-public companion application of a remote source unit to an auto discovery module to enable a client device to automatically discover the remote source unit and to enable the client device to search, in real-time, non-public data on the remote source unit using the single search query, wherein the companion application is a non-public application; receiving, at the remote source unit, the single search query, wherein the single search query comprises a search term; and in response to the single search query: searching, in real-time, non-public data on the remote source unit using the search term; identifying one or more files or folders stored on the remote source unit that match the search term in name, content, or metadata associated with the one or more files or folders; identifying metadata associated with the one or more files or folders; identifying metadata associated with the content of the one or more files or folders; retrieving, in real-time, a non-public search result comprising: one or more file names or folder names of the one or more files or folders stored on the remote source unit that match the search term and associated search ranking information; and one or more metadata indicators indicating whether the metadata associated with the one or more files or folders or the metadata associated with the content of the one or more files or folders includes a particular type of metadata, the one or more metadata indicators including one or more of: an icon indicator indicating whether an icon associated with a file or folder of the one or more files or folders exists in the remote source unit; a preview indicator indicating whether a preview associated with a file or folder exists in the remote source unit; a thumbnail indicator indicating whether a thumbnail associated with a file or folder exists in the remote source unit; a partial content indicator indicating whether a partial content associated with a file or folder exists in the remote source unit; and a partial image indicator indicating whether a partial image associated with a file or folder exists in the remote source unit; and transmitting the non-public search result in real-time; wherein a secure remote session log-on between the remote source unit and the client device is not established, and wherein the remote source unit is not mounted onto the client device.

2. The method of claim 1, wherein the remote source unit is one of multiple remote source units, further wherein the single search query is directed to each of the multiple remote source units.

3. The method of claim 2, wherein the auto discovery module is configured to enable the client computing device to simultaneously search non-public data on the multiple remote source units.

4. The method of claim 1, wherein the single search query is initiated by the client device.

5. The method of claim 1, wherein the remote source unit is associated with a privacy hurdle, wherein the method further comprises receiving, at the remote source unit, an input for overcoming the privacy hurdle.

6. The method of claim 5, wherein the privacy hurdle comprises one or more of: a firewall, a login information verification module, a certificate verification module, or a token verification module.

7. The method of claim 5, wherein the input for overcoming the privacy hurdle comprises one or more of: login information, a username, a password, a certificate, or a token.

8. The method of claim 1, wherein:
reporting the availability of the non-public companion application comprises reporting, by a reporting module of the remote source unit, the availability of the non-public companion application; receiving, at the remote source unit, the single search query comprises receiving by a search command handler of the remote source unit the single search query; searching, in real-time, non-public data on the remote source unit comprises: providing, by search command handler, the single search query to an indexer of the remote source unit; creating, by the indexer, a word frequency distribution indicating how relevant the search term is to files in the remote source unit; and providing the word frequency distribution by the indexer to the companion application; retrieving, in real-time, the non-public search result comprises receiving, by a result handler of the remote source unit, the non-public search result, the non-public search result being associated with search ranking information comprising the word frequency distribution; and transmitting the non-public search result in real-time comprises transmitting in real-time, by the result handler, the non-public search result.

9. A non-transitory machine-readable medium for facilitating real-time searching of non-public data using a single search query, the machine-readable medium comprising instructions that, when executed by one or more processors, cause the one or more processors to: report availability of a non-public companion application of a remote source unit to an auto discovery module to enable a client device to automatically discover the remote source unit and to enable the client device to search, in real-time, non-public data on the remote source unit using the single search query, receive, at the remote source unit, the single search query, wherein the single search query comprises a search term; and in response to the single search query: search, in real-time, non-public data on the remote source unit using the search term; identify one or more files or folders stored on the remote source unit that match the search term in name, content, or metadata associated with the one or more files or folders; identify metadata associated with the one or more files or folders; identify metadata associated with the content of the one or more files or folders; retrieve, in real-time, a non-public search result comprising: one or more file names or folder names of the one or more files or folders stored on the remote source unit that match the search term and associated search ranking information; and one or more metadata indicators indicating whether the metadata associated with the one or more files or folders or the metadata associated with the content of the one or more files or folders includes a particular type of metadata, the one or more metadata indicators including one or more of: an icon indicator indicating whether an icon associated with a file or folder of the one or more files or folders exists in the remote source unit; a preview indicator indicating whether a preview associated with a file or folder exists in the remote source unit; a thumbnail indicator indicating whether a thumbnail associated with a file or folder exists in the remote source unit; a partial content indicator indicating whether a partial content associated with a file or folder exists in the remote source unit; and a partial image indicator indicating whether a partial image associated with a file or folder exists in the remote source unit; and transmit the non-public search result in real-time; wherein a secure remote session log-on between the remote source unit and the client device is not established, and wherein the remote source unit is not mounted onto the client device.

10. The non-transitory machine-readable medium of claim 9, wherein the single search query is initiated by the client device.

11. The non-transitory machine-readable medium of claim 9, wherein the remote source unit comprises one or more of: a remote computing device, a cloud-based source unit, an email account storing email messages, an online calendar account storing appointments, an online document management account, a social networking account storing social networking content.

12. The non-transitory machine-readable medium of claim 9, wherein the instructions to enable automatic access to non-public data on the remote source unit comprise instructions that, when executed by the one or more processors, cause the one or more processors to automatically and selectively disable a firewall at the remote source unit for communications directed to the companion application.

13. The non-transitory machine-readable medium of claim 12, wherein the instructions to automatically and selectively disable the firewall comprise instructions that, when executed by the one or more processors, cause the one or more processors to automatically and selectively disable the firewall when the companion application is installed on the remote source unit for the first time, and the firewall remains selectively disabled while the companion application remains installed on the remote source unit.

14. The non-transitory machine-readable medium of claim 9, further comprising instructions that, when executed by the one or more processors, cause the one or more processors to: receive, at the remote source unit after transmitting the non-public search result, a request for an icon associated with one or more files or folders of the one or more file names or folder names, based on the one or more associated metadata indicators; and in response to the request for the icon, retrieve and facilitate transmission of the icon to the auto discovery module for forwarding to the client device in real-time, wherein the non-public search result does not contain the icon.

15. The non-transitory machine-readable medium of claim 12, further comprising instructions that, when executed by the one or more processors, cause the one or more processors to: receive, at the remote source unit after transmitting the non-public search result, a request for a preview, a thumbnail, a partial content or a partial image associated with the content of one or more files or folders of the one or more file names or folder names, based on the one or more associated metadata indicators; and in response to the request for the preview, the thumbnail, the partial content or the partial image, retrieve and facilitate transmission of the preview, the thumbnail, the partial content or the partial image to the auto discovery module for forwarding to a portion of the client device in real-time, wherein the non-public search result does not contain the preview, the thumbnail, the partial content or the partial image.

16. The non-transitory machine-readable medium of claim 9, further comprising instructions that, when executed by the one or more processors, cause the one or more processors to: receive, at the remote source unit after transmitting the non-public search result, a request for the content of one or more files of the one or more file names; and in response to the request for the content, retrieve and facilitate transmission of the content to the auto discovery module for forwarding to a portion of the client device in real-time, wherein the non-public search result does not contain the content.

17. The non-transitory machine-readable medium of claim 9, wherein the instructions to search comprise instructions that, when executed by the one or more processors, cause the one or more processors to: identify the one or more file names or folder names of one or more files or folders that match the search term in name, content or metadata of the one or more files or folders in the remote source unit; and compute the associated search ranking information based on word frequency distribution of the search term in the one or more files or folders in the remote source unit.

18. The non-transitory machine-readable medium of claim 9, further comprising instructions that, when executed by the one or more processors, cause the one or more processors to: filter the non-public search result based on a permission criteria of a user of the client device to allow transmission of the non-public search result only to the extent the non-public search result meets the permission criteria.

19. The non-transitory machine-readable medium of claim 9, further comprising instructions that, when executed by the one or more processors, cause the one or more processors to: group the non-public search result based on a clustering criteria.

20. The non-transitory machine-readable medium of claim 9, further comprising instructions that, when executed by the one or more processors, cause the one or more processors to: prior to transmitting the non-public search result, encrypt the non-public search result to enable secure transmission of the non-public search result.

21. The non-transitory machine-readable medium of claim 9, wherein the remote source unit is one of multiple remote source units, further wherein the single search query is directed to each of the multiple remote source units, further wherein the auto discovery module is configured to enable the client computing device to simultaneously search non-public data on the multiple remote source units.

22. The non-transitory machine-readable medium of claim 21, further comprising instructions that, when executed by the one or more processors, cause the one or more processors to: report availability of a non-public companion application of a second remote source unit within the multiple remote source units to the auto discovery module to enable the client device to automatically discover the second remote source unit and to enable the client device to search, in real-time, non-public data simultaneously on the multiple remote source units using the single search query; receive, at the second remote source unit, the single search query initiated by the client device, wherein the single search query comprises a search term; and in response to the single search query, search, in real-time, non-public data on the second remote source unit using the search term; retrieve, in real-time, a second non-pubic search result comprising one or more file names or folder names, associated search ranking information, and one or more associated metadata indicators; and transmit, in real-time, the second non-public search result to the auto discovery module for forwarding to the client device in real-time.

23. The non-transitory machine-readable medium of claim 21, further comprising instructions that, when executed by the one or more processors, cause the one or more processors to: facilitate communication of the companion application of the remote source unit with companion applications of other remote source units within the multiple remote source units, wherein the multiple remote source units comprise the remote source unit and the other remote source units.

24. The non-transitory machine-readable medium of claim 21, further comprising instructions that, when executed by the one or more processors, cause the one or more processors to: facilitate communication of the companion application of the remote source unit with companion applications of other remote source units, wherein the multiple remote source units comprise the remote source unit and the other remote source units; and update associated search ranking information based on search ranking information of the remote source unit and search ranking information from the other remote source units; wherein the instructions to facilitate communication comprise instructions that, when executed by the one or more processors, cause the one or more processors to enable sharing of information including search ranking information among the remote source unit and the other remote source units.

25. The non-transitory machine-readable medium of claim 9, further comprising instructions that, when executed by the one or more processors, cause the one or more processors to: rank files or folders found in the remote source units from the searching, wherein the ranking comprises analyzing one or more of search term frequency distribution, date of creation of the files or folders, and relevance of the files or folders.

26. The non-transitory machine-readable medium of claim 9, further comprising instructions that, when executed by the one or more processors, cause the one or more processors to: traverse a file system of the remote source unit; and index files and folders or subsets of files and folders on the remote source unit; index contents of the files or subsets of the files on the remote source unit.

27. A system for facilitating real-time searching of non-public data using a single search query, the system comprising: one or more processors; and a memory comprising instructions that, when executed by the one or more processors, cause the one or more processors to: report availability of a non-public companion application of a remote source unit to an auto discovery module to enable a client device to automatically discover the remote source unit and to enable the client device to search, in real-time, non-public data on the remote source unit using the single search query receive, at the remote source unit, the single search query, wherein the single search query comprises a search term; and in response to the single search query: search, in real-time, non-public data on the remote source unit using the search term; identify one or more files or folders stored on the remote source unit that match the search term in name, content, or metadata associated with the one or more files or folders; identify metadata associated with the one or more files or folders; identify metadata associated with the content of the one or more files or folders; retrieve, in real-time, a non-public search result comprising: one or more file names or folder names of the one or more files or folders stored on the remote source unit that match the search term and associated search ranking information; and one or more metadata indicators indicating whether the metadata associated with the one or more files or folders or the metadata associated with the content of the one or more files or folders includes a particular type of metadata, the one or more metadata indicators including one or more of: an icon indicator indicating whether an icon associated with a file or folder of the one or more files or folders exists in the remote source unit; a preview indicator indicating whether a preview associated with a file or folder exists in the remote source unit; a thumbnail indicator indicating whether a thumbnail associated with a file or folder exists in the remote source unit; a partial content indicator indicating whether a partial content associated with a file or folder exists in the remote source unit; and a partial image indicator indicating whether a partial image associated with a file or folder exists in the remote source unit; and transmit the non-public search result in real-time; wherein a secure remote session log-on between the remote source unit and the client device is not established, and wherein the remote source unit is not mounted onto the client device.

28. The system of claim 27, wherein the remote source unit is one of multiple remote source units, further wherein the single search query is directed to each of the multiple remote source units.

29. The system of clam 28, wherein the auto discovery module is configured to enable the client computing device to simultaneously search non-public data on the multiple remote source units.

30. The system of claim 27, wherein the single search query is initiated by the client device.

\* \* \* \* \*